(12) United States Patent
Peters et al.

(10) Patent No.: US 7,077,411 B2
(45) Date of Patent: Jul. 18, 2006

(54) VEHICLE SUSPENSION SYSTEM

(75) Inventors: Scott R. Peters, Warrenton, MO (US); Bob G. Baxter, Warrenton, MO (US); Zoran Tomic, Warrenton, MO (US)

(73) Assignee: The Holland Group, Inc., Holland, MI (US)

( * ) Notice: Subject to any disclaimer, the term of this patent is extended or adjusted under 35 U.S.C. 154(b) by 250 days.

(21) Appl. No.: 10/433,124

(22) PCT Filed: Nov. 26, 2001

(86) PCT No.: PCT/US01/44121

§ 371 (c)(1),
(2), (4) Date: May 22, 2003

(87) PCT Pub. No.: WO02/42097

PCT Pub. Date: May 30, 2002

(65) Prior Publication Data

US 2004/0232646 A1    Nov. 25, 2004

Related U.S. Application Data

(60) Provisional application No. 60/276,016, filed on Mar. 15, 2001, provisional application No. 60/253,201, filed on Nov. 27, 2000.

(51) Int. Cl.
*B60G 3/12* (2006.01)

(52) U.S. Cl. .............................. 280/124.132

(58) Field of Classification Search ......... 280/124.132, 280/124.11, 124.111, 124.104, 124.128, 677, 280/678
See application file for complete search history.

(56) References Cited

U.S. PATENT DOCUMENTS

| | | |
|---|---|---|
| 2,970,848 A | 2/1961 | Rice |
| 3,147,024 A | 9/1964 | Brockman |
| 3,520,548 A | 7/1970 | McGee |
| 4,033,606 A | 7/1977 | Ward et al. |
| 4,200,267 A | 4/1980 | King |
| 4,202,564 A | 5/1980 | Strader |

(Continued)

FOREIGN PATENT DOCUMENTS

CA    986549    3/1976

OTHER PUBLICATIONS

International Search Report, PCT/US01/44121, Jun. 30, 2002.

(Continued)

*Primary Examiner*—Faye M. Fleming
(74) *Attorney, Agent, or Firm*—Price, Heneveld, Cooper, DeWitt & Litton, LLP

(57) ABSTRACT

A vehicle suspension comprising a frame (3) and a pair of levers (11) carried by the frame on opposite sides thereof. Each lever is pivotally mounted on the frame for swinging movement on an axis intermediate opposite ends of the lever transverse to the frame. The suspension includes a pair of beams (17, 19), one extending forward from one of the levers and the other extending forward from the other lever, each of the forwardly-extending beams having a pivotal connection with the respective lever forward of the lever axis and having a support for a forward axle. The suspension also includes a pair of beams, one extending rearward from the other lever, each of said rearwardly-extending beams having a pivotal connection with the respective lever rearward of the lever axis and having a support for a rearward axle.

27 Claims, 45 Drawing Sheets

U.S. PATENT DOCUMENTS

| | | | |
|---|---|---|---|
| 4,256,326 A | 3/1981 | Cantrell et al. | |
| 4,383,703 A | 5/1983 | Honda et al. | |
| 4,530,515 A | 7/1985 | Raidel | |
| 4,756,550 A | 7/1988 | Raidel | |
| 4,811,972 A | 3/1989 | Wiley, Jr. | |
| 5,013,063 A | 5/1991 | Mitchell | |
| 5,015,004 A | 5/1991 | Mitchell | |
| 5,088,758 A | 2/1992 | Wall et al. | |
| 5,127,668 A | 7/1992 | Raidel | |
| 5,354,091 A | 10/1994 | Baxter et al. | |
| 5,366,237 A | 11/1994 | Dilling et al. | |
| 5,375,871 A | 12/1994 | Mitchell et al. | |
| 5,470,096 A | 11/1995 | Baxter | |
| 5,524,921 A | 6/1996 | Ellingsen | |
| 5,667,240 A | 9/1997 | Mitchell | |
| 5,678,845 A | 10/1997 | Stuart | |
| 5,683,098 A | 11/1997 | VanDenberg | |
| 5,718,445 A | 2/1998 | VanDenberg | |
| 5,845,919 A | 12/1998 | VanDenberg | |
| 5,882,031 A | 3/1999 | VanDenberg | |
| 5,908,198 A | 6/1999 | VanDenberg | |
| 5,915,705 A | 6/1999 | VanDenberg | |
| 5,944,339 A | 8/1999 | McKenzie et al. | |
| 5,988,672 A | 11/1999 | VanDenberg | |
| 6,099,016 A | 8/2000 | Peveler | |
| 6,206,407 B1 | 3/2001 | Fuchs et al. | |
| 6,264,231 B1 | 7/2001 | Scully | |
| 6,527,286 B1 * | 3/2003 | Keeler et al. | 280/124.135 |
| 6,585,223 B1 | 7/2003 | VanDenberg | |
| 6,916,037 B1 * | 7/2005 | Baxter et al. | 280/683 |

OTHER PUBLICATIONS

Holland Neway/Dana Spicer, Air Ride Axle Series, Integrated Air Suspension Axle Package brochure, Mar. 2000, USA.

Holland Neway/Dana Spicer, Air Ride Axte Series, Integrated Slider Axle Package brochure, Mar. 2000, USA.

Sternberg, E.R., Heavy-Duty Truck Suspensions, SAE Paper 760369, Truck Systems Design Handbook, Feb. 1976, pp. 1-52, PT-41, Society of Automotive Engineers, Inc., USA.

Highway Parallelogram Trailer Air Suspension System brochure, 1997, USA.

* cited by examiner

VEHICLE SUSPENSION SYSTEM

BACKGROUND OF THE INVENTION

This invention relates generally to vehicle suspensions, and more particularly to an improved suspension for tandem-axle trucks.

The present invention is especially suited for beam-type suspensions where the axles of a tandem-axle truck are supported by beams pivoted to hangers on opposite sides of the frame of the truck. Springs (e.g., air bags) on the axle ends of the beams support the frame. Ideally, such suspensions are designed to be as lightweight as possible, to provide a soft ride and adequate roll stiffness or stability, that is, resistance to the tendency of the truck body to roll laterally during cornering, to provide an even distribution of the load over the wheels as the truck travels over bumps and as it turns, to provide good braking, to minimize torque applied to the axle as the vehicle encounters bumps in the road, and as it turns, and to eliminate so-called "dock walk", which is the tendency of a vehicle to move away from a dock as it is being loaded. While certain prior designs have achieved some of these objectives, it has been usually been at the sacrifice of other objectives. There is a need, therefore, for a suspension which represents an improvement over prior suspensions.

SUMMARY OF THE INVENTION

The suspension of the present invention is an improvement which is intended to meet most if not all the aforementioned objectives. The suspension provides a high degree of roll stability and, in some embodiments, substantially eliminates dock walk. The suspension is designed to reduce torque on the axle to increase axle life, and in general has components of greater durability. The suspension provides a soft ride performance equal to or better than existing air systems. In some embodiments the suspension provides load equalization under braking so only one of the two axles requires ABS sensors. The suspension is equipped for easy axle alignment, either at the factory or in the field. The suspension can be used as a tandem road trailer unit without modification. The system is light in weight and can be fabricated at low cost. Further, the suspension can be used with existing trailers and axle and brake systems. The suspension is also designed to reduce axle stress so that the axles of the suspension can be made of lighter material, if desired.

In one embodiment, a vehicle suspension of this invention comprises a frame for support of a vehicle, the frame having a forward end, a rearward end and sides. A pair of levers is carried by the frame intermediate the ends of the frame, one at one side and the other at the other side of the frame. Each lever is pivotally mounted with respect to the frame for swinging movement on an axis intermediate opposite ends of the lever transverse to the frame. The suspension includes a pair of beams, one extending forward from one of the levers and the other extending forward from the other lever. Each of the forwardly-extending beams has a pivotal connection with the respective lever forward of the lever axis and has a support for a forward axle. The suspension also includes a pair of beams, one extending rearward from one of the levers and the other extending rearward from the other lever, each of the rearwardly-extending beams having a pivotal connection with the respective lever rearward of the lever axis and having a support for a rearward axle. A forward pair of springs is provided, each interposed between a respective forwardly-extending beam and the frame. A rearward pair of springs is also provided, each interposed between a respective rearwardly-extending beam and the frame.

In another embodiment, the suspension comprises a frame for support of a vehicle, the frame having a forward end, a rearward end and opposite sides, a pair of rails extending longitudinally of the suspension at opposite sides of the frame, and front and rear hangers depending from each rail at locations intermediate the ends of the frame. The suspension includes a pair of forwardly-extending beams, one extending forward from one of the front hangers and the other extending forward from the other front hanger, each of said forwardly-extending beams having a pivotal connection with the respective front hanger and having a support for a forward axle, and a pair of rearwardly-extending beams, one extending rearward from one of the rear hangers and the other extending rearward from the other rear hanger, each of the rearwardly-extending beams having a pivotal connection with the respective rear hanger and having a support for a rearward axle. Each of the pivotal connections between one of the hangers and a respective beam comprises a resilient bushing assembly. A forward pair of springs is interposed between respective forwardly-extending beams and the frame, and a rearward pair of springs is interposed between respective rearwardly-extending beams and the frame.

Another aspect of this invention is directed to a bushing assembly for a pivot connection between a vehicle frame and axle-supporting beam of a vehicle suspension to permit pivoting of the beam relative to the frame. The bushing assembly comprises an inner metal sleeve having a central longitudinal axis about which the beam is adapted to pivot, and a resilient annular bushing member of resilient material surrounding the inner metal sleeve. The bushing member has a radial inner surface adjacent the inner metal sleeve and an opposite radial outer surface. An outer metal sleeve surrounds the bushing member, the outer metal sleeve having a radial inner surface adjacent the bushing member and an opposite radial outer surface. The outer surface of the resilient bushing member is relieved in a radially inward direction toward said central longitudinal axis to facilitate deflection of the bushing member in said radially inward direction.

In another aspect, a vehicle suspension of the present invention comprises a frame having opposite sides, and a pair of suspension beams at opposite sides of the frame, each beam having first and second ends. Each beam is pivotally connected to the frame generally adjacent the first end of the beam. An axle support is provided toward the second end of each for supporting an axle on the beam. The support includes a pair of side seat assemblies on opposite sides of the beam. Each side seat assembly comprises first and second seats having opposing axle-supporting surfaces, and a fastener for drawing the first and second seats toward one another to clamp the axle-supporting surfaces against the axle. A camshaft bracket and a brake chamber bracket are mounted on the axle support.

Another aspect of the present invention is directed to a vehicle suspension system comprising a frame having opposite sides, and a pair of suspension beams at opposite sides of the frame each having a pivotal ball joint connection at one end thereof with the frame and an axle support at the other end thereof.

In another embodiment, a vehicle suspension of the present invention comprises a frame having opposite sides, and a pair of suspension beams at opposite sides of the frame, each beam having first and second ends. A pivotal connection is provided between each beam and the frame generally adjacent the first end of the beam. The suspension includes an axle of generally rectangular cross section extending generally transversely with respect to the frame from one side of the frame to the other, and an axle support on each of the beams toward the second end of the beam for supporting the axle on the beam. The axle support includes at least one side seat affixed to the beam at one side of the beam and at least one U-bolt fastener defining an axle-receiving opening, the U-bolt fastener having legs extending through openings in the side seat, and nuts threaded on the legs of the U-bolt fastener to tighten the fastener and thereby clamp the axle in fixed position against the side seat. The nuts are removable from the at least one U-bolt fastener to permit removal of the axle from the beam.

In another embodiment, a vehicle suspension of the present invention comprises a frame having opposite sides and a pair of elongate suspension beams at opposite sides of the frame. Each beam has opposite sides, opposite ends, a pivotal connection with the frame toward one end of the beam, and an axle support toward the other end thereof. The axle support comprises a pair of axle side seats secured to the beam and projecting laterally outwardly from opposite sides of the beam. The side seats have axle-supporting surfaces for supporting the axle at locations outboard of beam. A mechanism is provided for securing the axle in the outboard axle side seats.

Other objects and features will in part apparent and in pointed out hereinafter.

BRIEF DESCRIPTION OF THE DRAWINGS

Corresponding parts are designated by corresponding reference numerals throughout the several views of the drawings.

DESCRIPTION OF THE PREFERRED EMBODIMENTS

Figure 1:
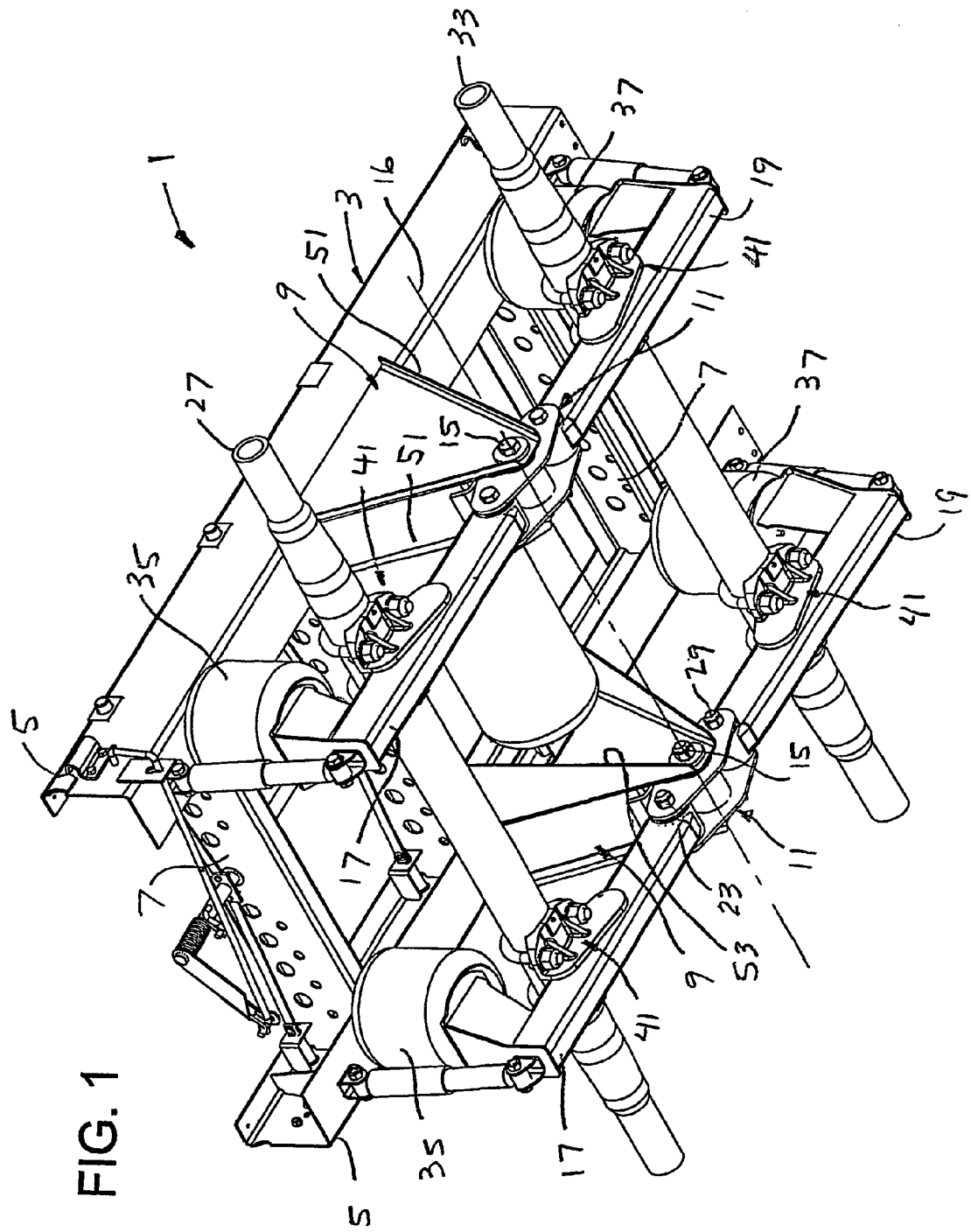
FIG. 1 is a perspective of a first embodiment of a vehicle suspension in which the suspension beams are in a push-pull orientation and pivoted to equalizing levers.
Figure 2:
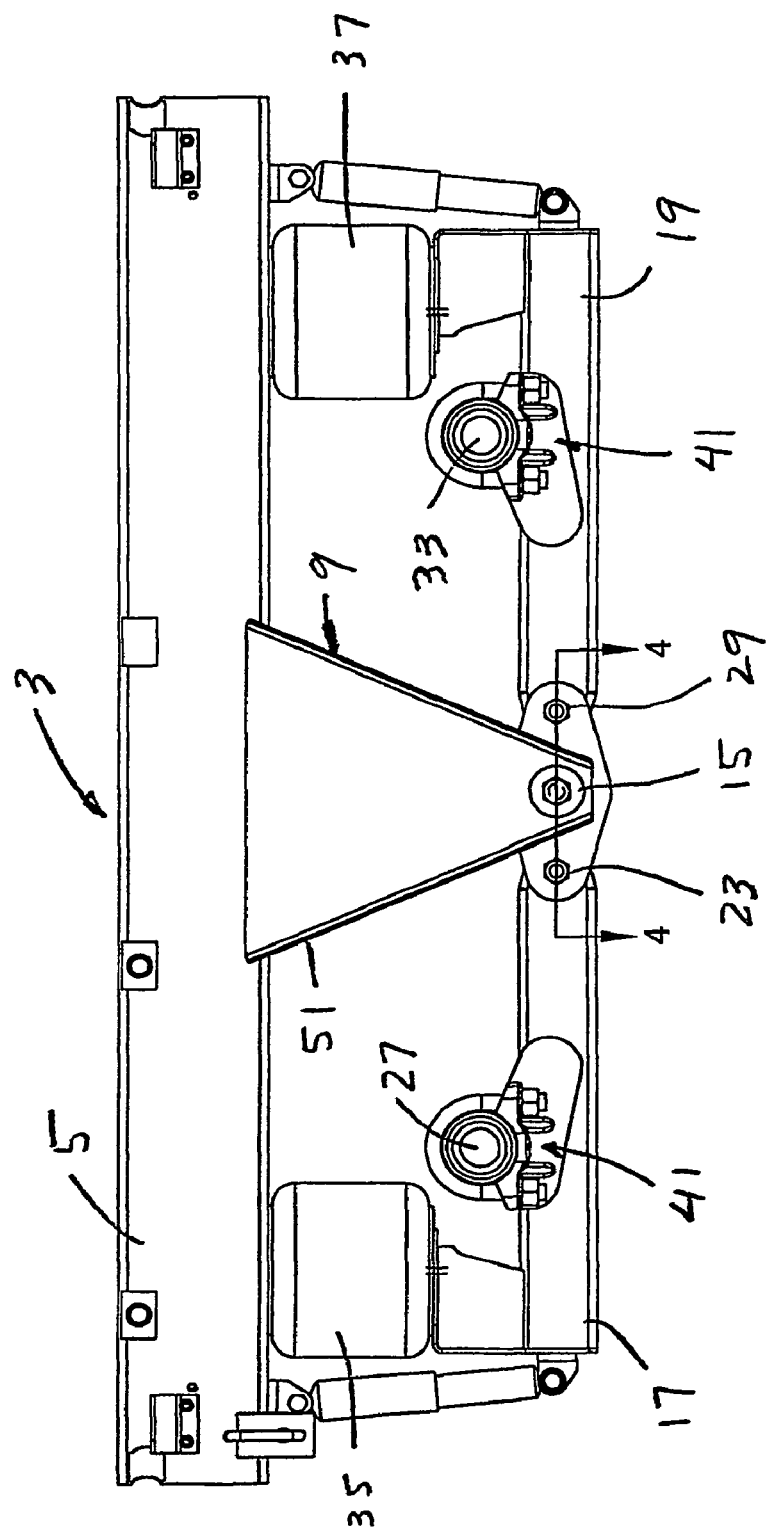
FIG. 2 is a side elevation of FIG. 1.
Figure 3:
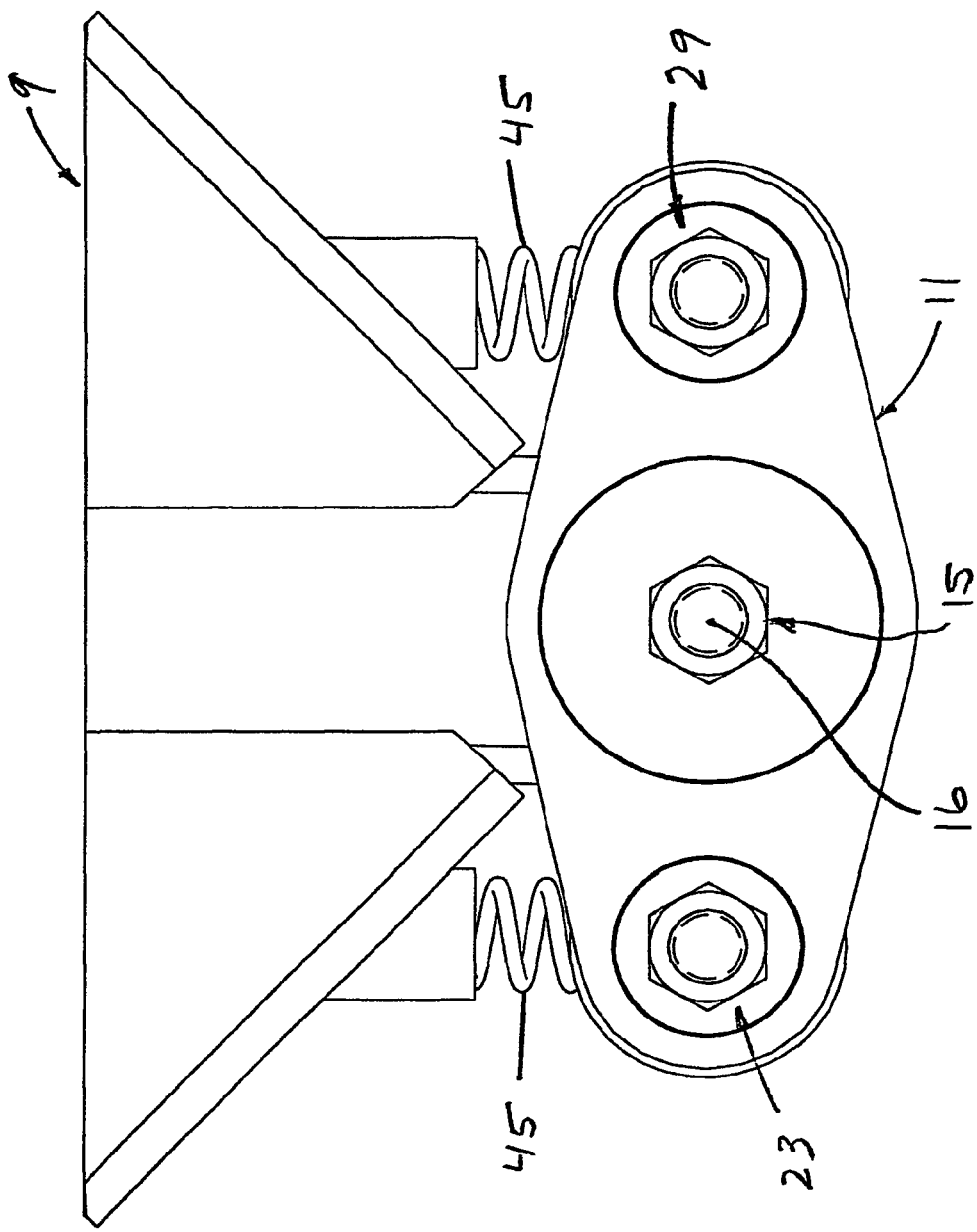
FIG. 3 is a side elevation showing a pair of springs for urging the equalizing lever to a generally horizontal position.

Referring now to FIGS. 1–4 of the drawings, a vehicle suspension of the present invention is designated in its entirety the reference numeral 1. As shown, the suspension is a slider of the type which is affixed to the frame of truck.

However, it will be understood that the present invention has applications to vehicle suspensions generally.

The suspension comprises a frame 3 which includes a pair of parallel rails 5 connected by cross members 7, and hangers 9 depending from the rails 5 at opposite sides of the frame generally midway between the ends of the rails. The frame has forward and rearward ends, the forward end being the left end as viewed in FIG. 1 and the rearward end being the opposite (right) end. In accordance with one aspect of the present invention, the frame further comprises a pair of levers 11, referred to as equalizers, one at one side of the frame 3 and the other at the other side of the frame. Each lever 11 (comprising two parallel bars 11a, 11b in the embodiment shown in FIGS. 1–4) has a pivot connection, generally designated 15, with a respective hanger 9 for swinging movement on a generally horizontal axis 16 intermediate opposite ends of the lever transverse to the frame. The frame also includes a pair of suspension beams 17 extending forward from one end of the levers 11, and a pair of suspension beams 19 extending rearward from the other end of the levers. Each of the forward-extending beams 17 has a pivot connection 23 with the respective lever forward of the lever pivot connection 15 and further supports a forward axle 27. Each of the rearward-extending beams 19 has a pivot connection 29 with the respective lever 11 rearward of the lever pivot connection 15 and supports a rearward axle 33. A forward pair of springs 35 (e.g., air bags) is interposed between respective forward-extending beams 17 and the frame 3, and a rearward pair of springs 37 (e.g., air bags) is interposed between respective rearward-extending beams 19 and the frame 3. The forward and rearward beams 17, 19 carry axle supports, each generally designated 41, for supporting the respective axles on the beams.

The levers 11 function to permit the suspension beams 17, 19 to move essentially independently of one another, so that the loading on the wheels of the vehicle is maintained substantially uniform as the vehicle moves over bumps in the road and as the vehicle turns. The suspension provides good roll stability or stiffness, i.e., resistance to rollover during cornering, and minimizes axle torque, especially during travel over bumps, potholes and the like. For efficient operation, the levers 11 are maintained in a generally horizontal position by the resilient nature of the pivot connections 15, as will be described, although other means may be used, e.g., coil compression springs 45 (FIG. 3), rubber springs, or linkages.

In the embodiment illustrated in FIGS. 1–4, each hanger 9 comprises a pair of parallel generally triangular spaced apart metal plates 51 affixed (e.g., welded) to a respective rail 5 of the frame. The hanger plates 51 are reinforced along their sides by stiffening flanges 53 and at their bottoms by reinforcing plates 55 welded thereto (see FIG. 4). The equalizing lever 11 at each side of the frame is preferably disposed between the two hanger plates 51 of a respective hanger adjacent the lower ends of the plates.

Figure 4:
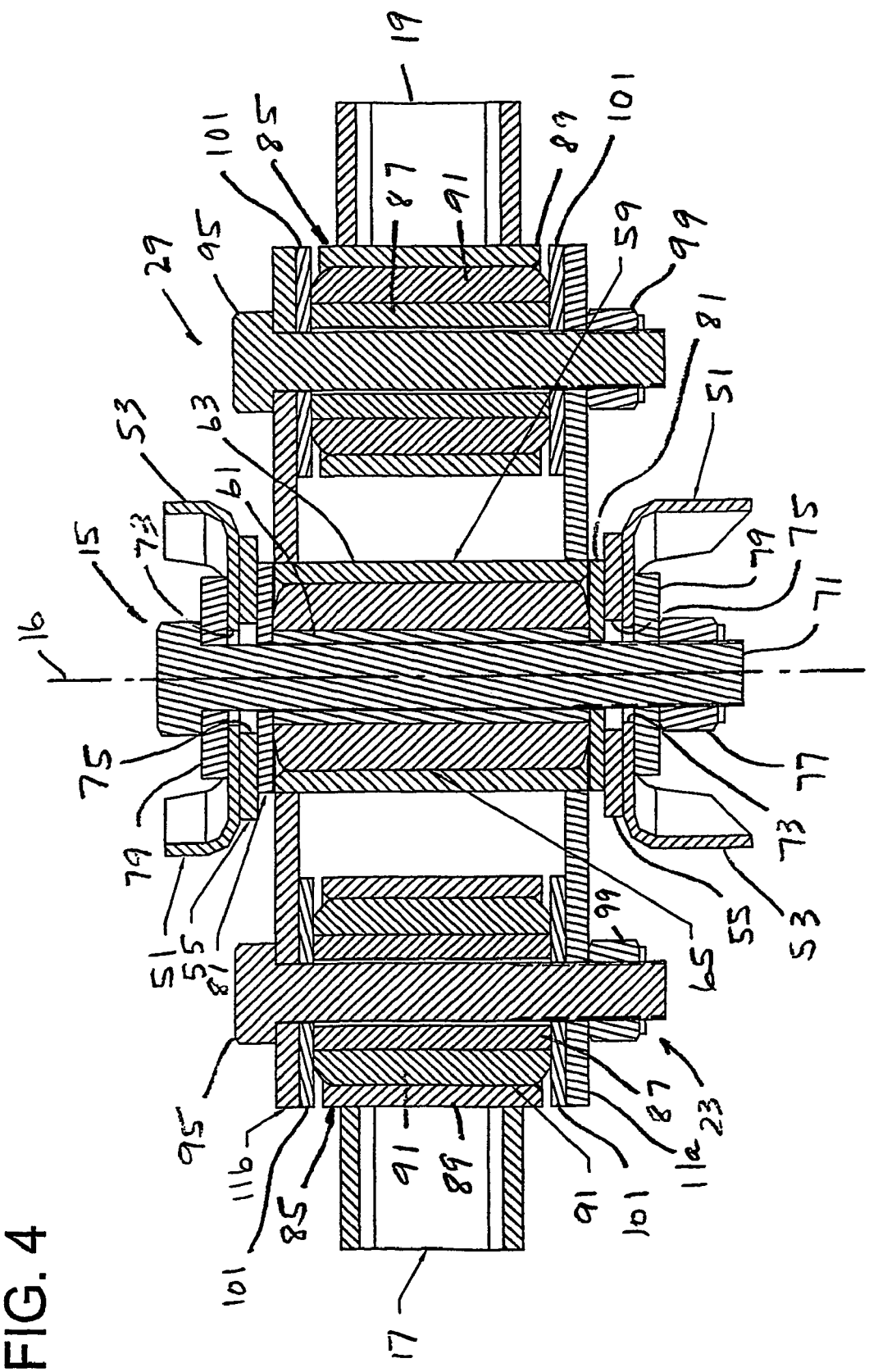
FIG. 4 is an enlarged horizontal section taken in the plane of 4—4 of FIG. 2.

The pivot connection 15 between the equalizing lever 11 and the hanger 9 at each side of the frame is shown in FIG. 4 as comprising a bushing assembly generally designated 59 having inner and outer sleeves 61, 63 and a tubular bushing member 65 of resilient material (e.g., rubber having a Shore A durometer preferably in the range of 65–75 and more preferably about 70) between the sleeves, all three components being concentric with the pivot axis 16. The outer sleeve 63 is received in aligned holes in the two equalizer bars 11a, 11b and is immovably affixed to the bars, as by welding. The outer sleeve 63 is somewhat shorter (e.g., 0.062 in.) than the inner sleeve 61, for reasons which will become apparent. The resilient bushing member 65 has a press (frictional) fit with the inner and outer sleeves 61, 63 to prevent relative rotation between the inner surface of the bushing member and the inner sleeve and between the outer surface of the bushing and the outer sleeve. The resiliency of the bushing material itself allows limited relative rotational and angular movement between the inner and outer sleeves 61, 63, "angular" meaning movement of the axes of the two sleeves out of parallelism. A pivot bolt 71 extending through the inner sleeve 61 and through aligned openings 73 in the hanger plates 51 and aligned openings 75 in the reinforcing plates 55 is held in place by a nut 77 threaded up on the bolt. Conventional washers 79 are provided on the bolt 71 between the hanger plates 51 and the head of the bolt and the nut 73. Hardened 81 washers are disposed between the ends of the bushing assembly 59 and the reinforcing plates 55 of the hanger. When the nut 77 is tightened on the pivot bolt 71, the hardened washers 81 and inner sleeve 61 of the bushing assembly are clamped in fixed (non-rotatable) position. Since the outer sleeve 63 is shorter than the inner sleeve 61, it is free to rotate to the extent permitted by the flexing of the resilient bushing member 65. This rotation occurs as the equalizing lever 11 pivots on the pivot bolt 71 in response to up and down movement of the suspension beams 17, 19 to equalize the forces on the axles 27, 33 carried by the beams. The resilience of the bushing member 65 urges the lever 11 back toward a neutral (horizontal) position.

It will be noted that the openings 73, 75 in the hanger plates 51 and reinforcing plates 51, 55 are clearance openings substantially larger in diameter than the diameter of the pivot bolt 71. This allows for fore and aft adjustment of the equalizing lever 11 and associated beams 17, 19 to permit adjustment of the respective ends of the axles carried by the beams to attain precise alignment of the axles transversely of the vehicle. (When properly aligned, the front and rear axles carried by the suspension beams should be parallel to one another and perpendicular to the longitudinal centerline of the trailer, typically extending through the kingpin of the vehicle.) After the position of each lever 11 is adjusted to achieve proper axle alignment, the nuts 77 are tightened on the pivot bolts 71 to lock the equalizing levers 11 in fixed position relative to respective hangers 9. If desired, the pivot bolt washers 77 (which have a close clearance fit with the pivot bolt) can also be welded to respective hanger plates 51 to further insure that the equalizer remains in proper position to maintain axle alignment.

The construction of the pivot connections 23, 29 between the levers and the beams 17 is also shown in FIG. 4. As illustrated, each such pivot connection 23, 29 comprises a bushing assembly generally designated 85 disposed between the two bars 11a, 11b of the equalizing lever 11 adjacent an end of the lever. The bushing assembly 85 comprises concentric inner and outer sleeves 87, 89 surrounding a cylindric resilient bushing member 91 having a press (frictional) fit with both sleeves. In one embodiment, the bushing member is of rubber preferably having a 65–75 Shore A durometer, and more preferably about a 70 Shore A durometer. The outer sleeve 89 of the bushing assembly is affixed (e.g., welded) to a respective beam 17, 19. The assembly 85 is held in place by a pivot bolt 95 extending through the inner sleeve 87 and aligned holes in the lever bars 11a, 11b, and a nut 99 threaded up on the bolt against one of the bars. Hardened metal washers 101 are provided between the ends of the inner sleeve 87 and the lever bars. When the nut 99 is tightened, the inner sleeve 87 and washers 101 are clamped in fixed (non-rotating) position relative to the lever bars 11a, 11b. The outer sleeve 89 is somewhat shorter than the inner sleeve 87 to provide gaps between the ends of the sleeve and the washers. The resilience of the bushing member 91 provides limited rotational and angular movement between the inner and outer sleeves 87, 89 of the bushing assembly to permit limited pivotal and angular movement between the respective beam 17, 19 and the lever 11. Angular movement of the outer sleeve 89 relative to the inner sleeve 87 of the bushing (caused by jackknife forces exerted on the beam) is limited by contact between the ends of the outer sleeve 89 and the hardened washers 101. The ends of the bushing member 91 are tapered to prevent undue rubbing of the bushing member against the washers 101.

It will be observed from the foregoing that the suspension beams 17, 19 are arranged in a push-pull orientation, that is, the forward beams are pushed forward and the rearward beams are pulled forward as the vehicle moves along the road. This arrangement eliminates the "dock walk" problem suffered by many conventional air-ride suspensions. Further, the use of the equalizing levers 11 equalizes the load between the wheels of the vehicle, thereby reducing axle torque while providing good roll stability. The pivot connections 23, 29 between the suspension beams and the hangers 9 reduce the number of parts used in conventional designs, thus allowing for a reduction in weight of the suspension and reducing wear.

While the suspension of the present invention is applicable to air-ride suspensions, it will be understood that any type of spring element may be used in lieu of an air bag. For example, the air springs are replaced by rubber springs of the type commercially available from Timbren Industries Inc. of Niagara Falls, N.Y., Model Aeon® 570 Rubber Spring support. Also, it will be understood that an equalizing lever of the present invention could comprise a single bar or the like pivotally mounted to a hanger. Similarly, the hangers, beams and other components of the suspension 1 could take other forms.

Figure 5:
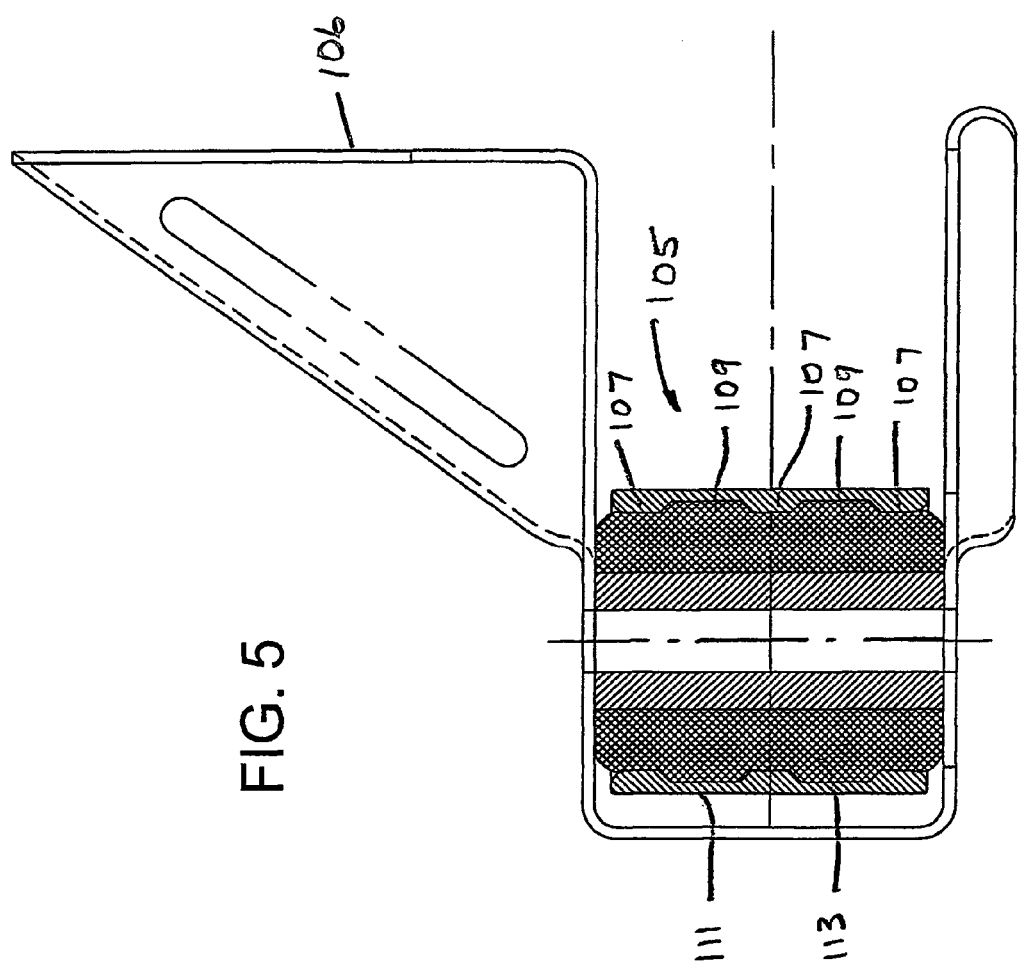
FIG. 5 is a cross-sectional view showing an alternative bushing connection between a suspension beam and one end of an equalizing lever.

FIG. 5 shows an alternative bushing assembly 105 for use in a connection between a flange 106 and a beam or between a lever (not shown) and a beam 17, 19. In this embodiment, interlocking ribs 107, 109 are formed on the inner surface of the outer sleeve 111 and on the outer surface of the bushing member 113 to prevent axial slippage between the two parts. The friction lock provided by these ribs 107, 109 should be sufficient to withstand the maximum lateral loads (e.g., 8000 lbs) applied to the axle during cornering of the vehicle. The ribs 107 on the outer sleeve 111 can be formed by machining the sleeve, or by roll forming. Further, the interference fit between the bushing member 113 and the outer sleeve 111 can be provided by means other than interlocking ribs.

Figure 6:
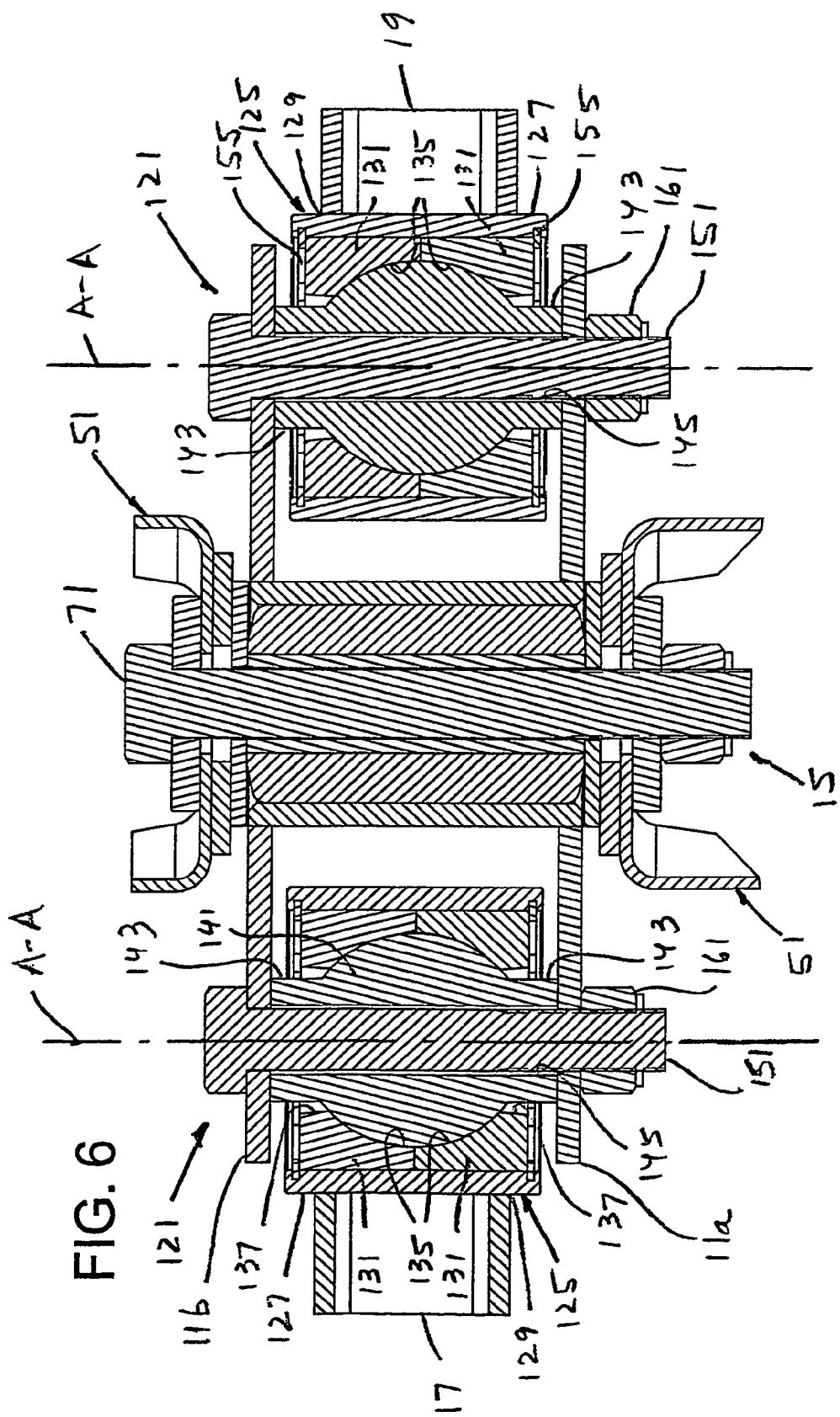
FIG. 6 is a sectional view similar to FIG. 4 showing ball joint connections between an equalizing lever and two suspension beams.
Figure 7:
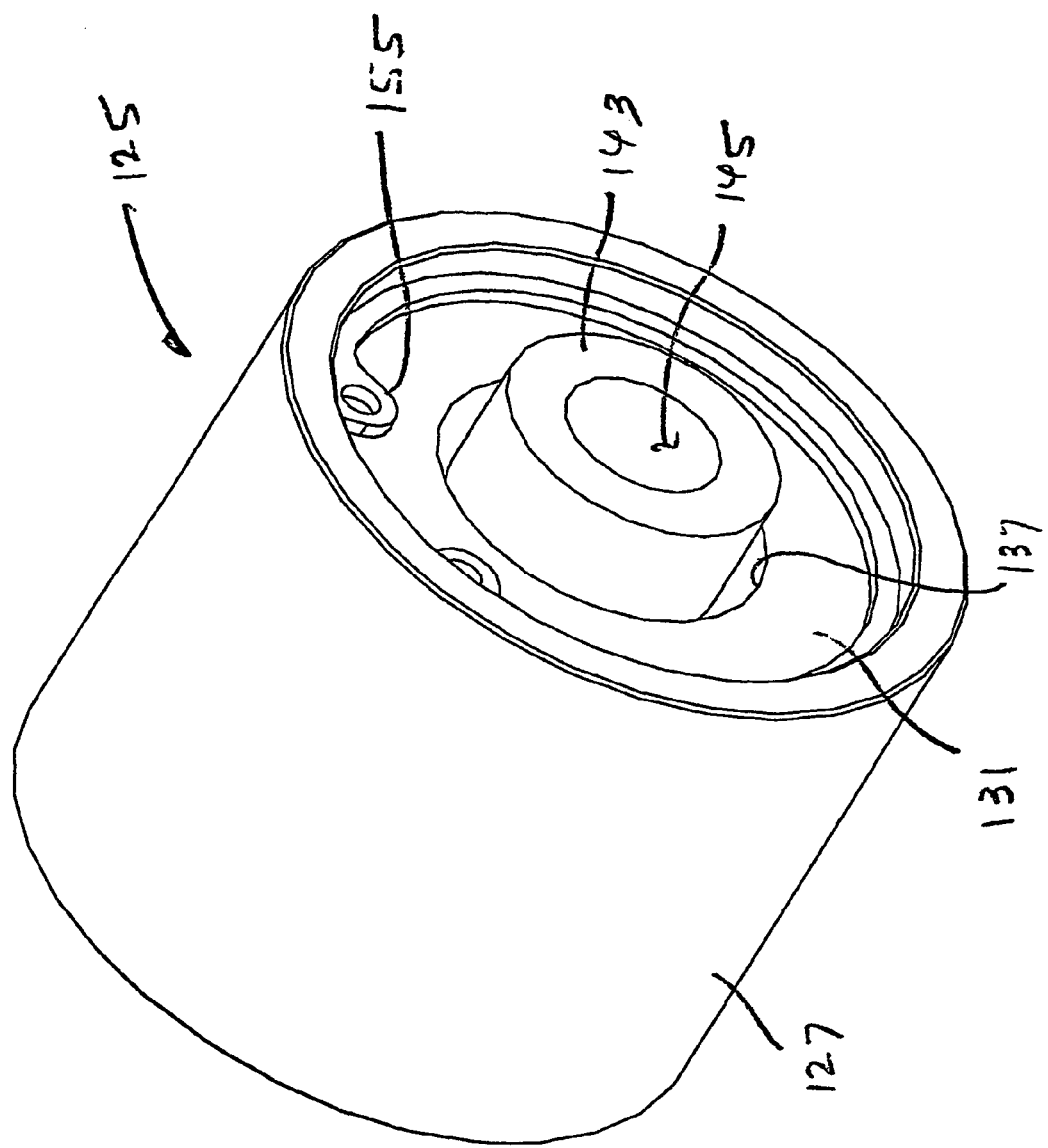
FIG. 7 is a perspective of one of the ball joints of FIG. 6.
Figure 8:
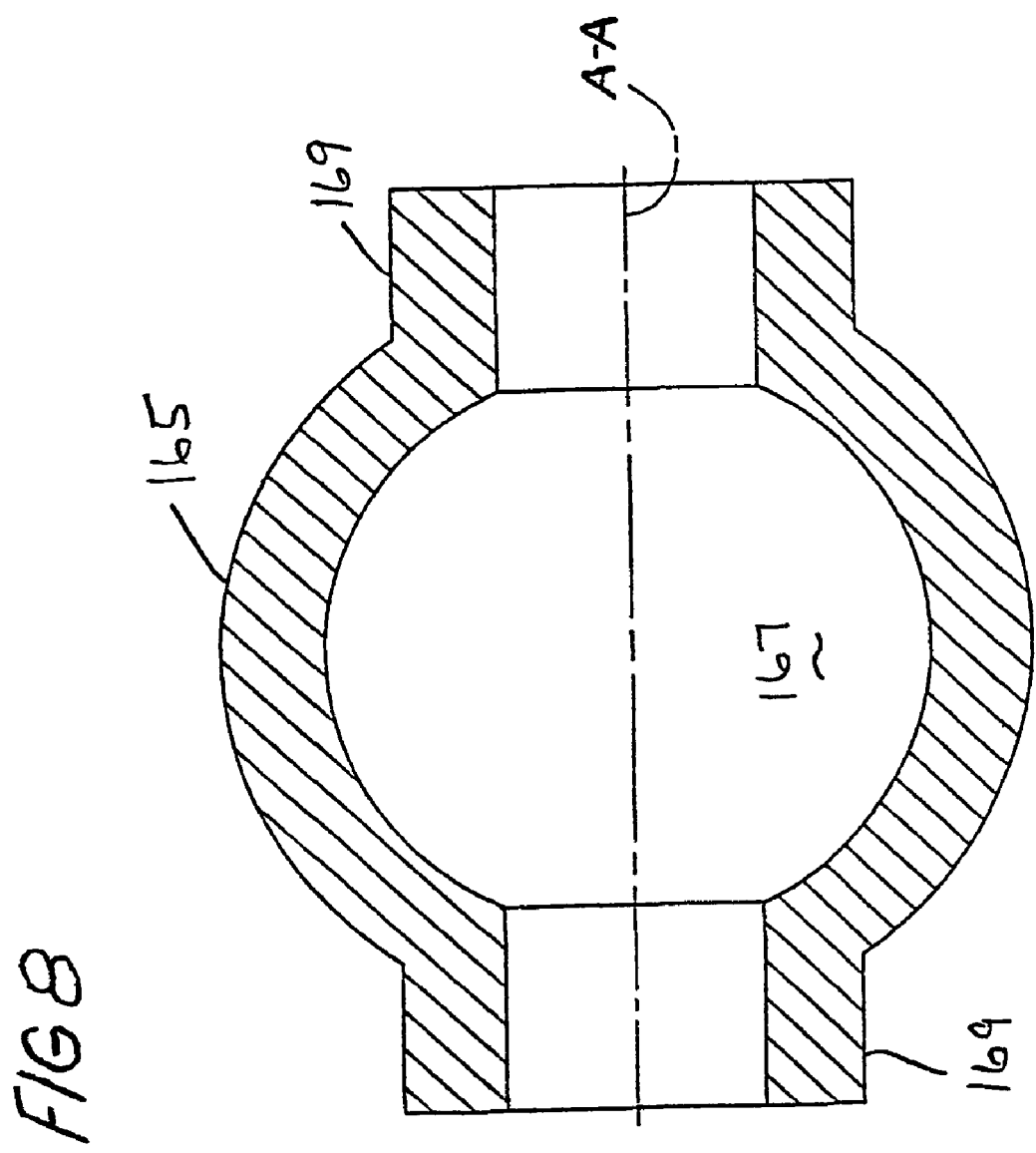
FIG. 8 is a sectional view of an alternative ball for the ball joints of FIG. 6.
Figure 9:
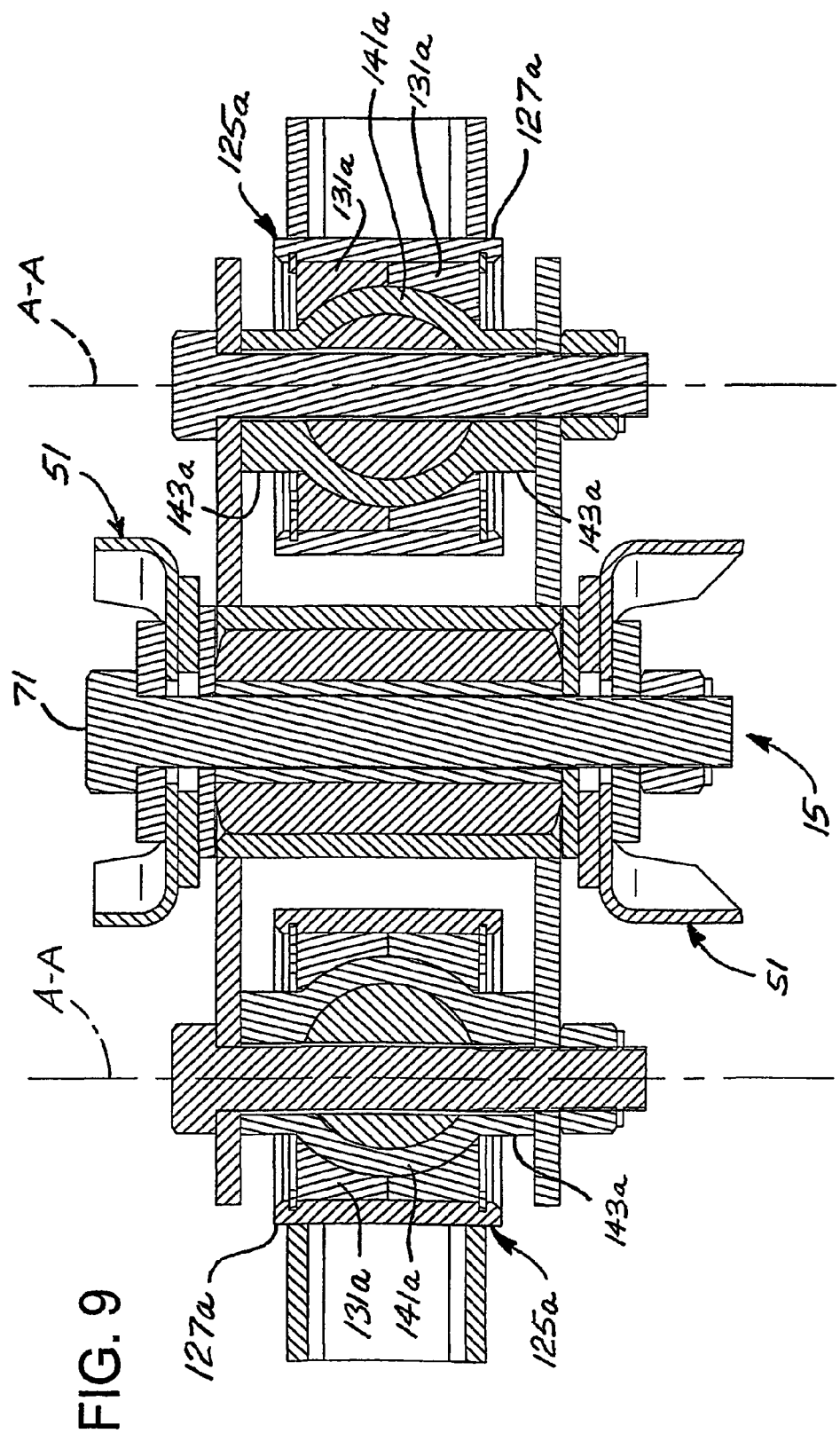
FIG. 9 is a sectional view similar to FIG. 6 showing eccentric ball joint connections.
Figure 10:
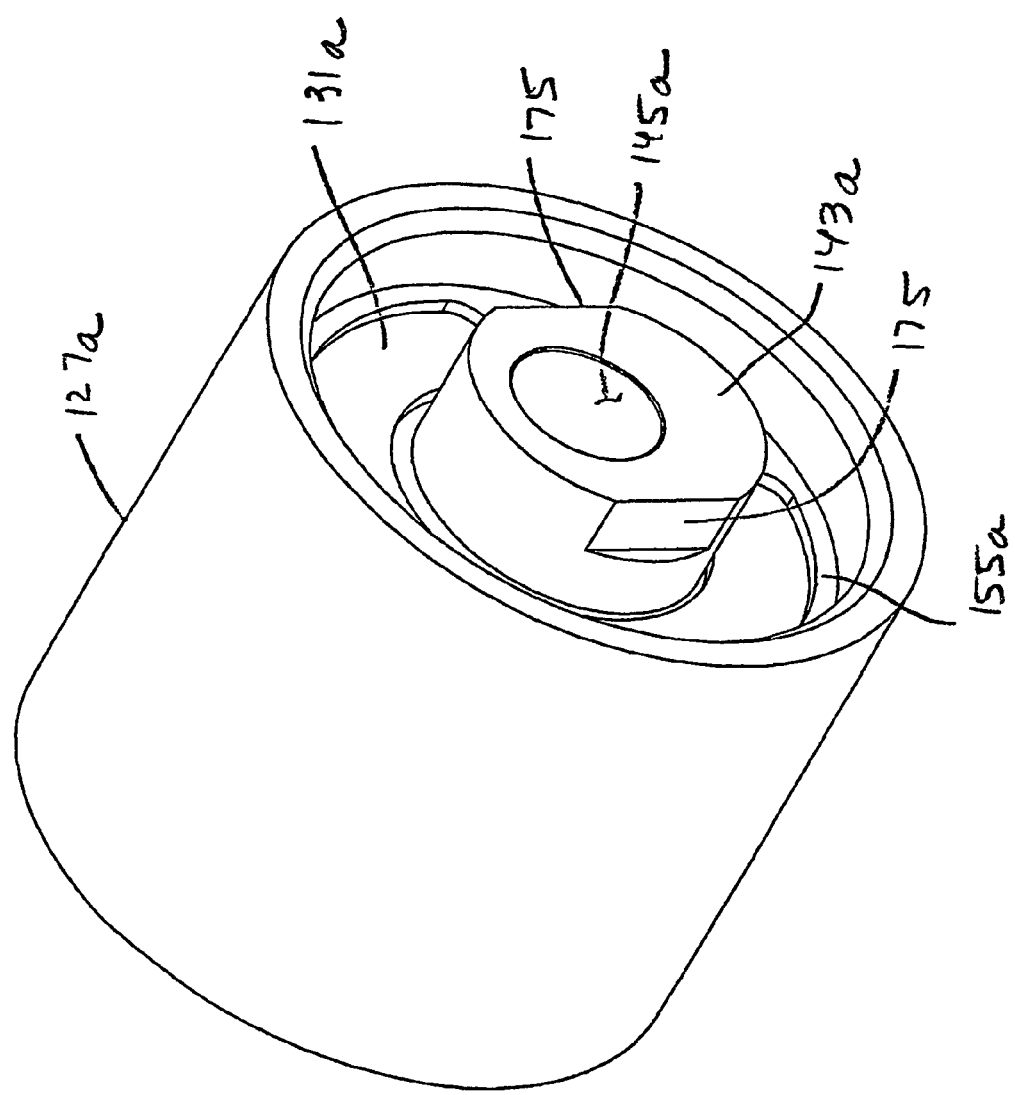
FIG. 10 is a perspective of one of the ball joints of FIG. 9.

FIGS. 6–8 illustrate a third embodiment of a pivot connection, generally designated 121, between a lever 11 and a beam 17, 19. In this embodiment, the pivot connection 121 comprises a ball joint designated in its entirety by the reference numeral 125. The ball joint comprises a hollow open-ended housing, and more particularly a cylindrical sleeve 127, e.g. a steel sleeve, extending transversely of the beam 17, 19 at its pivot end, secured thereto as by welding at 129. Inserted in the sleeve are two annular bushings 131, which may be made of powdered metal (sintered). Each bushing 131 has a part-spherical cavity such as indicated at 135 and an opening 137 in the outside thereof extending from its outside to the cavity. The bushings 131 are fitted tightly in the sleeve 127 with their inner sides engaging one another, defining a part-spherical ball seat. A ball 141, made of steel, for example, is rotatably seated in the seat (before the bushings are inserted in the sleeve). The ball 141 has two aligned tubular projections each designated 143 at opposite sides thereof which extend radially outward to some extent through the openings 137 in the bushings 131. A bore 145 through these projections, which may be termed "trunnions", and through the ball 141 define a transverse hole for a bolt 151. The bushings 131, 135 are held in the sleeve 127 by C-clips 155 snapped into internal annular grooves in the sleeve. In the ball joint 125, the bushings 131, the ball 141, and the tubular projections or trunnions 143 are coaxial with the sleeve 127, the axis thereof (indicated at A—A in FIG. 6) being diametrical with respect to the ball seat and the ball 141, and extending centrally through the hole 145. The pivot bolt 151 and a nut 161 thereon hold the ball joint in position with the ends of the trunnions 143 clamped immovably against respective bars 11a, 11b of the equalizing lever. The ball joints 125 allow relative pivotal movement between the beams 17, 19 and the equalizing lever 11, both in a vertical plane and laterally with respect to this plane (to a limited extent).

FIG. 8 shows an alternative design where the ball 165 of the ball joint is hollow, as indicated at 167. In this embodiment, the center of the hollow 167 is preferably aligned with the axis A—A of the tubular projections 169.

Figure 11:
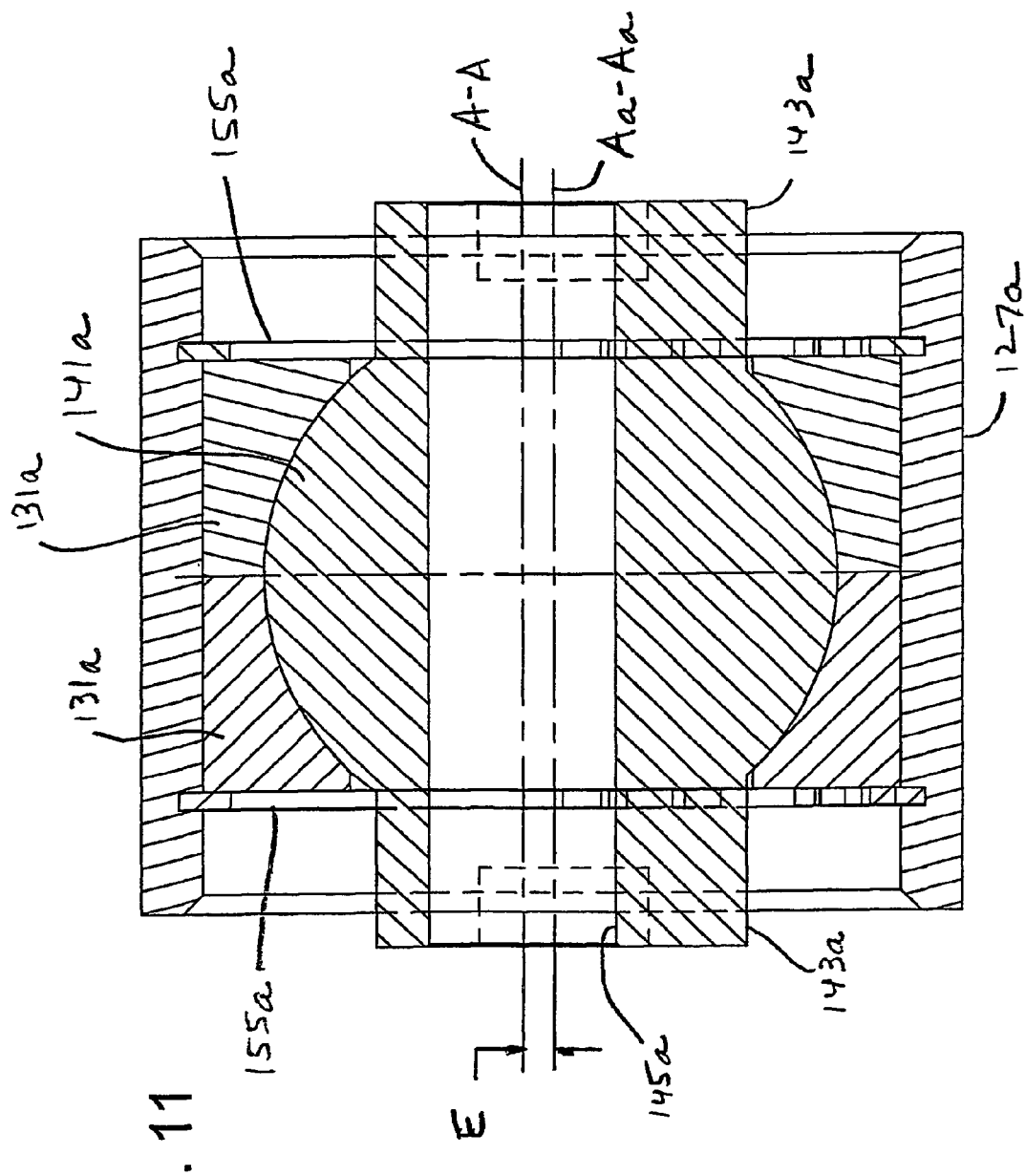
FIG. 11 is a sectional view of the ball joint of FIG. 9.
Figure 12:
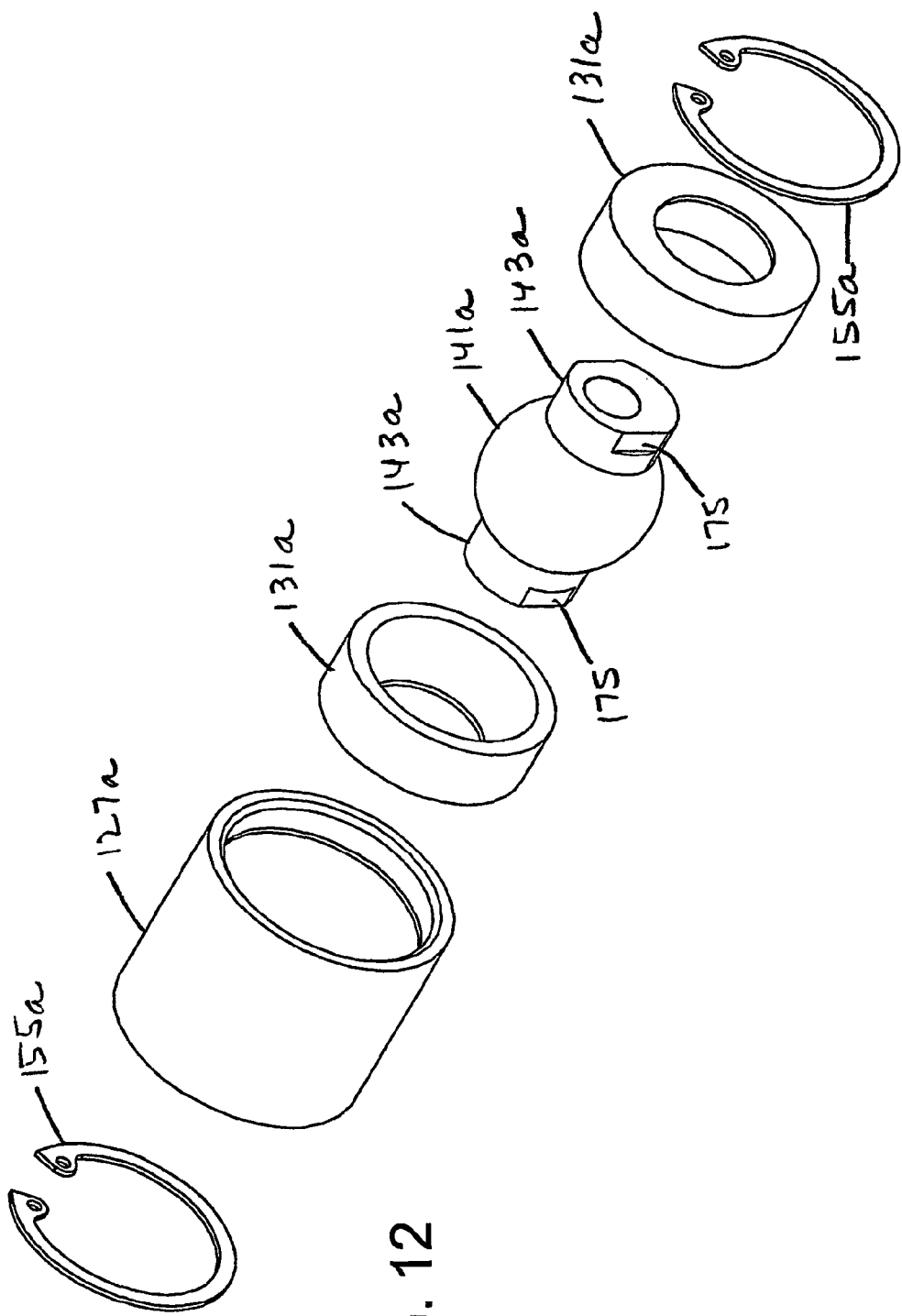
FIG. 12 is an exploded view of the ball joint of FIG. 9.

FIGS. 9–12 illustrate a modification of the ball joint, designated 125a in its entirety, having parts generally corresponding to those of ball joint 125 and designated by the same reference numerals as used for ball joint 125 with the subscript a (e.g. sleeve 127a). The modification 125a differs from 125 primarily in that the tubular projections or trunnions 143a (143 in ball joint 125) are on an axis Aa—Aa offset in relation to the diameter A-A of the ball shown in FIG. 11, and in that is formed with flats 175 (FIG. 10) on each of the tubular projections or trunnions 143a for application of a wrench for turning the ball 141a relative to the ball seat formed by the bushings 131a. The bolt hole 145a in the ball 141a and trunnions 143a is on axis A—A, which is offset (eccentric) with respect to the center line of the trunnions (which is line Aa—Aa as shown in FIG. 11. The arrangement, with the ball 141a thus mounted eccentrically in the seat to the extent indicated at E in FIG. 11, allows for fore and aft adjustment of the beam 17, 19 on which the ball joint is mounted for fore and aft adjustment of the respective end of the axle carried by the beam to attain precise alignment of the axle transversely of the vehicle.

Referring to FIGS. 13–20, each axle support 41 comprises a pair of side seats each generally designated 201 on opposite sides of a respective beam 23, 29 intermediate the ends of the beam. In one embodiment, the side seats 201 are integral steel castings each having a generally vertical leg 205 affixed (e.g., welded) to a respective side wall 207 of the beam, and a generally horizontal leg 209 having an outboard section 211 extending laterally outboard of the beam and an inboard section 213 extending laterally inboard of the beam, the inner edges of the two inboard sections being relatively closely spaced over the top wall 217 of the beam. The generally horizontal leg 209 of each side seat 201 has an axle-supporting surface 221, preferably contoured (e.g., rounded) to match the contour of the axle 27, 33. The axle 27, 33 is immovably held on these axle-supporting surfaces 221 by suitable fasteners, such as a pair of U-bolts 241 having threaded ends which extend down through holes 243 in the outboard sections 211 of the side seats, and nuts 245 tightened up on the U-bolts. Washers 247 are provided between the nuts and the undersides of the castings. The axle is thus supported by these side seats 201 at locations outboard of the beam on opposite sides of the beam, thereby reducing the bending stresses on the axle compared to prior designs where the axle is supported more inboard with respect to the beam. Significantly, the axle is not welded to the side seats 201, at least in the embodiment shown in FIGS. 13–20, thereby avoiding stress risers in the axle at these locations. The U-bolts 241 may be of the type which can be tightened and loosened, or lockbolts which, once tightened, remain permanently secured. Suitable lockbolts are commercially available from Huck International Inc. of Waco Tx. under the trade mark "U-Spin". Other types of U-bolts or mechanical fasteners may be used.

Figure 13:
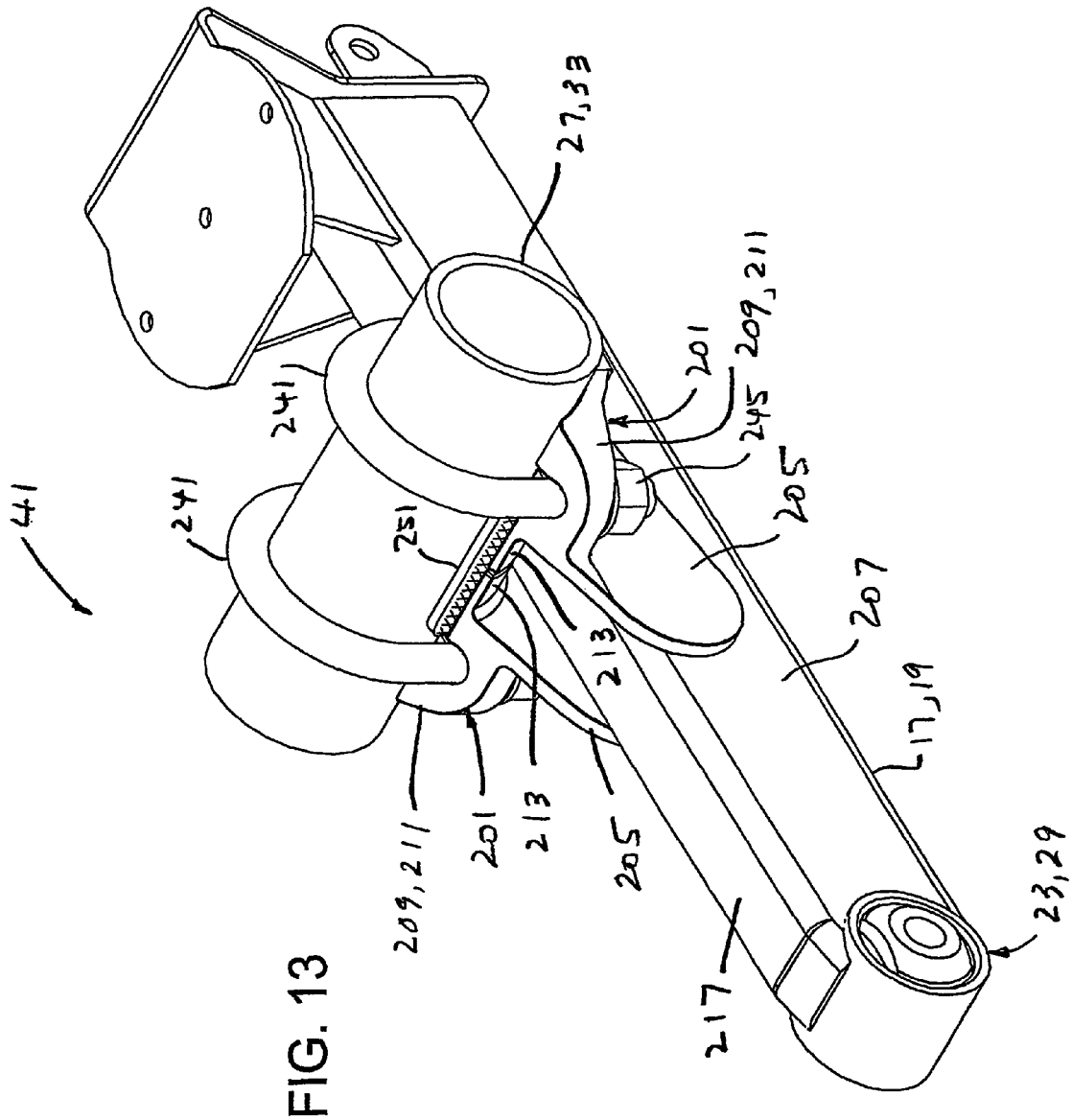
FIG. 13 is a top perspective of an axle support on a suspension beam.
Figure 14:
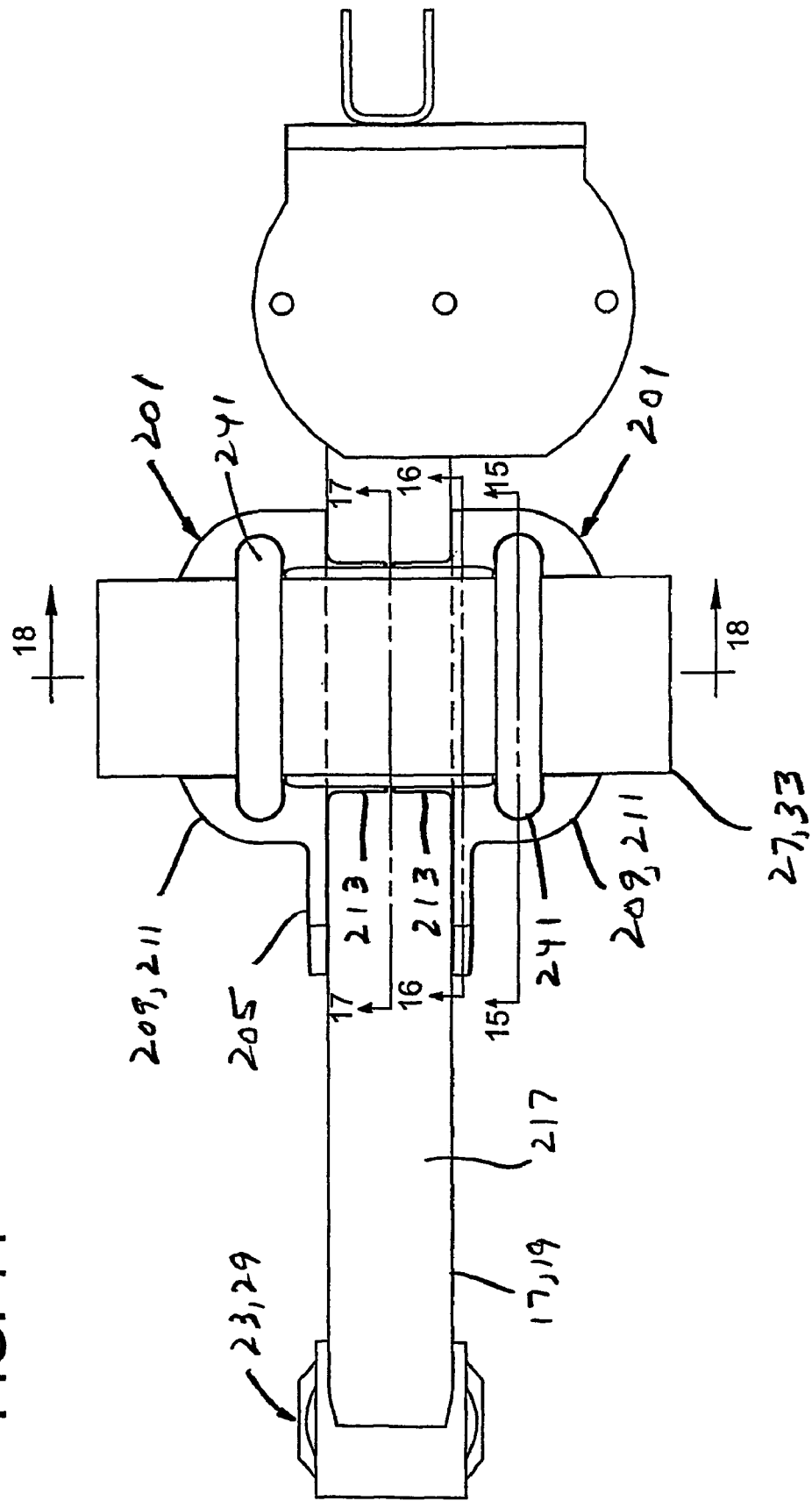
FIG. 14 is a top plan view of the axle support and beam of FIG. 13.
Figure 15:
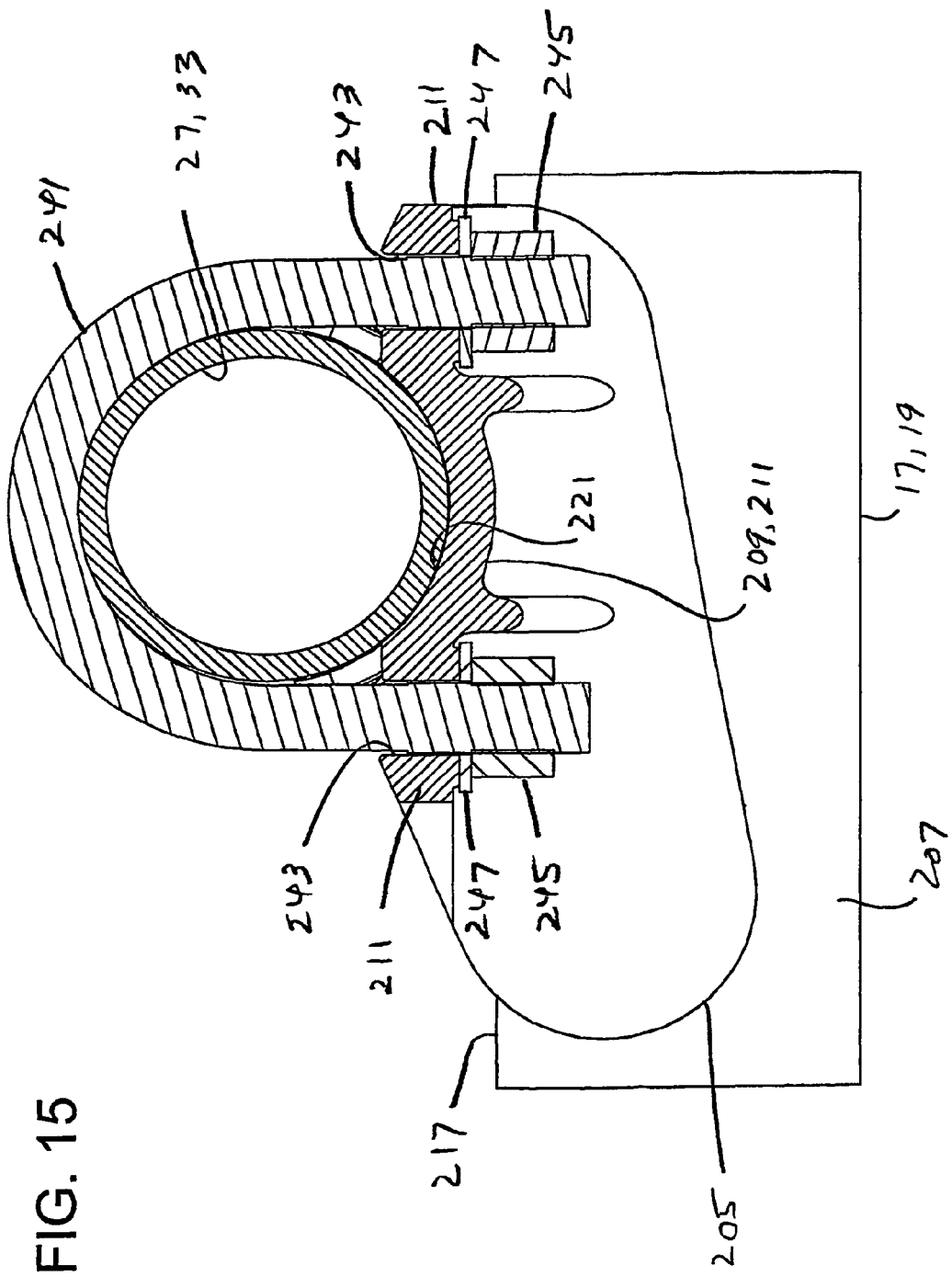
FIGS. 15–18 are sectional views taken on in the planes of lines 15—15, 16—16, 17—17 and 18—18, respectively, on FIG. 14.
Figure 16:
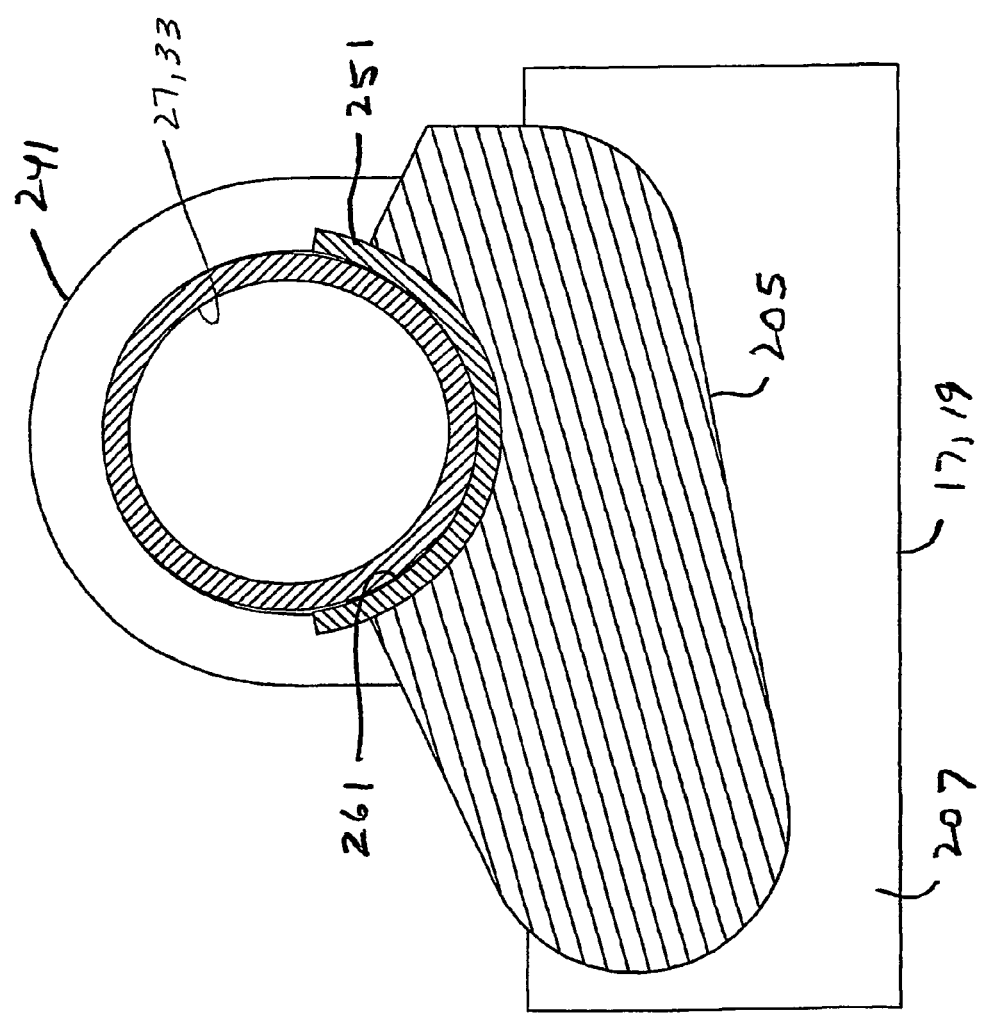
Figure 17:
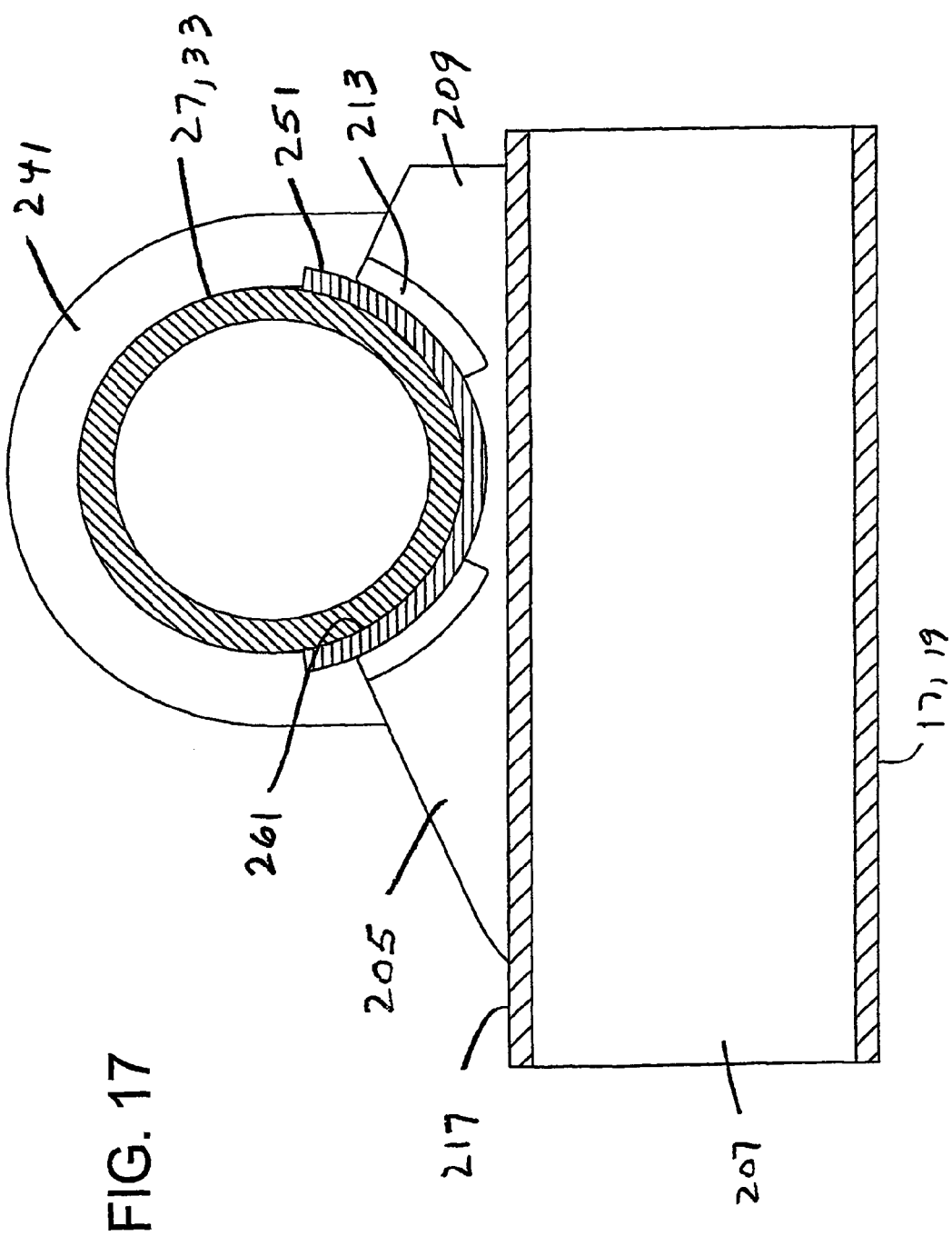

Referring again to FIGS. 13–20, the axle support 41 preferably further comprises a center axle seat 251 bridging the two side seats 201 generally between opposite sides 207 of the beam. In one embodiment (see FIGS. 19 and 20), the center seat 251 comprises a one-piece member formed from metal plate having a pair of end sections 251a connected by a center section 251b of reduced width, thereby providing four shoulders 255 at the corners of the member, the shoulders being received in notches 257 in the side seats. The center seat 251 has an axle supporting surface 261, also contoured to match the contour of the axle. By way of example, and not limitation, the center seat may be a stamped steel plate having a thickness of about 0.31 in. The center seat sits down in recesses 265 formed in the inboard sections 213 of the side seats 201 so that the axle-supporting surface 261 of the center seat is flush with the axle-supporting surfaces of the 211 of the side seats, as shown best in FIG. 18. The center seat 251 is preferably welded to the inboard sections 213 of the side seats 201, as indicated in FIG. 13.

Figure 18:
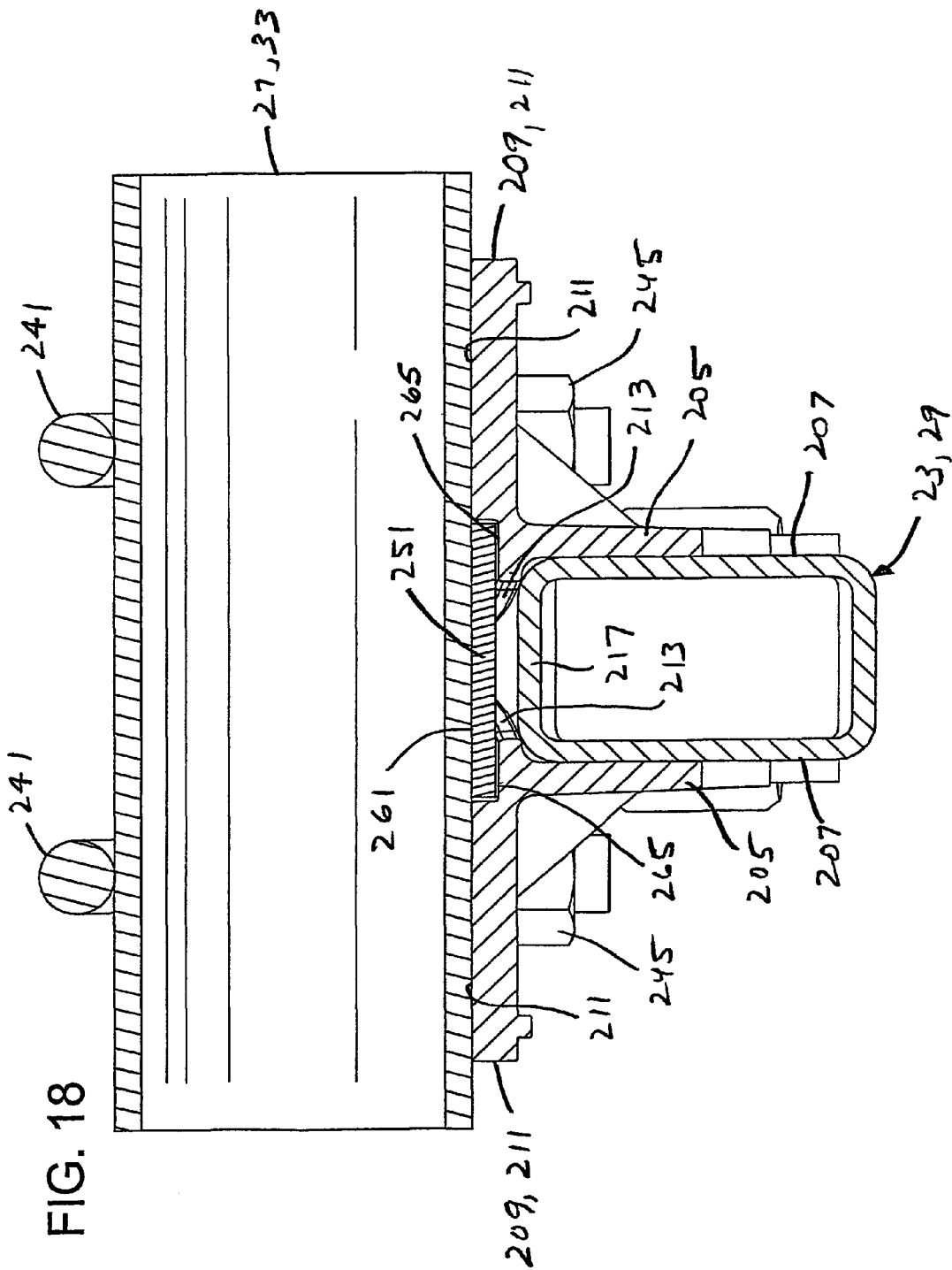
Figure 19:
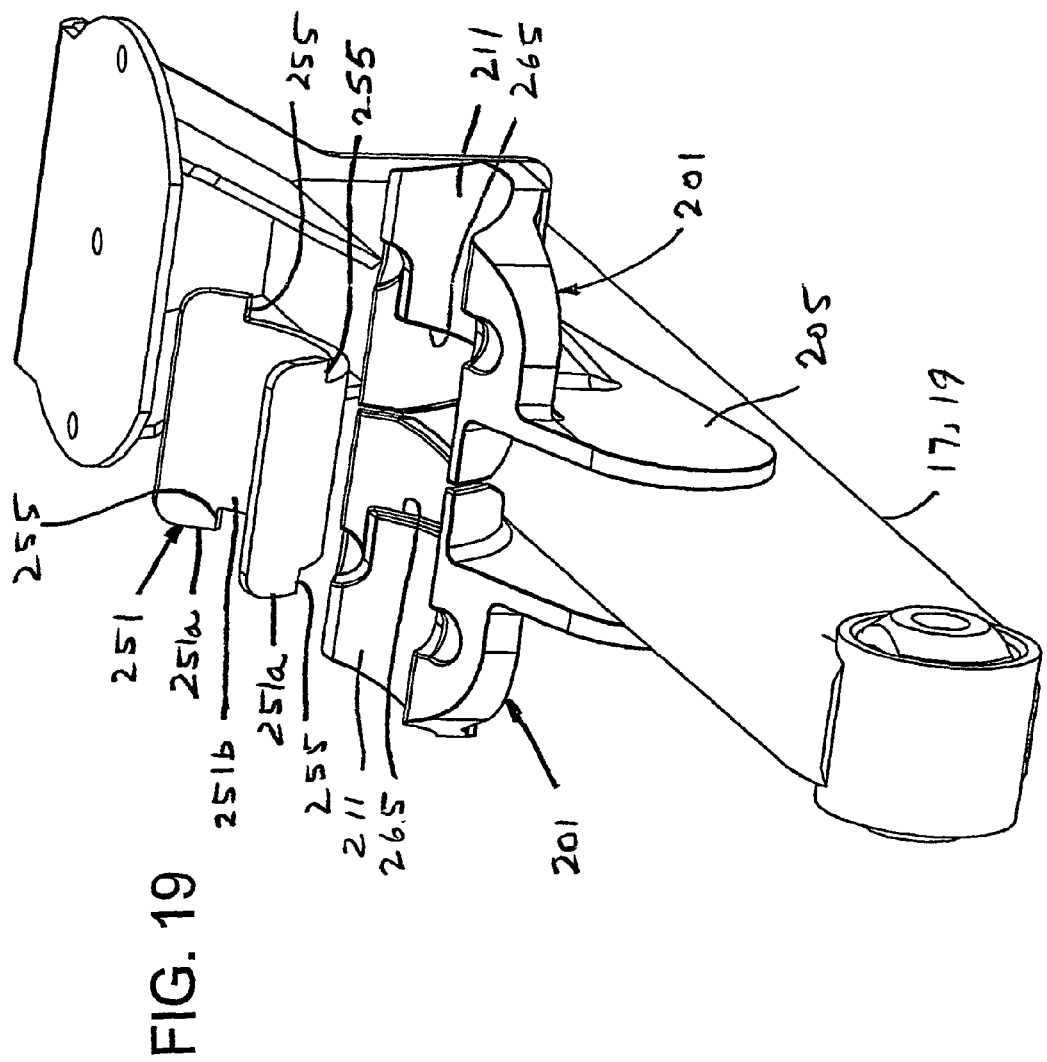
FIG. 19 is a perspective view similar to FIG. 13 but without the axle and showing certain parts exploded to illustrate details of the axle support.
Figure 20:
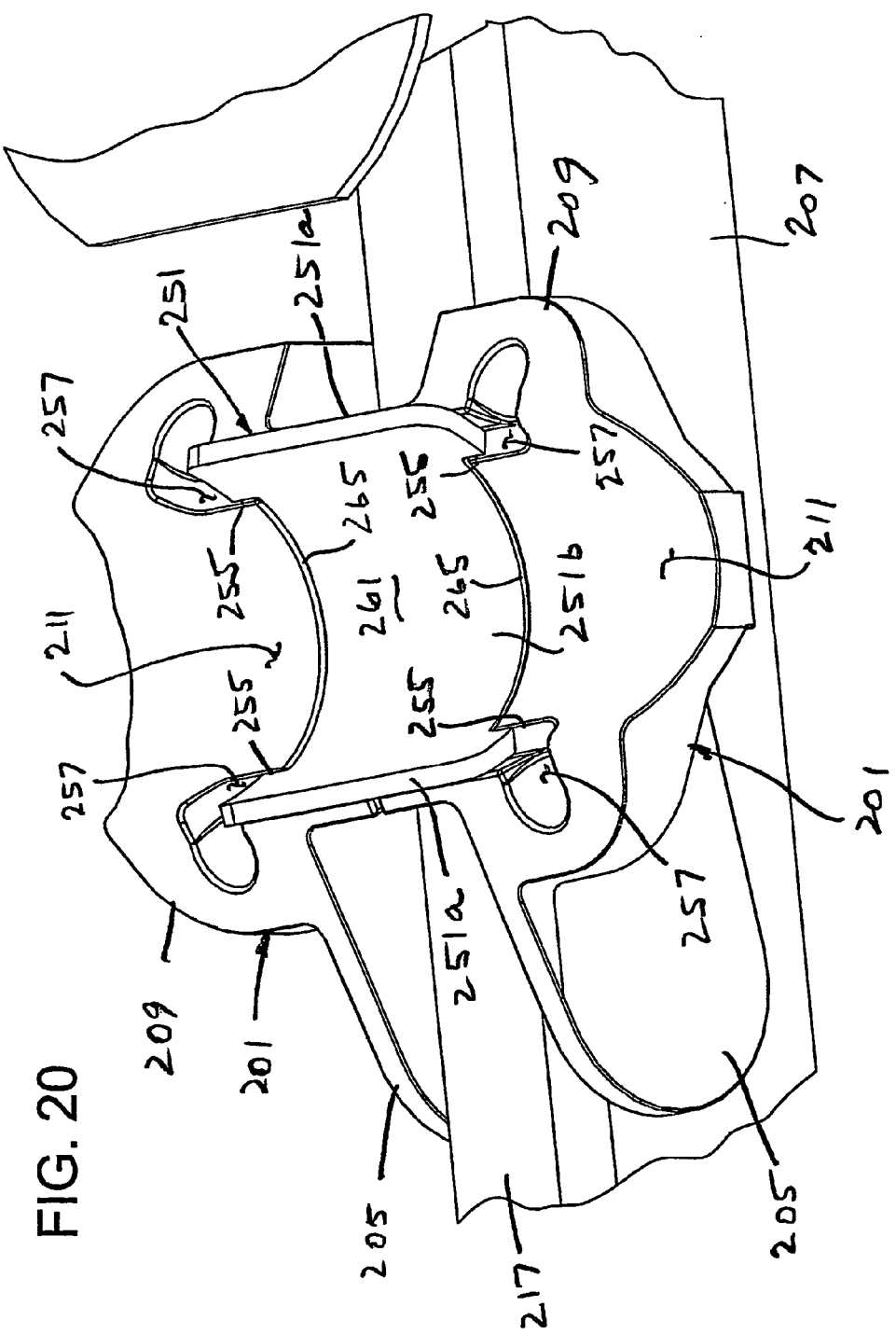
FIG. 20 is an enlarged perspective of a portion of FIG. 19 showing features of the axle support.
Figure 21:
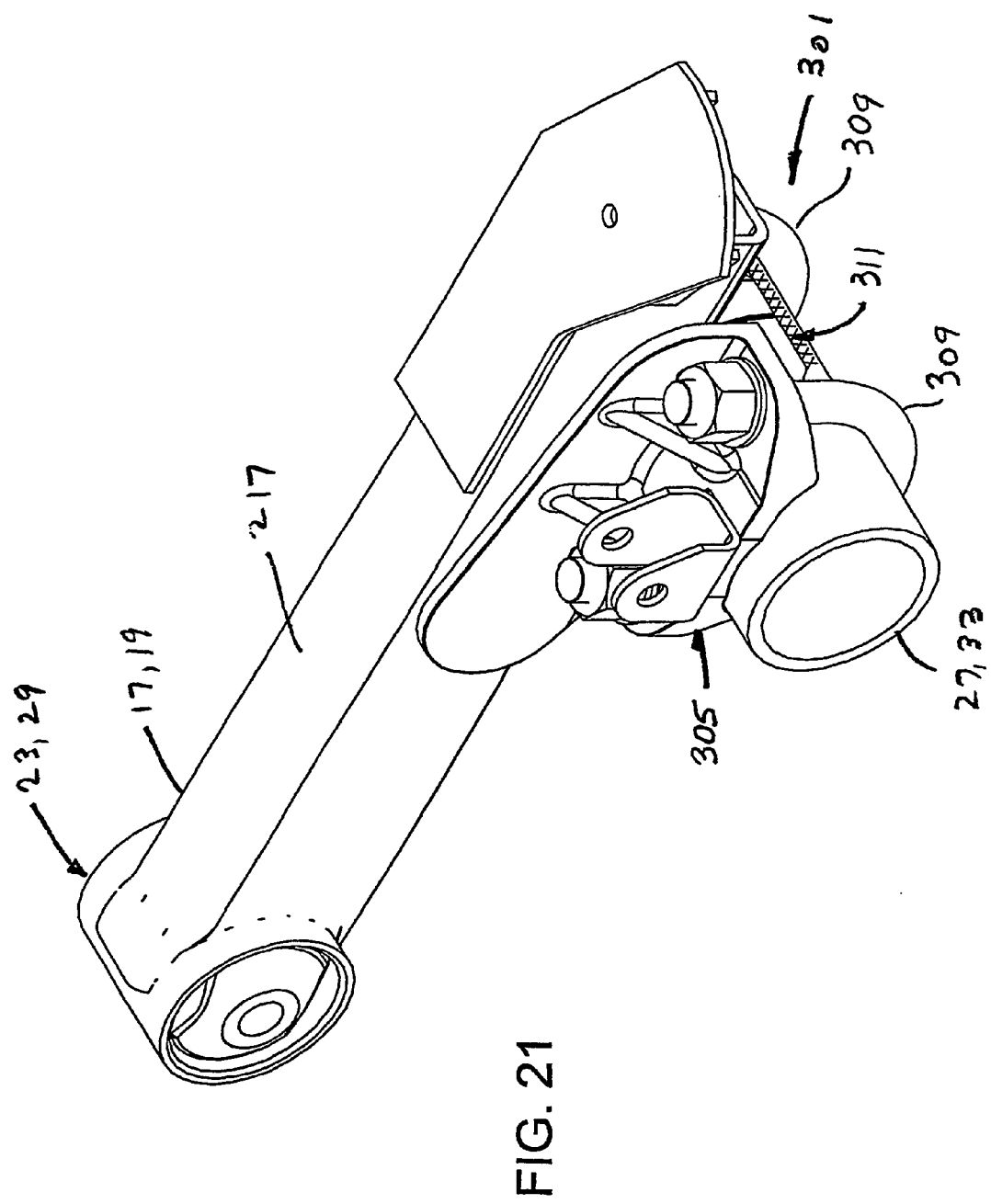
FIG. 21 is a top perspective showing an alternative axle support.
Figure 22:
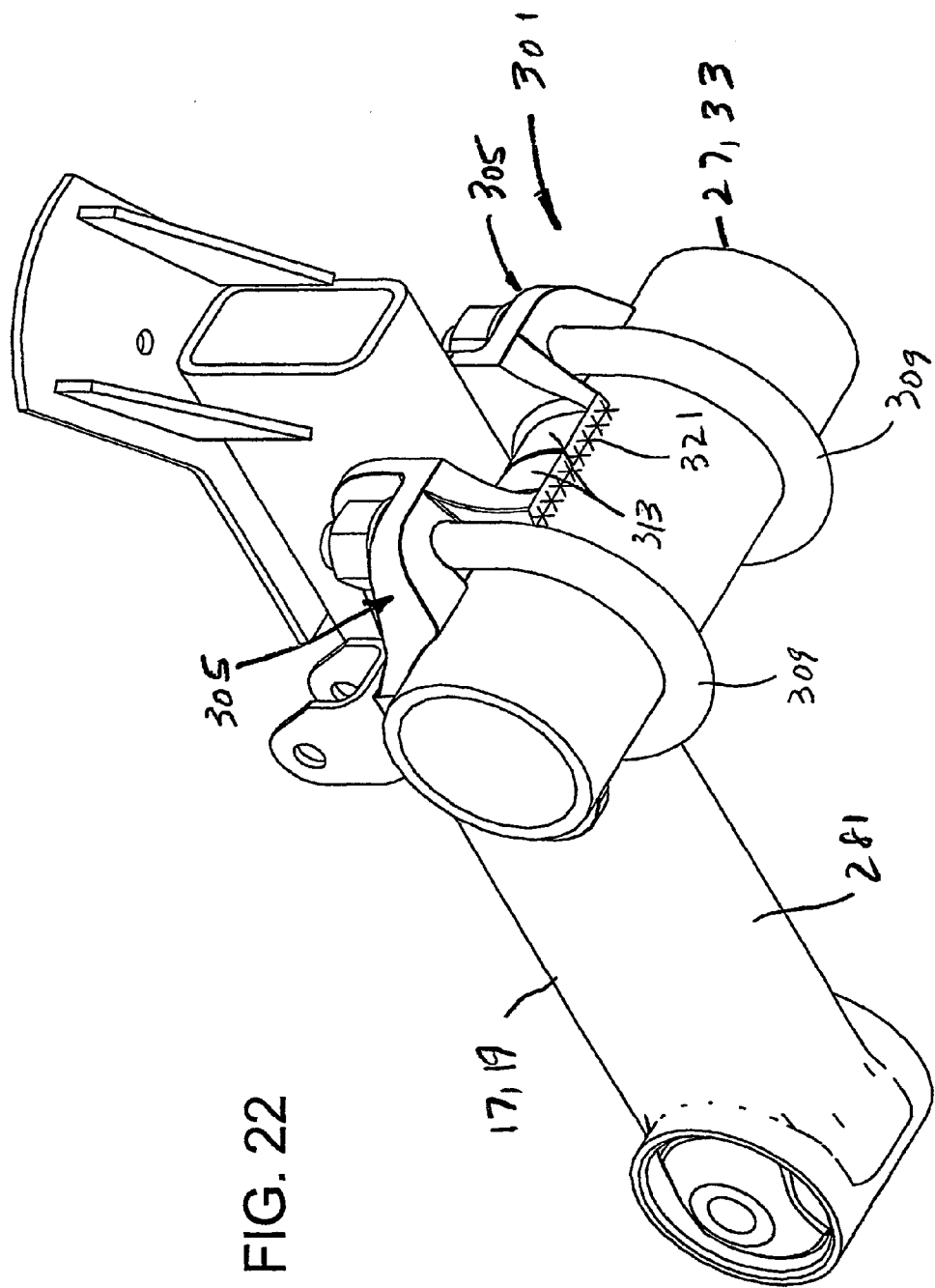
FIG. 22 is a bottom perspective of the axle support of FIG. 21.
Figure 23:
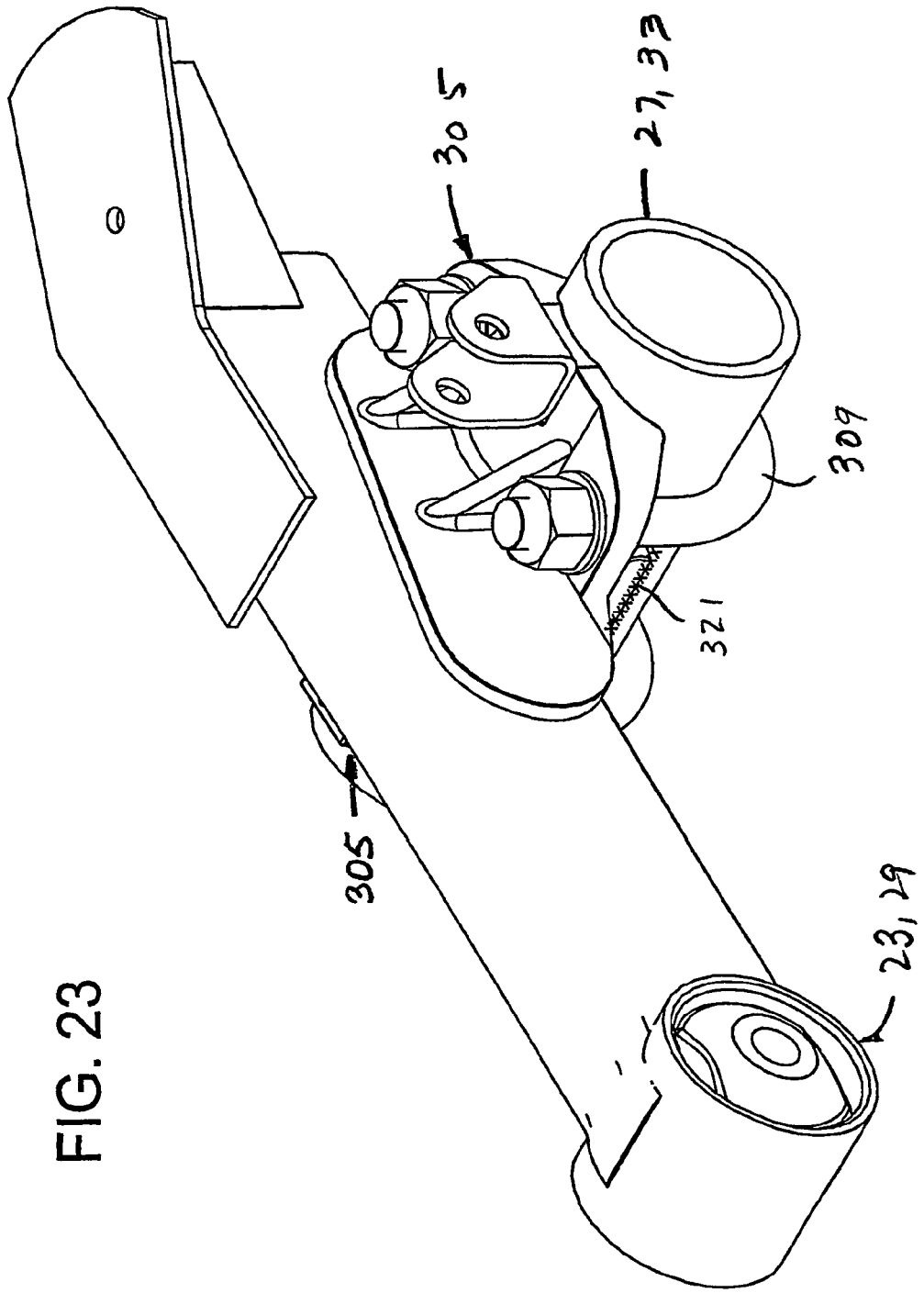
FIG. 23 is a another top perspective of the axle support of FIG. 21, taken from a different vantage point.
Figure 24:
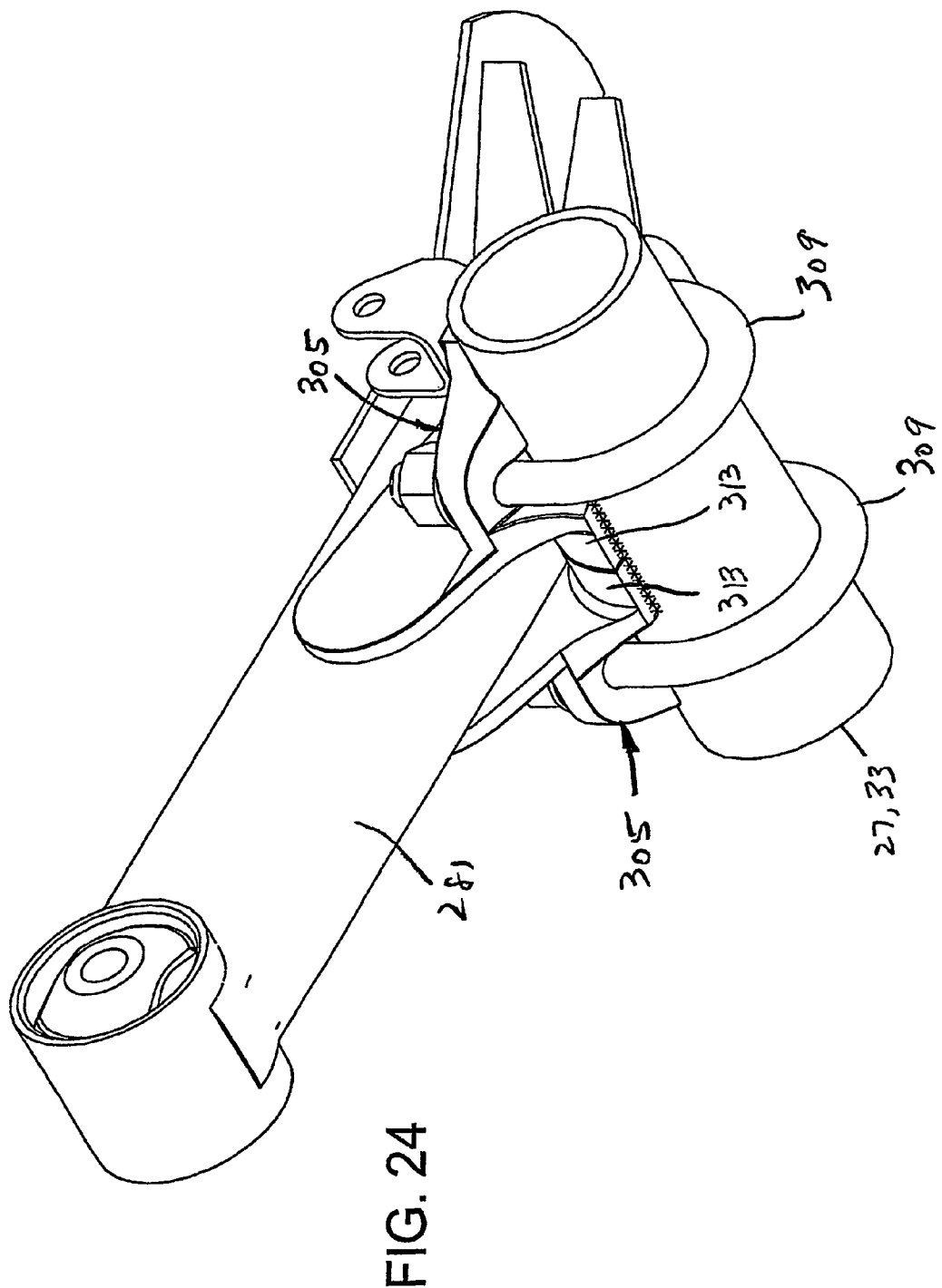
FIG. 24 is another bottom perspective of the axle support of FIG. 21, taken from a different vantage point.
Figure 25:
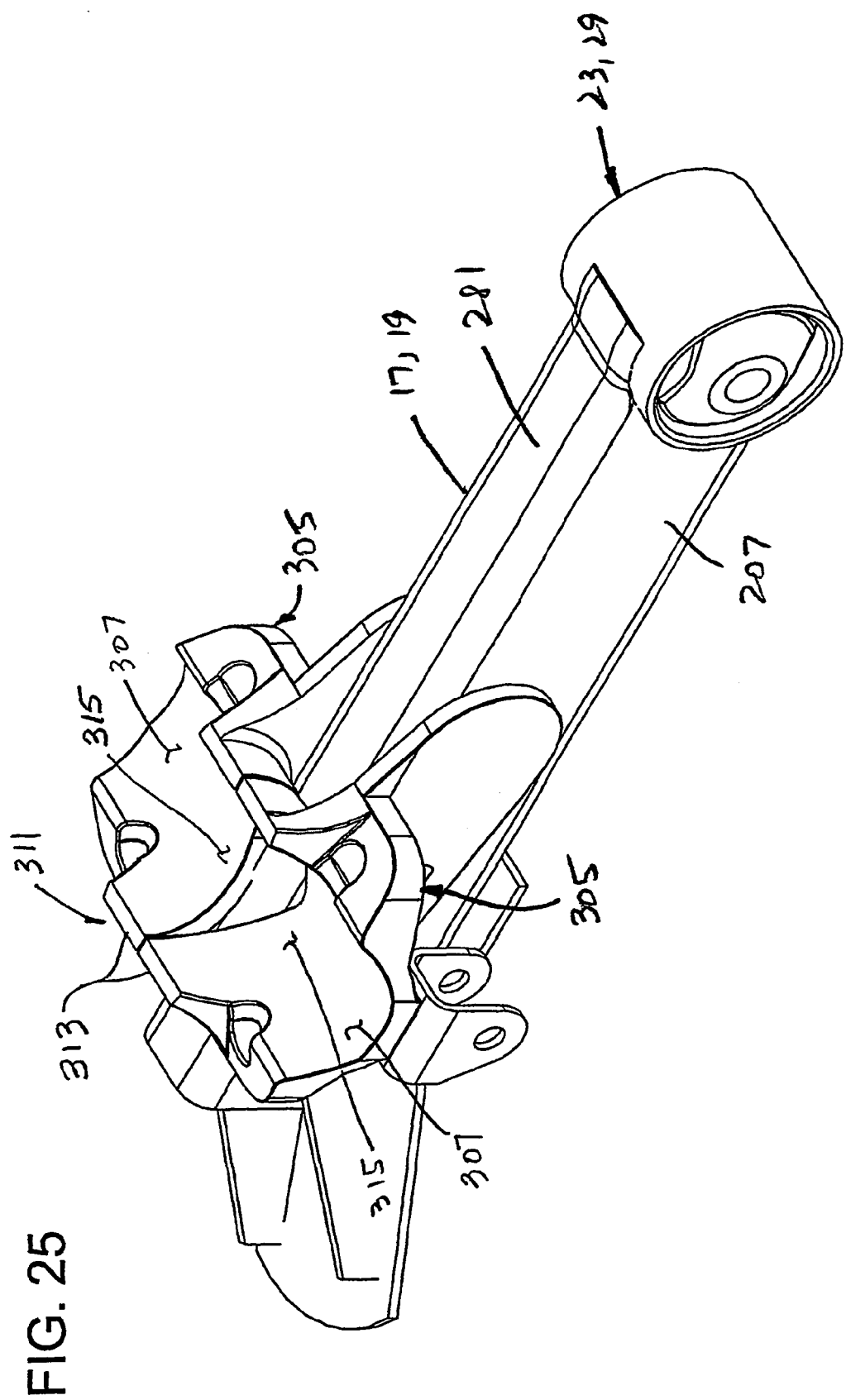
FIG. 25 is a perspective view of the assembly of FIG. 21 turned upside down and with the axle removed to better illustrate the axle support.

FIGS. 18–20 illustrate the steps involved in assembling the center and side seats 209, 251. FIG. 20 shows the center seat 251 in place prior to installation of the axle, the shoulders 255 of the center seat being received in the notches 257 in the side seats 201. After installing and tightening the U-bolts 241 (FIG. 18), the axle-supporting surface 261 of the center seat should have a curvature and be at a level which closely coincides with the curvature and level of the axle-supporting surfaces 221 of the side seats 201. To provide additional resistance against rotation of the axle 27, 33 relative to the beam 25, 29, the axle is preferably rigidly affixed to the center seat 251, as by a suitable adhesive, such as an anaerobic adhesive made by Locktite Corporation providing a shear strength of 4,000 psi. The use of adhesive is advantageous over welding, for example, because it avoids stress risers in the axle, thereby allowing the axle to be made of lighter (e.g., thinner wall) tubing.

In the embodiment of FIGS. 13–20, the side and center seats 201, 251 combine to support the axle over a greater length of the axle (compared to prior art designs), thereby reducing axle stress. However, it is contemplated that the side seats 201 may be used without the center seat 251. Further, the side seats 201 may have configurations other than as shown in the drawings. For example, one or both of the inboard sections 213 of the side seats could be eliminated. Also, the outboard section 211 of one of the seats 201 could be eliminated. Further, the axle can be adhesively secured to the axle-supporting surfaces 221 of the side seats 201, regardless of the presence of a center seat 251.

While the axle supports 41 described above support the axles 27, 33 above the beam 17, 19, the same supports 41 can be used to support the axles under the beam in an underslung fashion, as will be understood by those skilled in this field.

FIGS. 21–25 illustrate an alternative axle support, generally designated 301, supporting an axle 27, 33 below the bottom wall 281 of a suspension beam 17, 19. The support 301 is generally similar to axle support 41 in that it comprises a pair of side seats, each designated 305 and each having axle-supporting surfaces 307 contoured to match the shape of the axle. The side seats 305 extend laterally outboard of the beam on opposite sides of the beam. U-bolts 309 or other mechanical fasteners clamp the axle in place. The support 301 also has a center seat, generally designated 311, but of different construction than the center seat 251 of axle support 41. In this embodiment, the center seat 311 comprises two inboard seat members 313 formed (in one embodiment) by integral extensions of the side seats 305, similar to two inboard side seat sections 213 of axle support 41, but without the recesses 265. The inboard seat members 313 have axle-supporting surfaces 315 (FIG. 25) contoured to match the shape of the axle. In one embodiment, the axle-supporting surfaces 307, 315 of a side seat 305 and its adjacent inboard seat member 313 combine to provide a continuous uninterrupted area for supporting the axle, as shown best in FIG. 25. Each center seat member 313 is preferably formed as an integral part of a respective side seat member 305, but it will be understood that they could be formed as separate parts, with the center seat members being attached to the beam, for example. Also, the center seat members 313 could be formed as a single one-piece casting, for example. Regardless of how the center seat members 313 are constructed, it is preferable that the axle be welded to the center seat members, as indicated at 321 in the drawings (e.g., FIGS. 22 and 23), to assist in holding the axle against rotation. The stress risers in the axle caused by these welds are minimized because of the location of the welds generally inboard of the sides of the beam and between the two U-bolts 309.

Axle support 301 can be used to support an axle above a suspension beam as well as below the beam.

Figure 26:
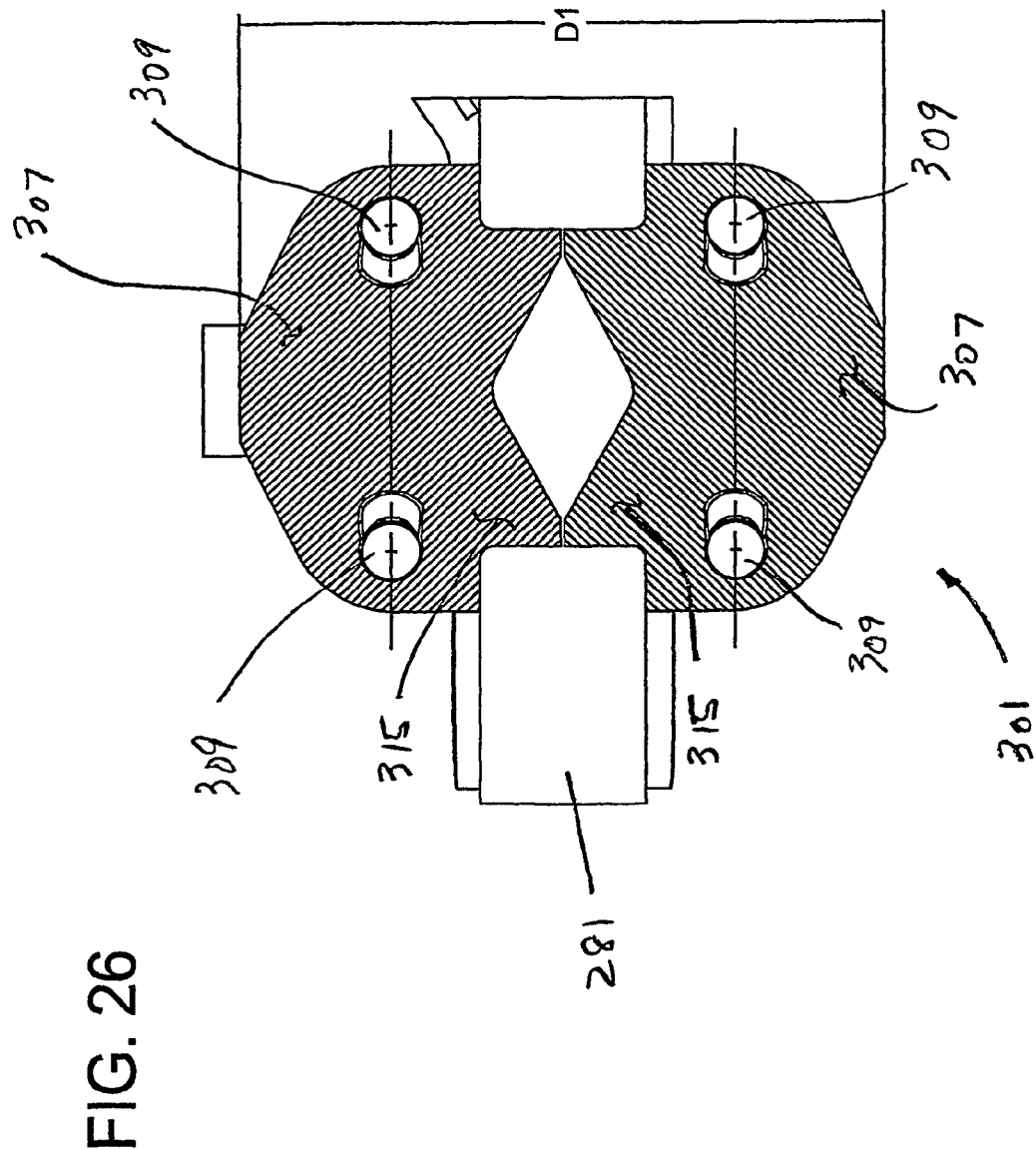
FIG. 26 is a schematic view showing the axle support area of the design of FIG. 21.
Figure 27:
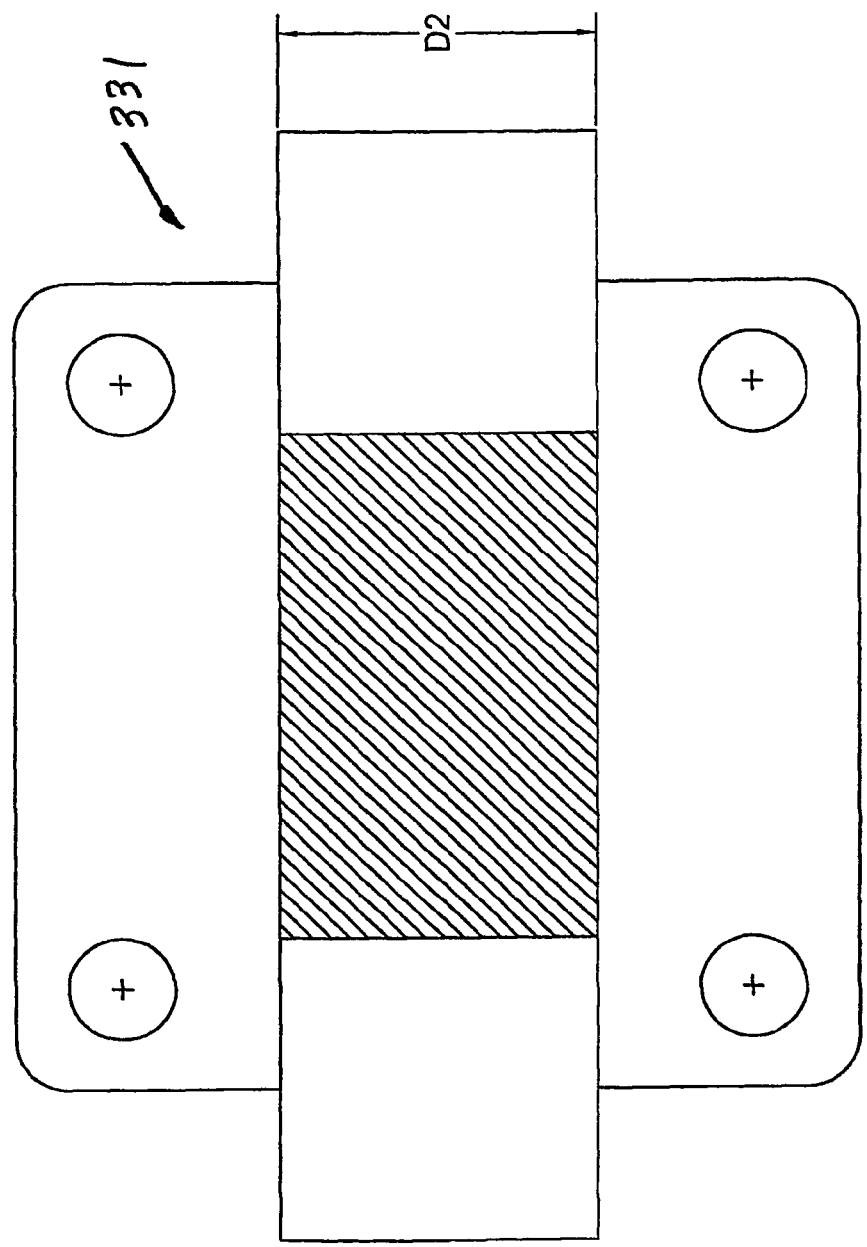
FIG. 27 is a schematic view showing the axle support area of a prior art design.

Like axle support 41, axle support 301 is advantageous for various reasons. For example, compared to prior axle supports, the extension of the area of axle support to locations outboard of the beam, and even outboard of the U-bolts, increases the area of axle support and decreases the bending stresses on the axle. This is best illustrated by comparing FIG. 26, schematically representing axle support 301, and FIG. 27 schematically representing a conventional axle support, generally designated 331. The areas providing axle support are shaded in both Figures. It is apparent that the area provided by support 301 is substantially greater, since the support extends outboard of the beam and thus has a relatively large overall dimension D1 in a direction taken transverse to the centerline of the vehicle. In contrast, the prior art support 301 provides support inboard of the beam only, and has an overall transverse dimension D2 less than D1. (By way of example, D1 may be in the range of 10–12 in., whereas D2 is typically in the range of 5–8 in.) As a result, the bending stresses on the axle are reduced significantly when support 301 is used, which enables the axle to be made of lighter construction (e.g., reduced wall thickness).

Figure 28:
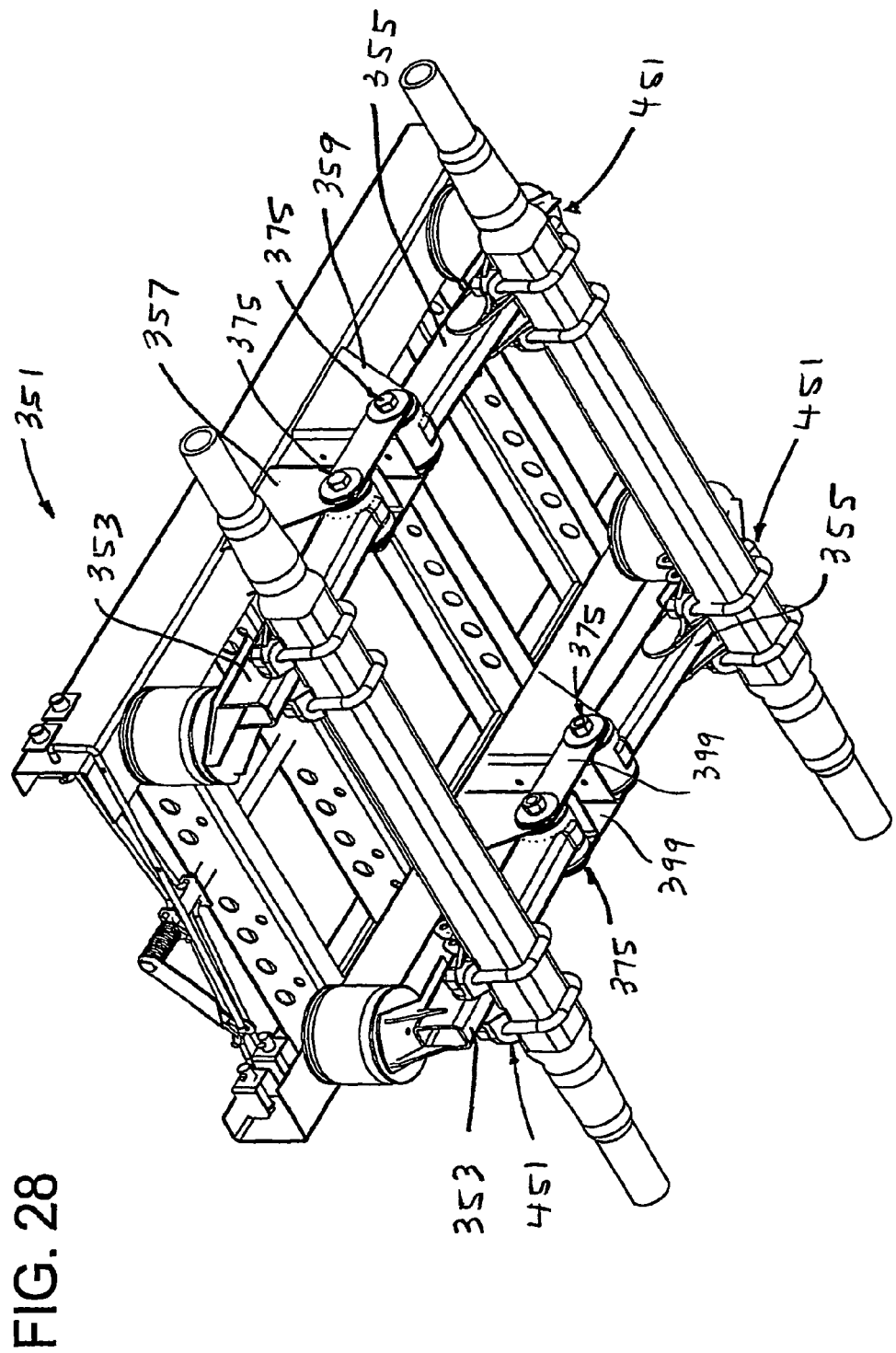
FIG. 28 is a perspective of another embodiment of the suspension in which the equalizing levers are eliminated and in which the suspension beams at each side of the frame are pivoted on hangers and connected by a spacer bar for maintaining the distance between the pivot points fixed.
Figure 29:
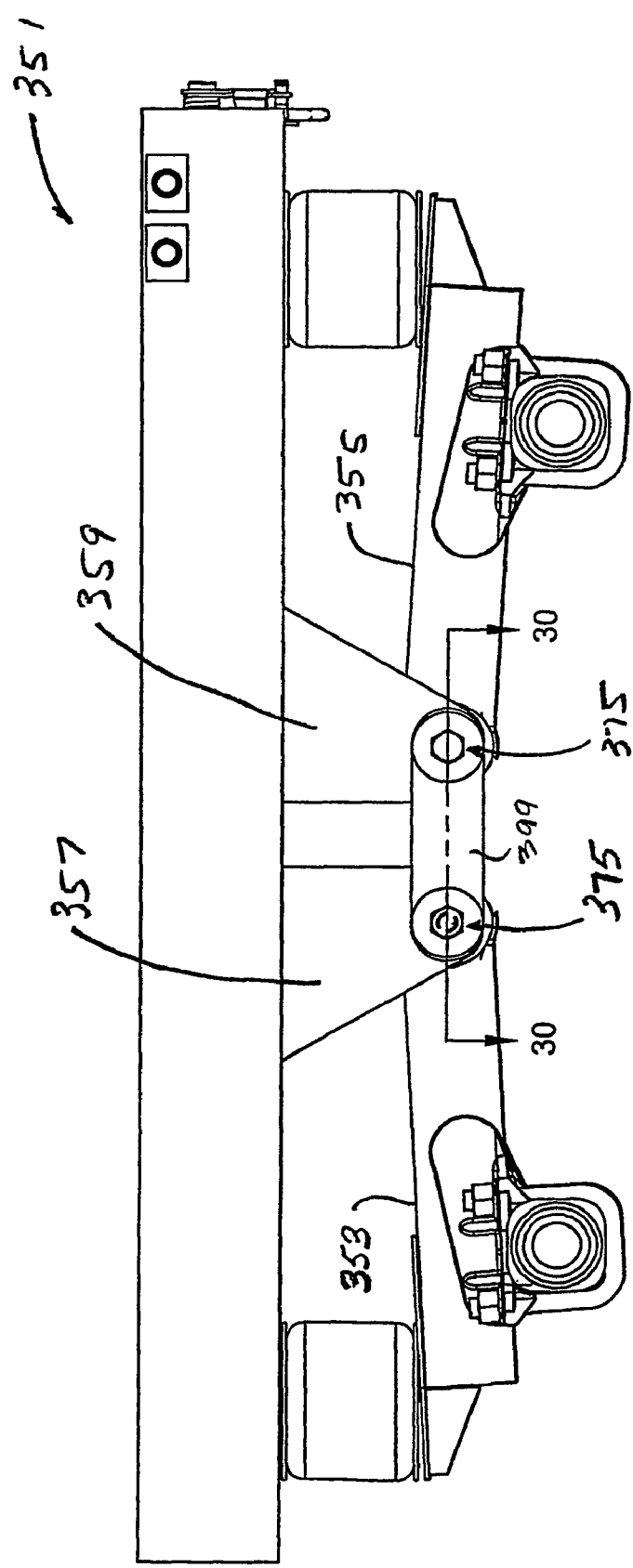
FIG. 29 is a side elevation of the suspension of FIG. 28.
Figure 30:
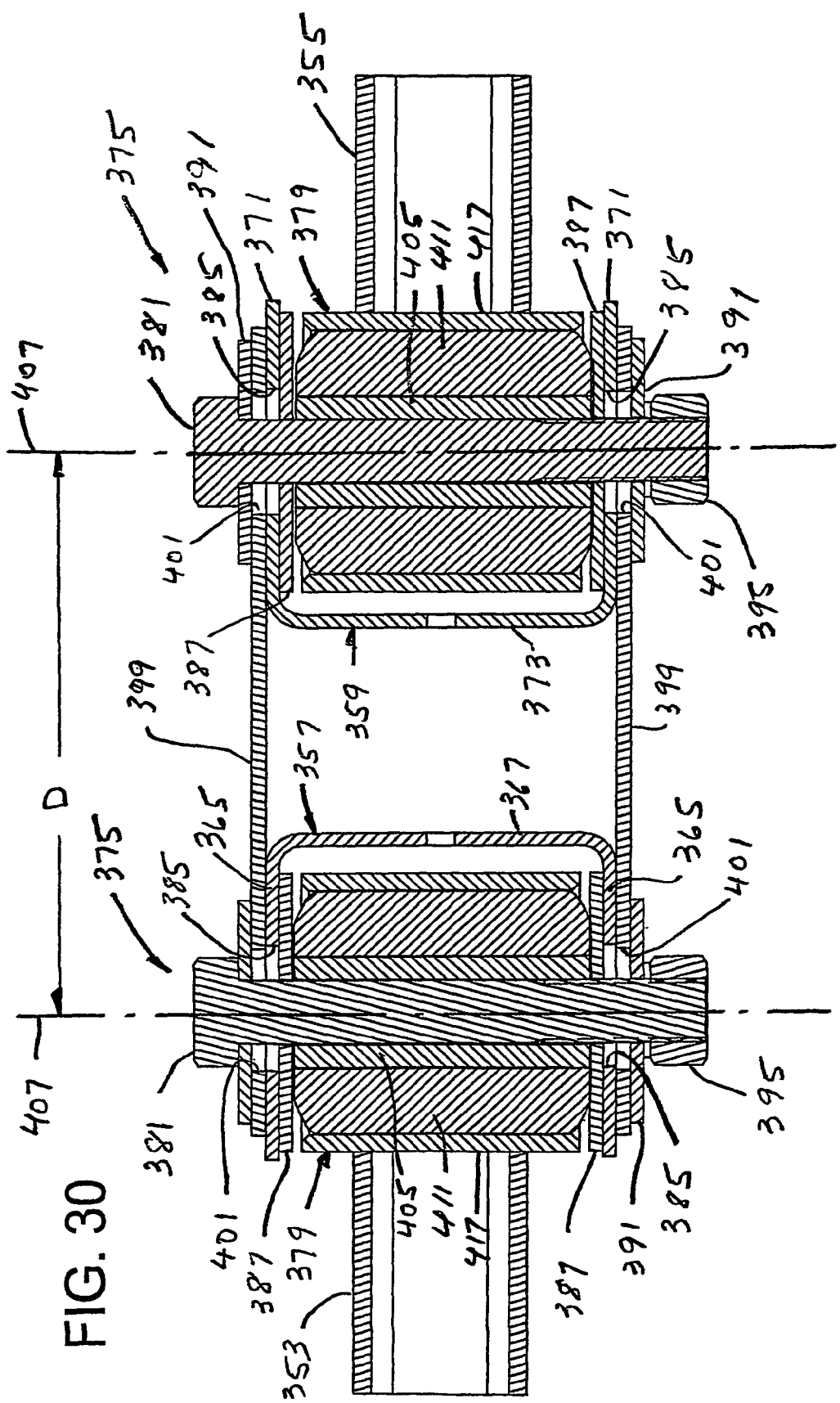
FIG. 30 is an enlarged section taken in the plane of line 30—30 of FIG. 29 showing bushing assemblies for pivotally connecting the suspension beams to the hangers.
Figure 31:
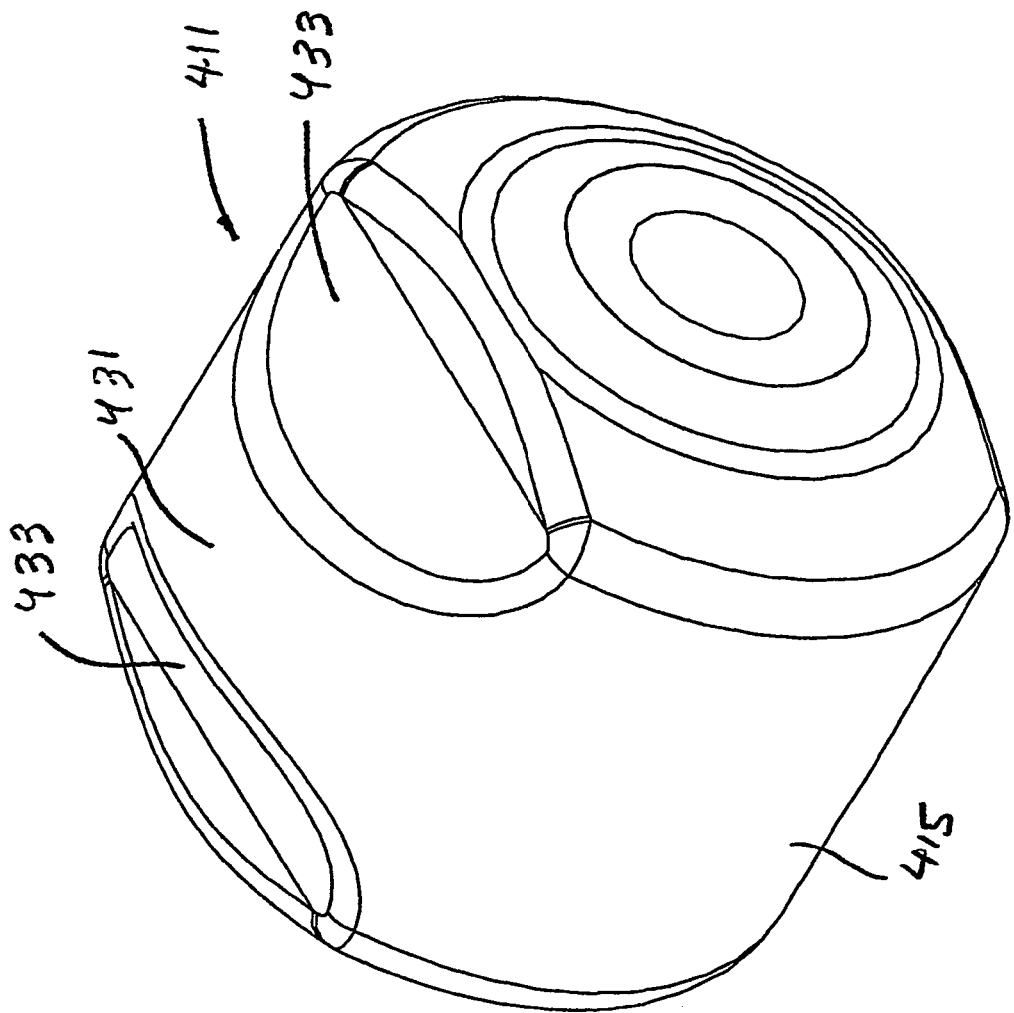
FIG. 31 is a perspective a bushing member of a bushing assembly of FIG. 30.
Figure 32:
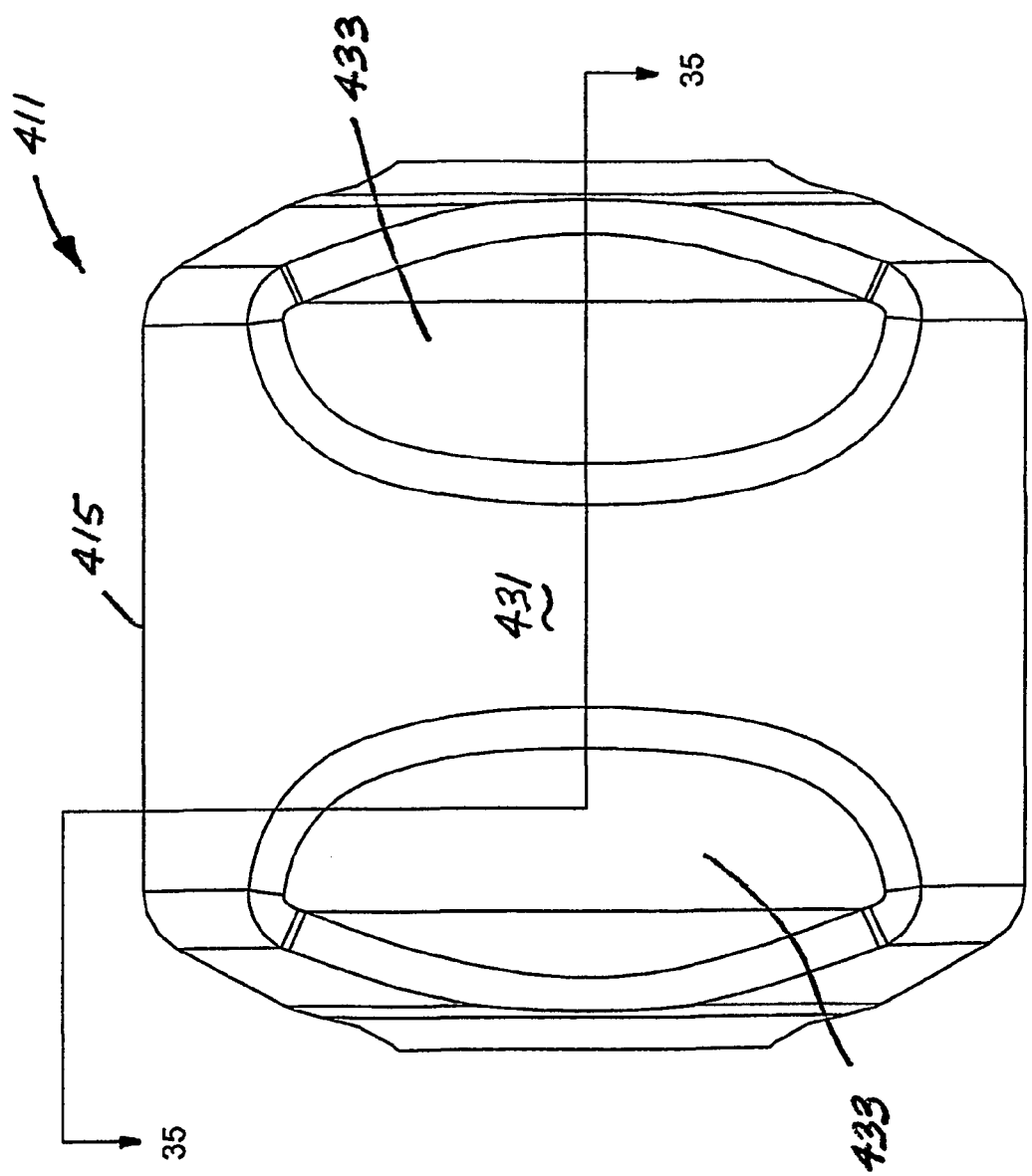
FIG. 32 is a top plan view of the bushing member of FIG. 31.
Figure 33:
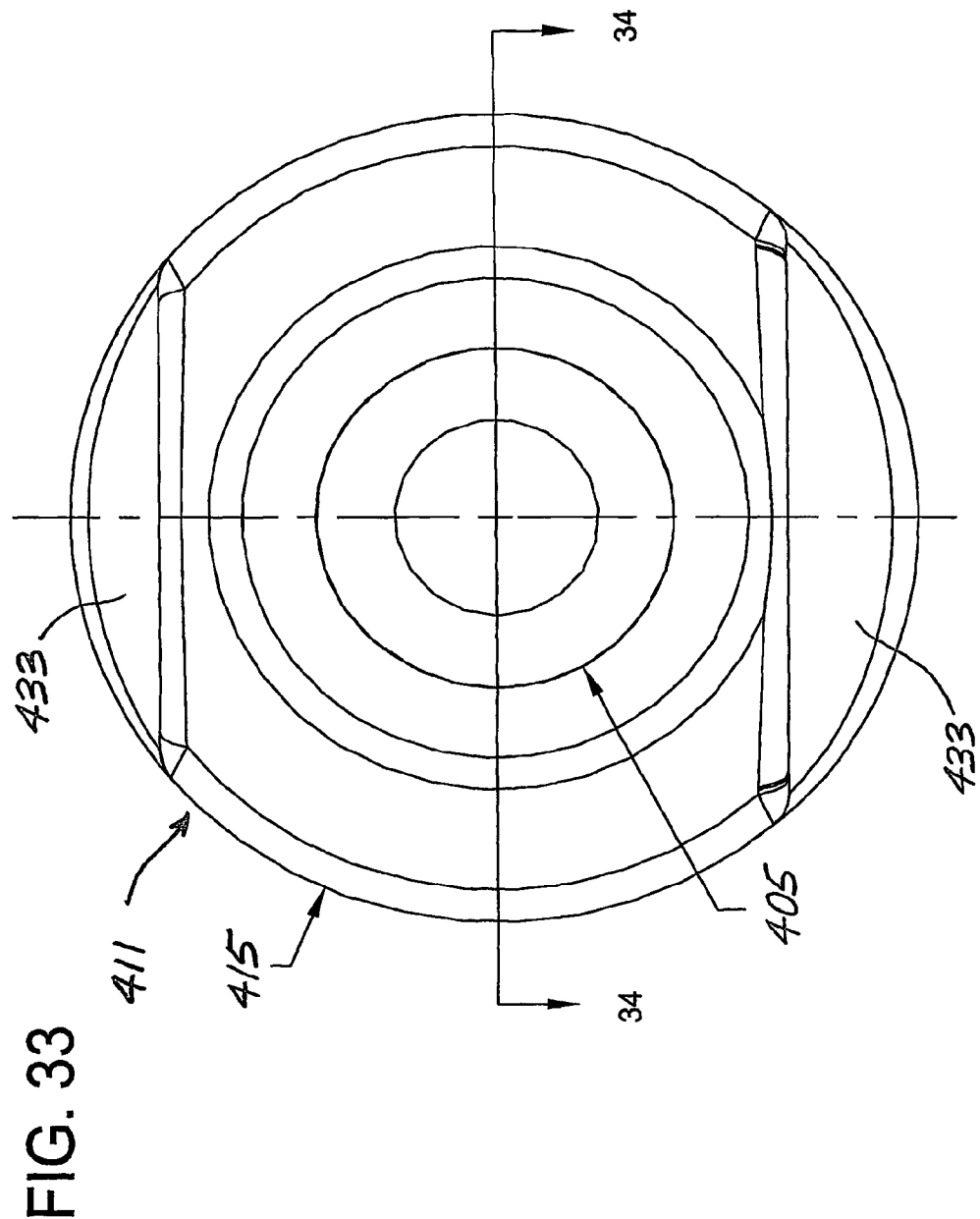
FIG. 33 is an end elevation of the bushing member.

FIGS. 28–30 illustrate another embodiment of the suspension, generally indicated at 351, in which the forward suspension beams 353 and rearward suspension beams 355 are connected to forward and rearward hangers designated 357 and 359, respectively, at each side of the frame. As shown in FIG. 30, the forward hanger 357 comprises a vertically oriented channel-shaped hanger member having a pair of generally parallel side walls 365 and a connecting wall 367 joining the side walls at the rear edges of the side walls. The rearward hanger 359 comprises a similar vertically oriented channel-shaped hanger member having a pair of generally parallel side walls 371 and a connecting wall 373 joining the side walls at the front edges of the side walls, the connecting walls 367, 373 of the two hangers preferably being spaced from one another. Each beam 353, 355 has a pivot connection 375 with a respective hanger member. This connection 375 comprises a bushing assembly, generally designated 379, a pivot bolt 381 passing through the bushing assembly 379 and through horizontal slots 385 in the side walls 365, 371 of respective hangers, a first pair of hardened wear washers 387 on the bolt 381 between the ends of the bushing assembly 379 and the side walls of the hangers, and a second pair of washers 391 on the bolts between the heads of the bolts and the side walls of the hangers. The slots 385 in the side walls of the hangers 357, 359 permit the position of each beam relative to its respective hanger to be adjusted in forward-to-rearward direction to insure that the axle clamped to the beam is perpendicular to the longitudinal centerline of the frame and vehicle. Once adjusted, the position of the beam 353, 355 is fixed by tightening a nut 395 on the bolt. The distance D between the pivot connections 375 of the forward and rearward beams to their respective hangers at each side of the frame is maintained fixed by a pair of spacer bars 399 having holes 401 therein for receiving the two bolts 381. The spacing D between the bolts 381 at one side of the frame is about equal to the spacing D between the bolts at the opposite side of the frame, so that the axles are maintained parallel.

Figure 34:
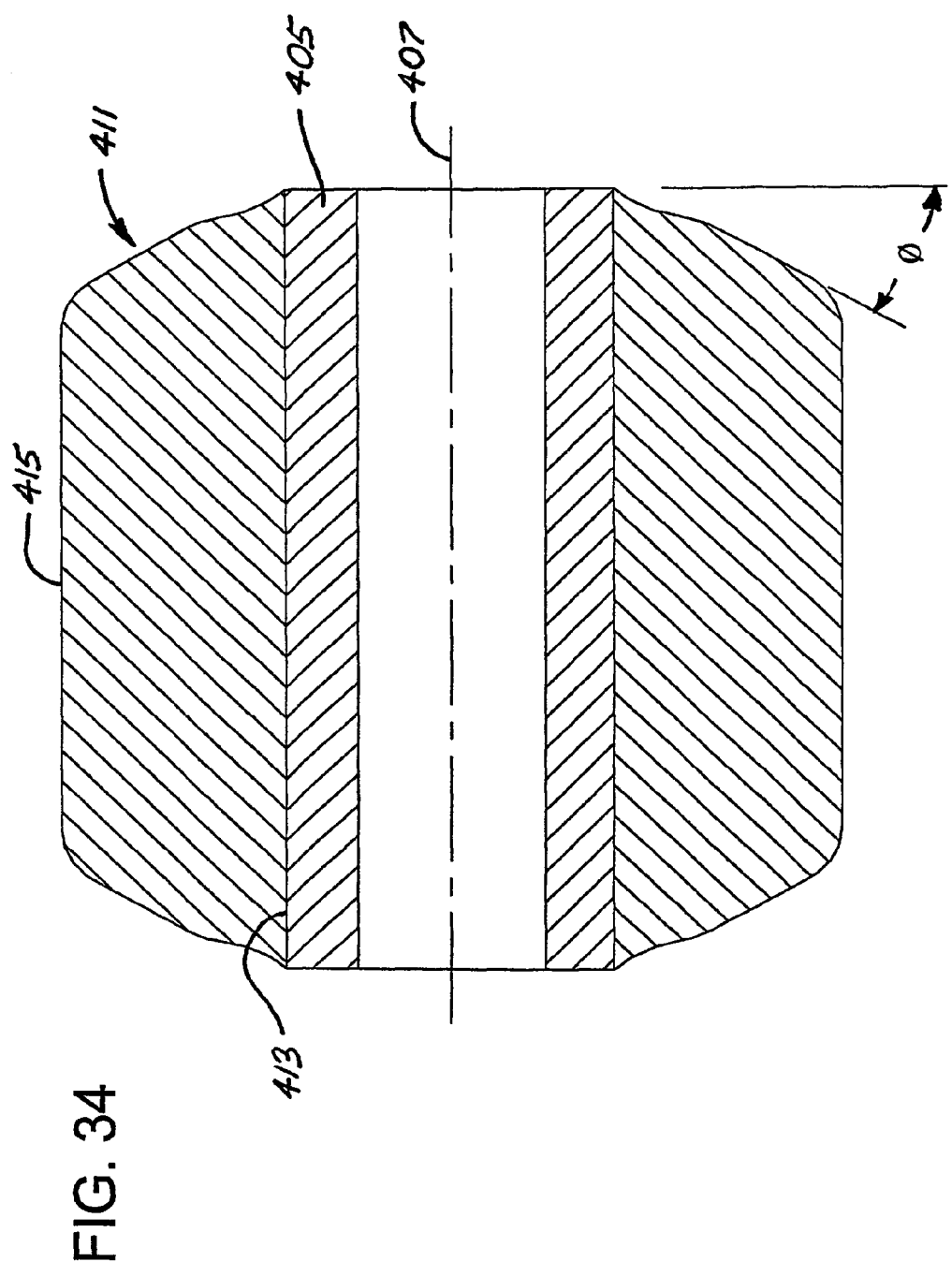
FIG. 34 is a sectional view taken in the plane of line 34—34 of FIG. 33.
Figure 35:
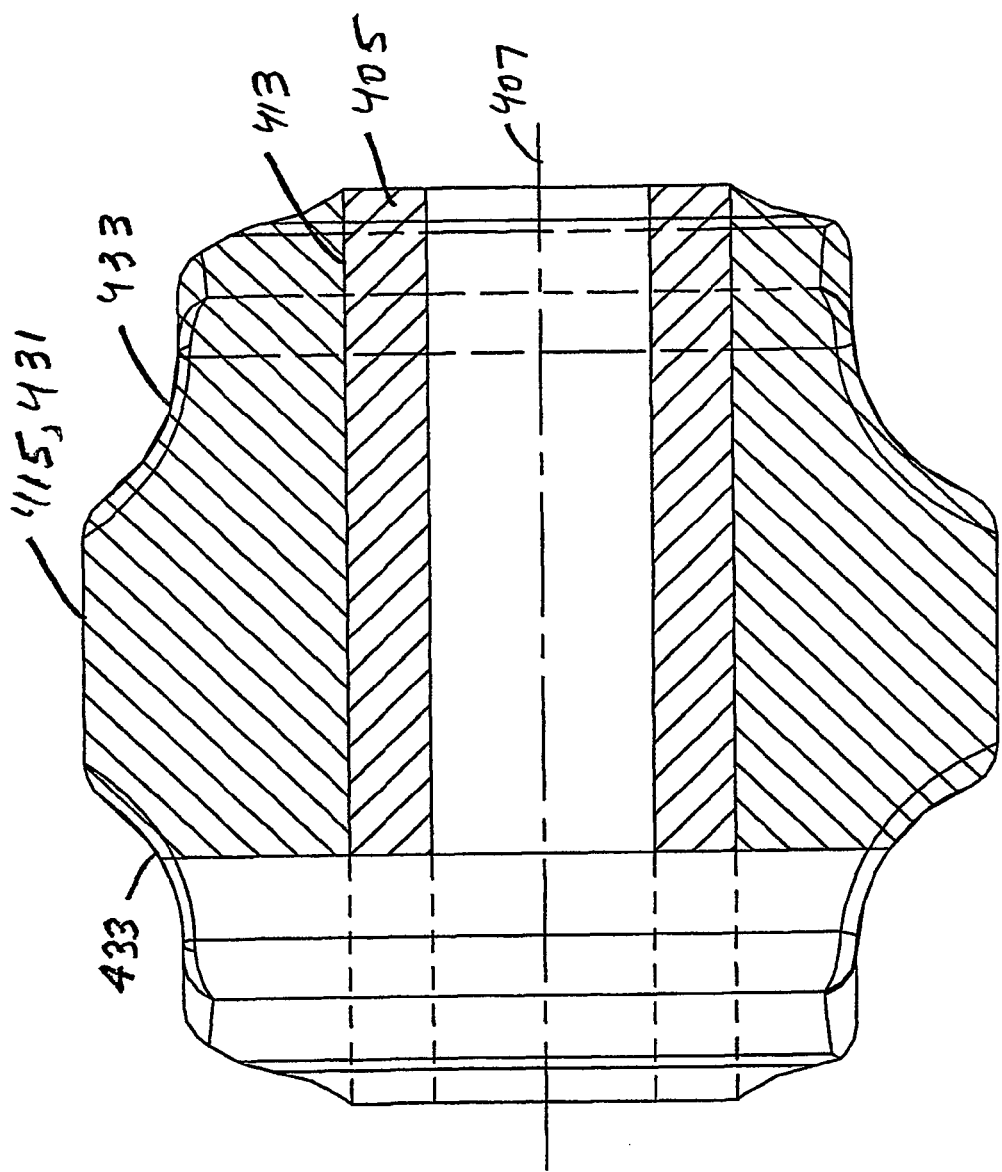
FIG. 35 is a sectional view taken in the plane of line 35—35 of FIG. 32.
Figure 36:
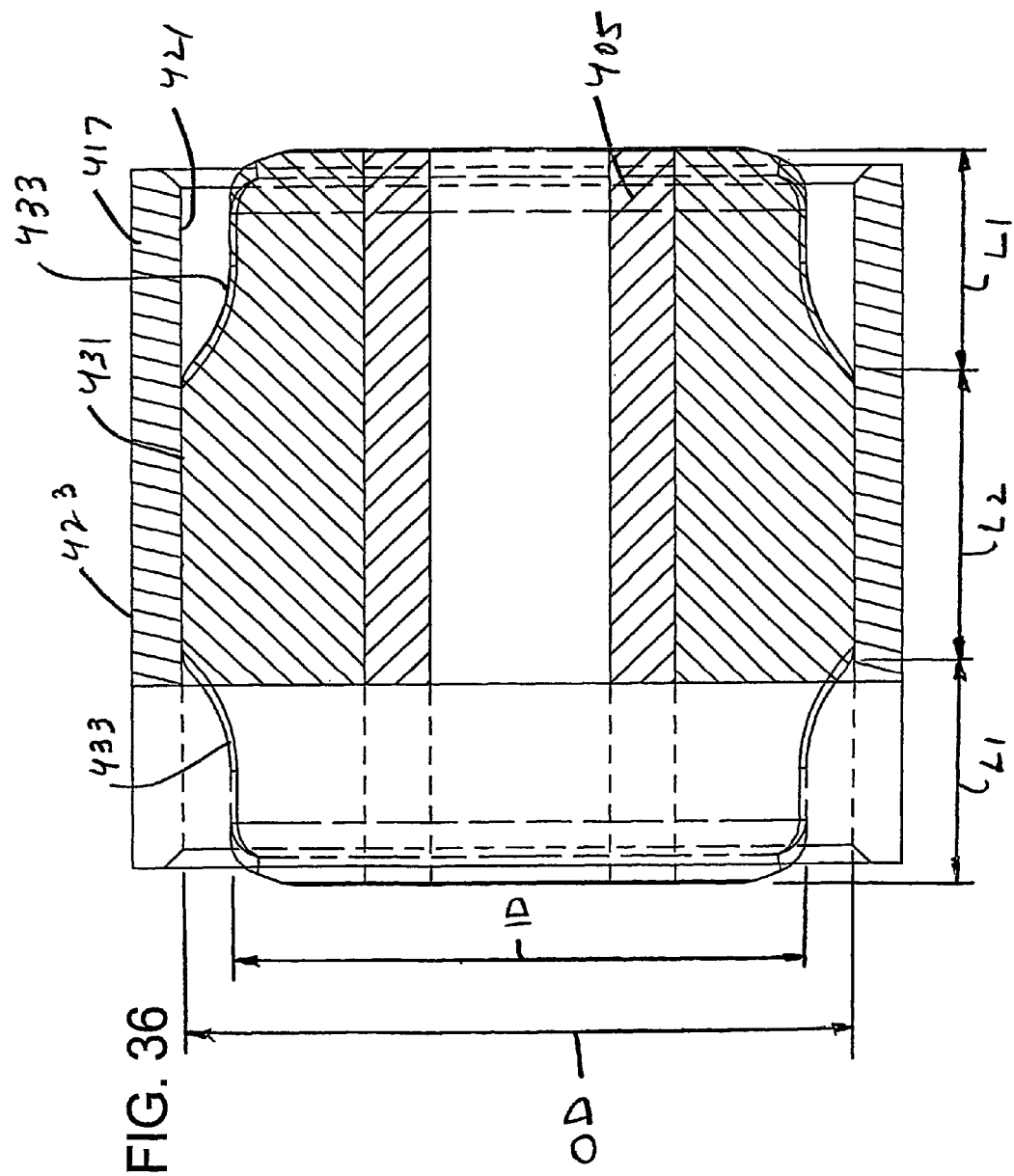
FIG. 36 is a view similar to FIG. 35 showing the bushing member assembled with an outer sleeve.
Figure 37:
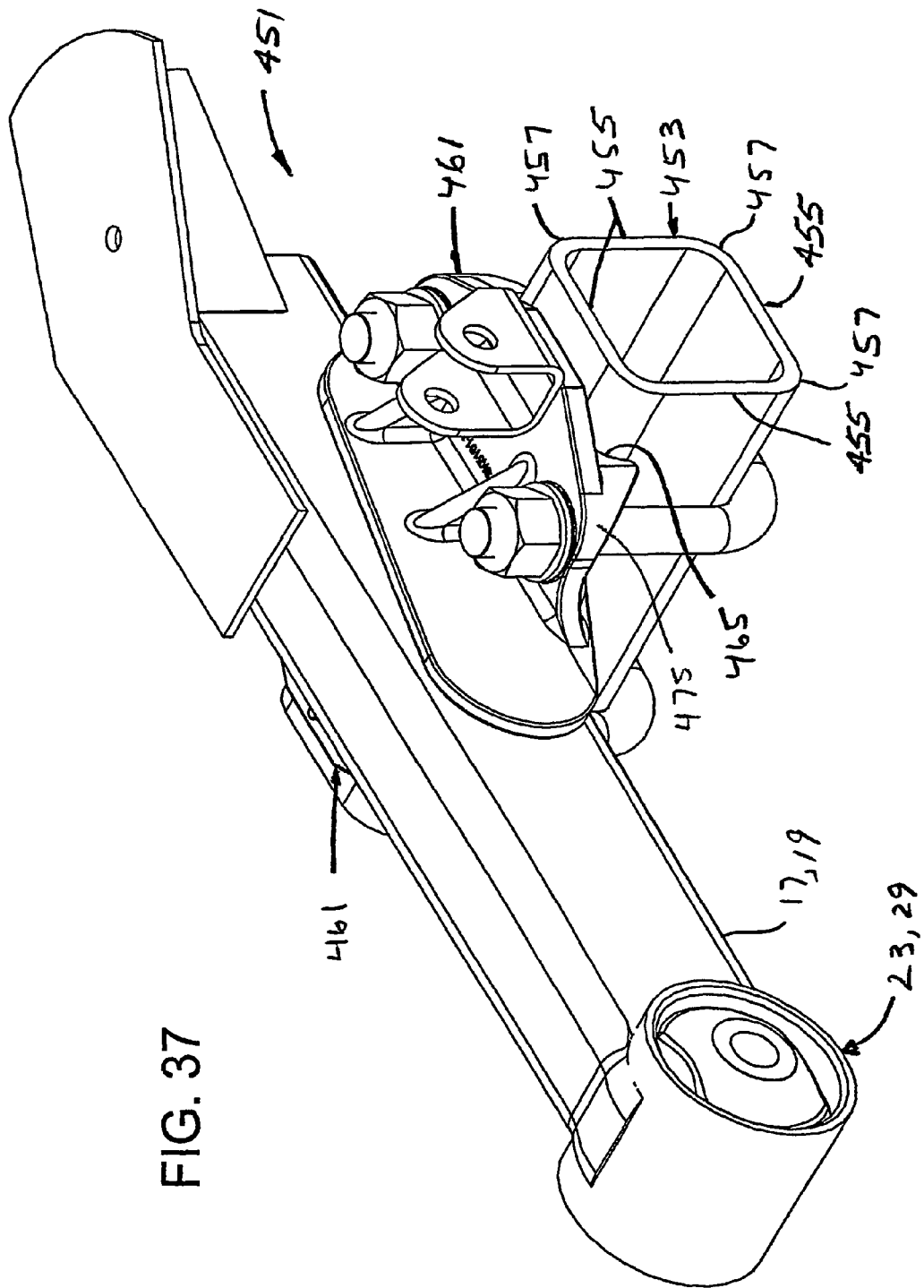
FIG. 37 is a top perspective of an axle support for supporting an axle of rectangular cross section on a suspension beam.
Figure 38:
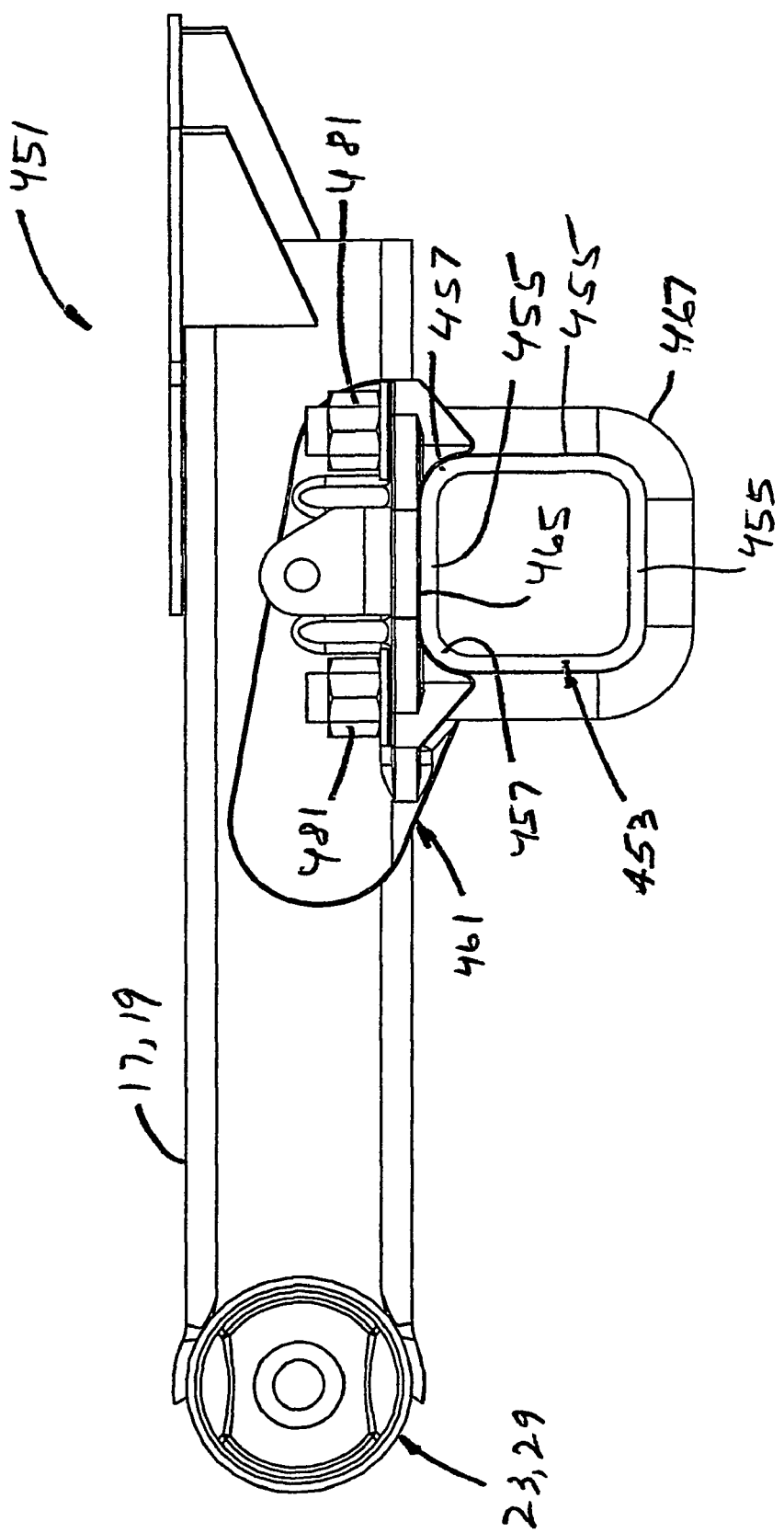
FIG. 38 is a side elevation of the axle support of FIG. 37.
Figure 39:
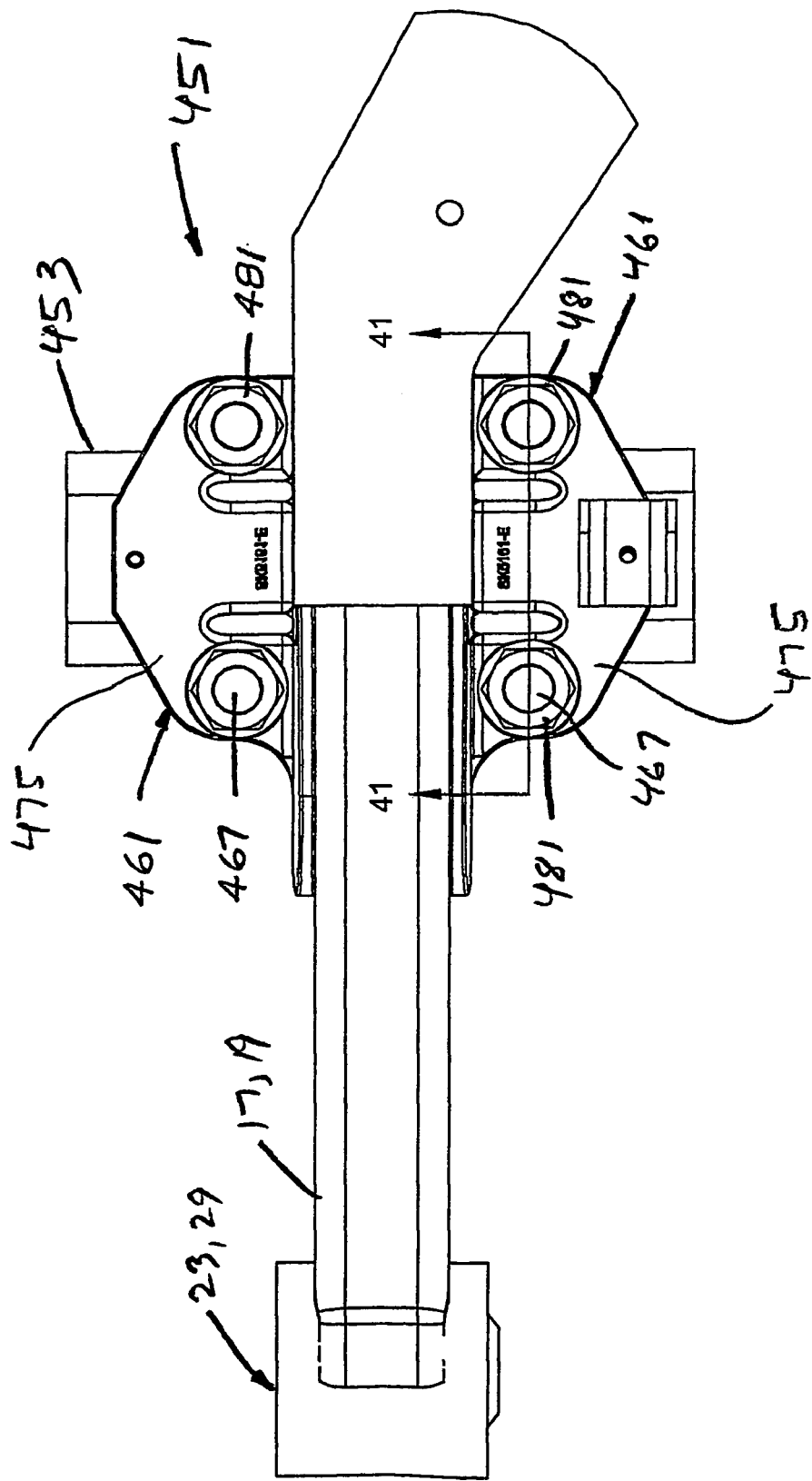
FIG. 39 is a top plan of FIG. 37.
Figure 40:
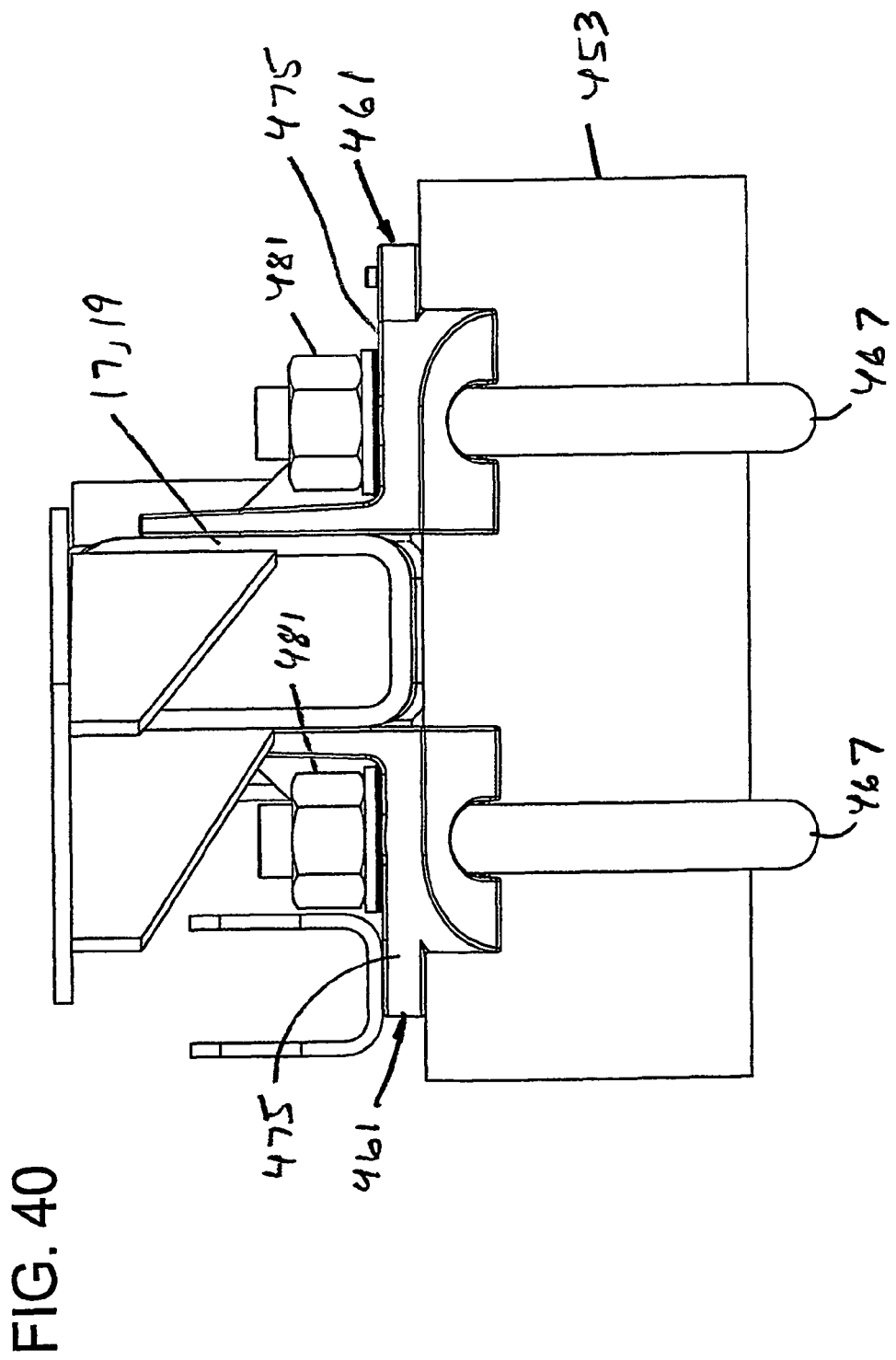
FIG. 40 is a right end view of the axle support of FIG. 37.
Figure 41:
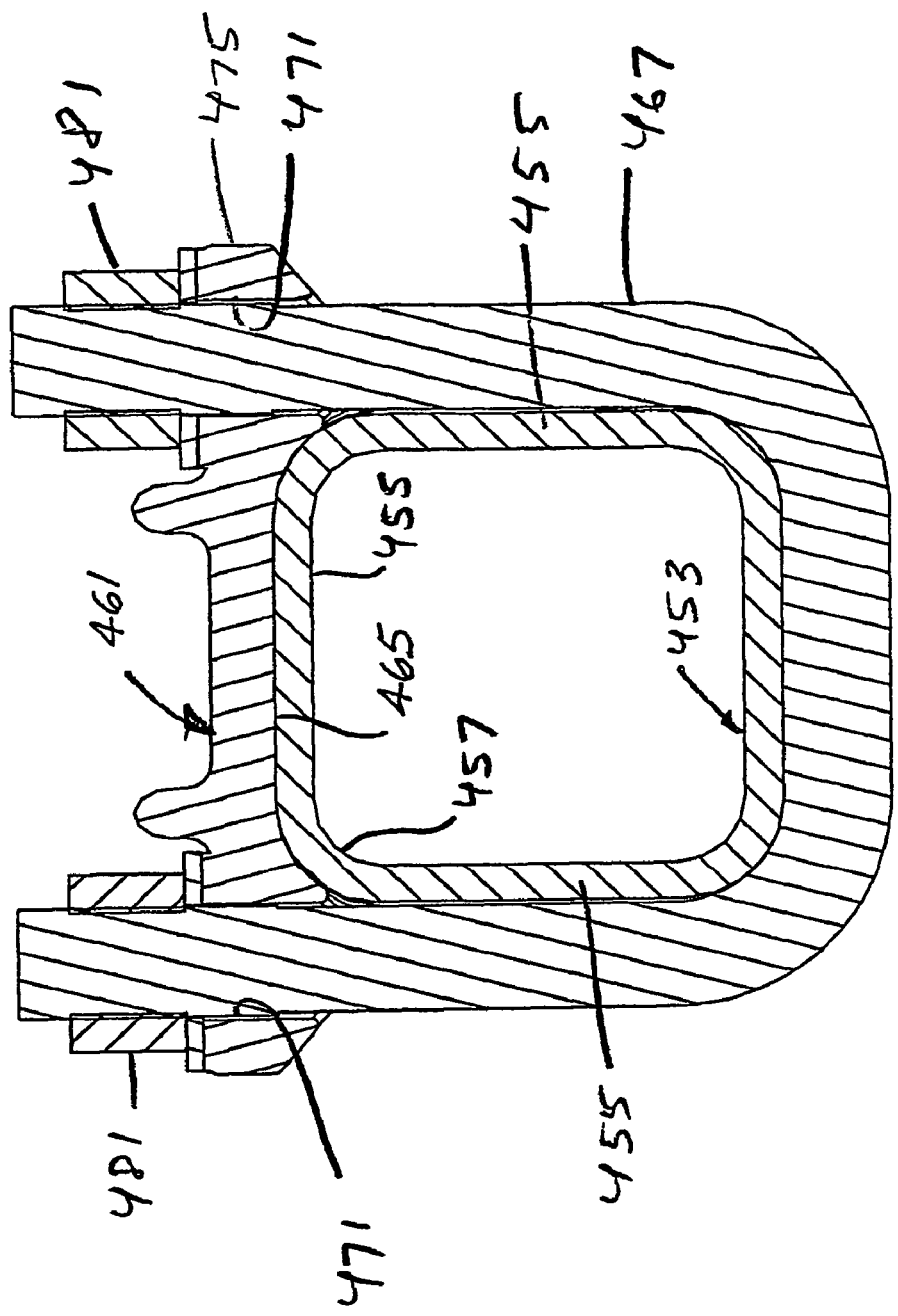
FIG. 41 is a sectional view taken in the plane of line 41—41 of FIG. 39.

Referring to FIGS. 30–36, the bushing assembly 379 comprises an inner metal sleeve 405 having a central longitudinal axis 407 about which the beam 353, 355 is adapted to pivot, and a cylindric bushing member 411 of resilient material (e.g., molded rubber) surrounding the inner metal sleeve 405 and having a press (friction) fit thereon. The bushing member 411 has a radial inner surface 413 adjacent the inner metal sleeve 405 and an opposite radial outer surface 415 (FIG. 34). The bushing member 411 is press fit inside an outer metal sleeve 417 which surrounds the bushing member. The outer metal sleeve 417 has a radial inner surface 421 adjacent the bushing member 411 and an opposite radial outer surface 423 (FIG. 36). As shown in FIGS. 31–36, which illustrate the bushing member in its installed orientation on a vehicle, one or more regions of the outer surface 415 of the resilient bushing member 411 are relieved in a radially inward, generally vertical direction. That is, the vertical radial dimension of the bushing member is reduced in these regions to facilitate compression of the bushing member in the vertical direction (and thus vertical movement of the beam 353, 355 relative to its respective hanger 357, 359). The bushing member 411 is not substantially relieved in the horizontal direction, thereby maintaining the stiffness of the bushing member in a direction extending generally longitudinally with respect to the vehicle. In the embodiment shown, the outer surface of the bushing member 411 has an unrelieved cylindric region 431 between opposite ends of the bushing member, and a pair of relieved regions 433 formed by generally wedge-shaped recesses on opposite sides of the unrelieved region 431 toward opposite ends of the bushing member. This end-relief configuration facilitates angular rocking movement of the inner sleeve 405 relative to the outer sleeve as is apparent from FIG. 36, "angular" movement being movement of the two sleeves out of parallel to a position in which the axes of the two sleeves are skewed relative to one another. In one preferred form (FIG. 36), the relieved regions 433 have combined axial lengths L1 greater than the axial length L2 of the unrelieved region 431, and each relieved region curves generally radially inward and axially toward a respective end of the bushing member 411. The bushing member 411 is preferably configured so that when it is pressed in place between the inner and outer sleeves 405, 417, the ends of the bushing member are generally flush (co-planar) with the ends of the inner sleeve 405. By way of example, referring to FIG. 34, the bushing member 411 may be configured to have ends tapered at an angle θ (about 30 degrees in one embodiment) prior to assembly with the outer sleeve 417. During assembly, e.g., as the member 411 and outer sleeve 417 are press fit together, the member 411 deforms to assume a final configuration wherein the ends of the bushing member are generally flush with the inner sleeve. As in previously described embodiments, the outer sleeve 417 is somewhat shorter than the inner sleeve 405 so that when the pivot bolt 381 is tightened, the inner sleeve is clamped fixedly in place while the outer sleeve is allowed to rotate to a limited extent (as permitted by the flexibility of the bushing member 411) to accommodate pivoting of the beam 353, 355. Angular movement of the outer sleeve (and beam) relative to the inner sleeve (and hanger) is restricted by engagement of the ends of the outer sleeve 417 with the hardened washers 387.

By way of example, but not limitation, the unrelieved region 431 of the installed bushing member 411 shown in FIG. 36, may have an axial length L2 of about 2.0 in., and the combined axial lengths L1 of the relieved regions 433 may be about 3.0 in., providing an overall bushing member length of about 5.0 in., which generally corresponds to the length of the inner metal sleeve 405. Further, the cylindric unrelieved region 431 of the bushing member 411 may have an outside diameter of about 4.375 in. and an inside diameter of about 2.0 in. The relieved regions 433 may have an outside diameter OD at the ends of the bushing member of about 3.75 in., an inside diameter ID of about 2.0 in., and a radius of curvature of about 1.0 in (see FIG. 36). The outer sleeve 417 may have an overall length about 0.250 in. less than the inner sleeve 405.

The design of bushing assembly 379 is advantageous in that the vertical radial relief of the bushing member 411 enables greater deflection of the bushing member under a given vertical load while maintaining bushing stiffness under generally horizontal loads (i.e., loads in the generally longitudinal direction with respect to the vehicle). This design reduces the need for axle realignment and yet provides for good roll stiffness of the vehicle. It will be understood that the specific relieved configuration of the bushing member 411 can change without departing from the scope of this invention.

FIGS. 37–41 illustrate an axle support of the present invention, generally designated 451, for use with an axle 453 of generally rectangular (e.g., square) cross section. The axle 453 may be solid or tubular and has four generally flat sides 455 and four rounded corners 457. The support 451 includes at least one side seat 461, and preferably two side seats 461 on opposite sides of the beam 17, 19. These seats 461 are similar to the side seats 305 of axle support 301 except that each seat 461 has an axle-supporting surface 465 contoured to fit the contour of the rectangular axle 453. In one embodiment, the axle-supporting surface 465 of each seat 461 extends on three sides of the axle, corresponding to one side 455 and two adjacent corners 457 of the axle (see FIGS. 38 and 41). The axle 453 is supported on each side seat 461 by a U-bolt fastener 467 having legs extending up through openings 471 in the generally horizontal legs 475 of the side seats 461, and nuts 481 threaded on the legs of the U-bolt fastener to tighten the fastener and thereby clamp the axle against rotational and axial movement relative to the beam. No welding of the axle to the seat 461 is necessary, provided the axle-supporting surface 465 extends around at least two corners 457 of the axle when the axle is clamped tight against the seat. As a result of this construction, the axle may be readily removed from the beam simply by removing the U-bolt fasteners 467. The side seats 461 are suitably reinforced, as by gussets and reinforcing ribs.

In the embodiment just described, the axle support 451 does not have a center seat, but it will be understood that a center seat can be provided, if desired. Also, as with the prior embodiments, it will be understood that the axle support 451 can be used for supporting an axle above or below the suspension beam.

Figure 42:
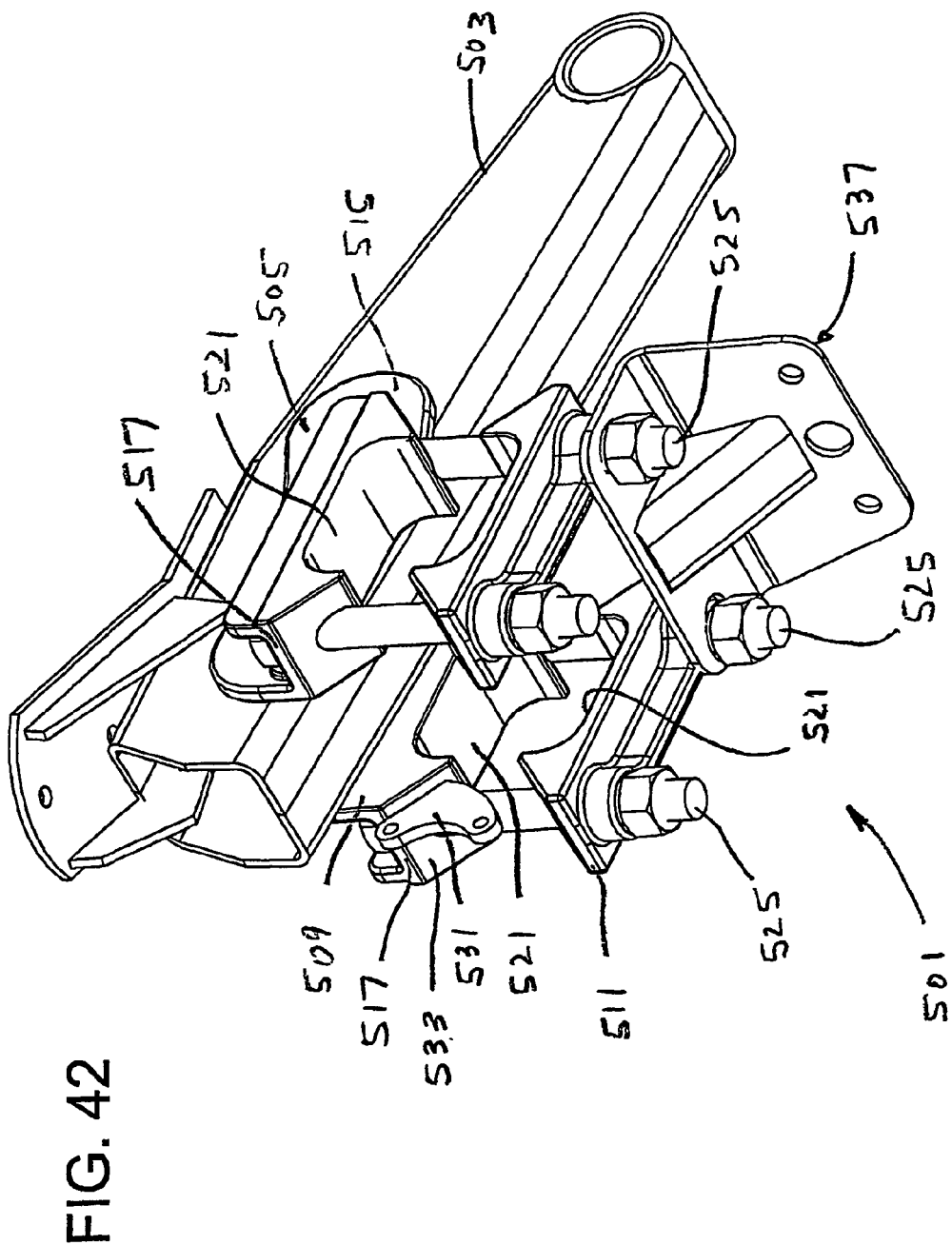
FIG. 42 is a bottom perspective of a suspension beam and axle support with a brake chamber bracket and camshaft bearing bracket mounted on the axle support.
Figure 43:
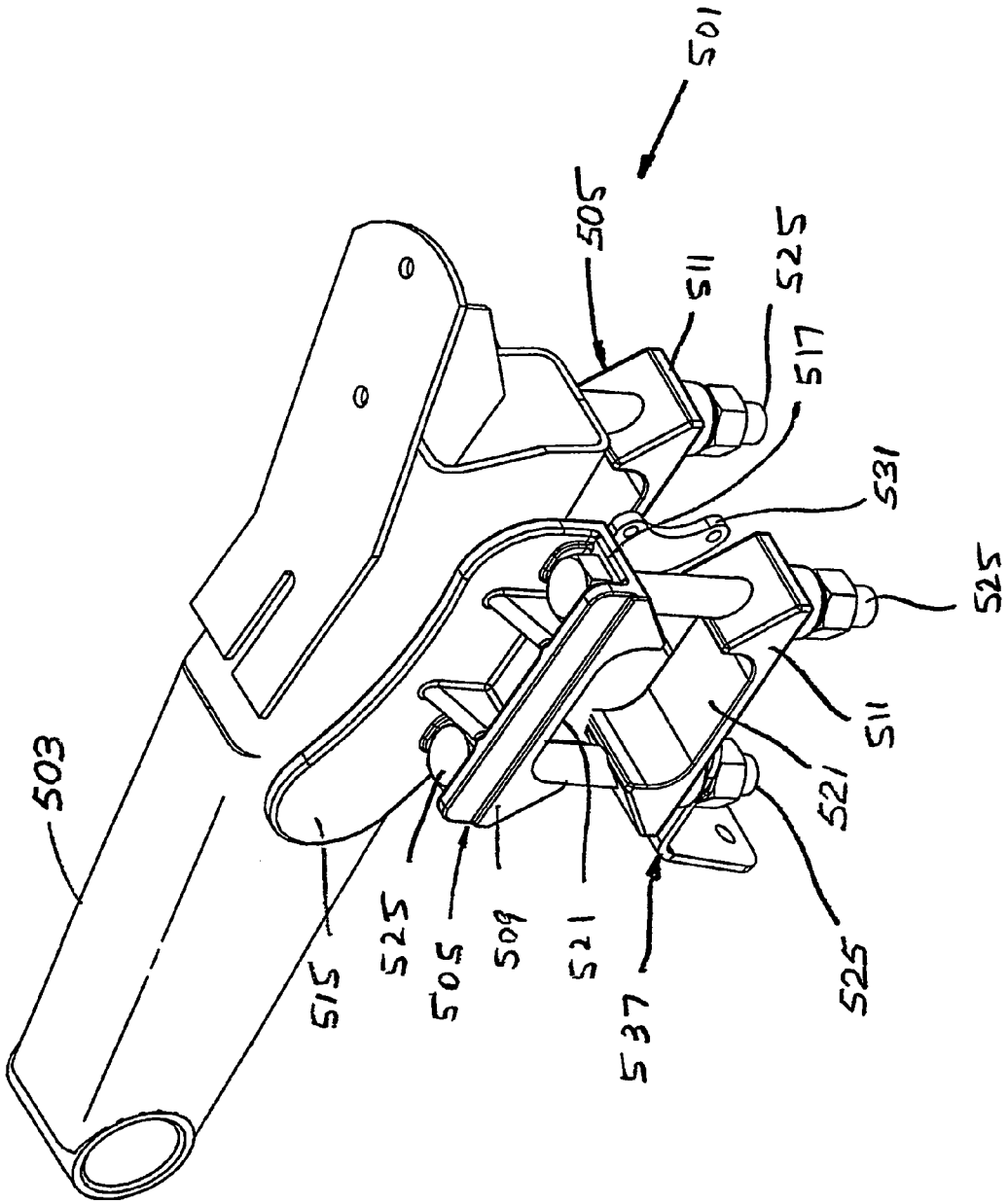
FIG. 43 is a top perspective of the suspension beam and axle support of FIG. 42.

FIGS. 42 and 43 illustrate another axle support, generally designated 501, for supporting a rectangular axle (not shown) on a suspension beam 503. The support 501 includes at least one side seat assembly 505 on one side of the beam, and preferably two side seat assemblies 505 on opposite sides of the beam, two such assemblies being shown in FIGS. 42 and 43. Each seat assembly 505 includes first and second opposing seats designated 509 and 511, respectively, the first seat 509 being a fixed upper seat in one embodiment and the second seat 511 being a lower movable seat. The upper fixed seat 509 has a generally vertical leg 515 affixed (as by bolted connections or by welding) to a respective side of the suspension beam 503, and a generally horizontal leg 517 extending laterally out from the beam. The lower movable seat 517 is spaced below the generally horizontal leg 517 of the upper seat 509. The seats 509, 511 have opposing axle-supporting surfaces 521, each of which is preferably contoured to match the shape of the axle. For example, in one embodiment each axle-supporting surface 521 is contoured to extend on one side of a rectangular axle and around two adjacent corners of the axle. Fasteners 525 (e.g., nut and bolt fasteners) are used to draw the upper and lower seats 509, 511 toward one another to clamp a respective axle therebetween against the axle-supporting surfaces 521 of the two seats. The fasteners can be of the type which can be tightened or loosened, or lock fasteners of the type which, once tightened, remain permanently secured.

It will be understood that the axle support 501 can also be used to support an axle above a suspension beam, in which case the movable seat 511 will be above the fixed seat 509. Further, the axle support 501 may be used to support an axle having any cross-sectional shape, so long as the axle-supporting surfaces 521 on opposing seats are configured to match the contour of the axle.

Again referring to FIGS. 42 and 43, a camshaft bearing bracket 531 for mounting the camshaft bearing (not shown) is affixed, as by welding, to a fixed upper seat 509 of one of the side seat assemblies 505. In one embodiment, the bracket 531 is generally C-shaped and is secured to a generally downwardly facing surface 533 on the upper seat 509 adjacent the axle-supporting surface 521. Further, a separate brake chamber bracket 537 is secured to the movable lower seats 511 of the two side seat assemblies 505. In the particular embodiment shown, the brake chamber bracket 537 is generally L-shaped, having generally vertical and horizontal legs. The bracket 537 is secured in place by the fasteners 525 and is used to mount the brake chamber (not shown) in a position in which the push rod of the brake chamber, when extended by actuation of the brake pedal, moves to rotate the camshaft in the camshaft bearing. Such rotation causes a conventional S-cam on the camshaft to push the brake shoes against the drum of the wheel to brake the wheel, as will be understood by those in this field. In conventional designs, the brake chamber bracket 537 and camshaft bearing bracket 531 are welded directly to the axle, causing stress risers in the axle. The present design eliminates the need to weld these brackets to the axle.

Figure 44:
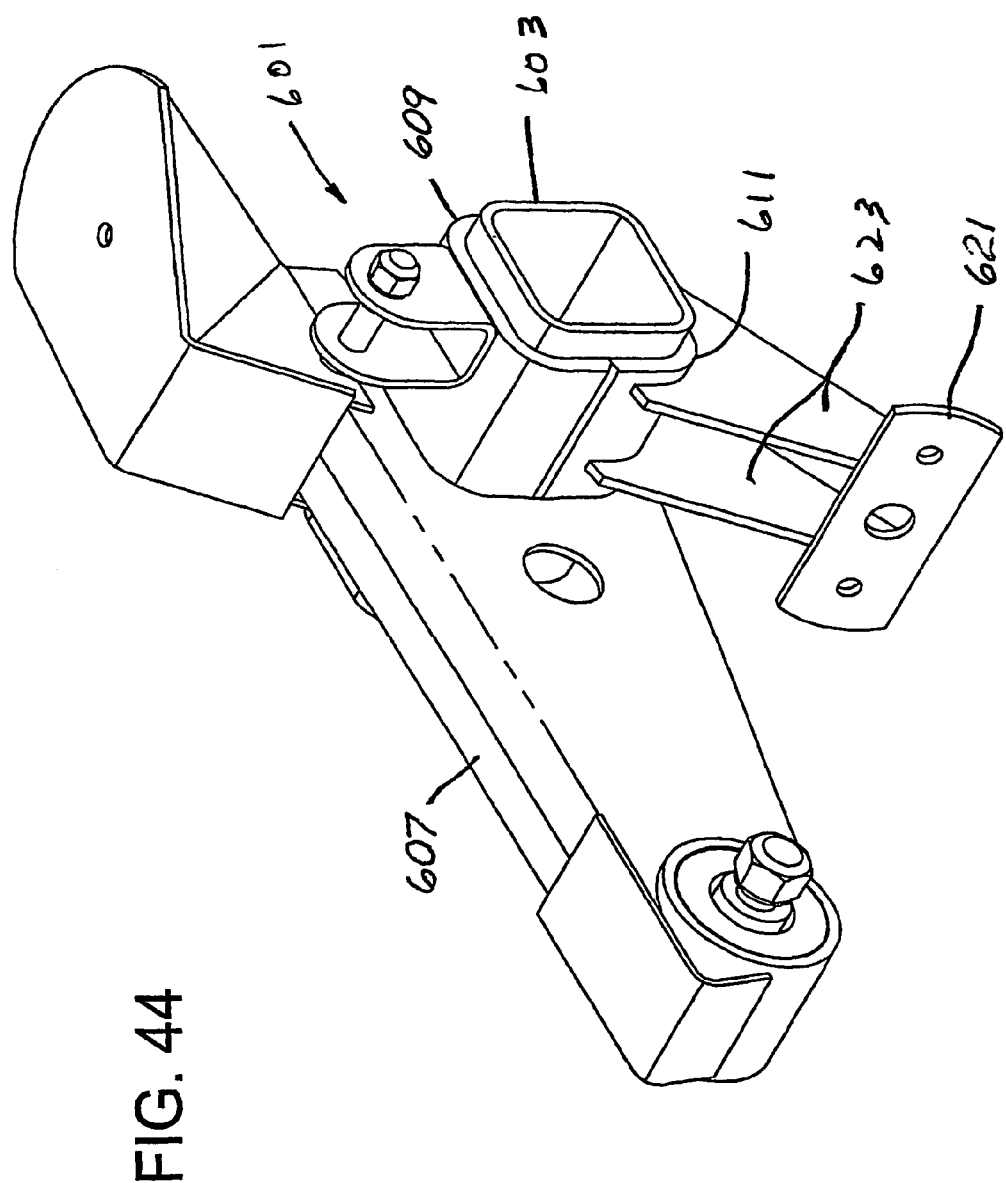
FIG. 44 is a top perspective of another embodiment of a suspension beam and axle support with a brake chamber bracket and camshaft bearing bracket mounted on the support.
Figure 45:
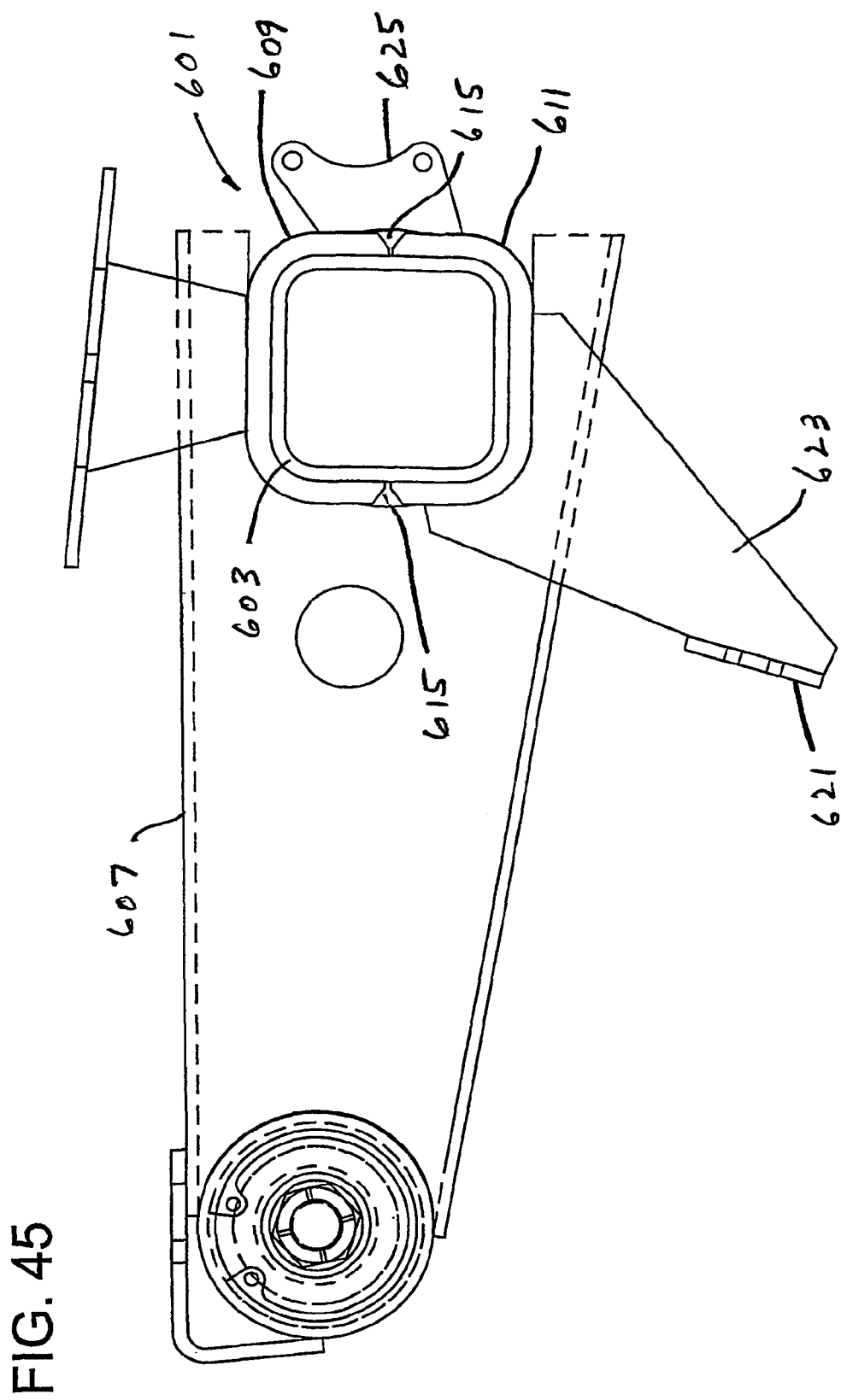
FIG. 45 is a bottom perspective of the suspension beam and axle support of FIG. 44.

FIGS. 44 and 45 illustrate another axle support, generally designated 601, for supporting an axle 603, shown in this embodiment as rectangular, although it will be understood that the axle could have other shapes (e.g., circular). The support 601 is elongate and extends through the side walls of a suspension beam 607 in a position wherein the support 601 projects laterally outward from opposite sides of the beam. The support 601 comprises upper and lower channel members 609, 611 which surround the axle 603 and hold it in fixed position. This may be accomplished, in one embodiment, by welding a first of the two channel members (e.g., 609) to the beam 607, positioning the axle 603 in the first channel member, positioning the second channel member (e.g., 611) on the axle, drawing the two channel member together to clamp the axle therebetween, welding the two channel members 609, 611 together along their adjacent edges, as indicated at 615, and welding the second channel member to the beam 607. This procedure has the benefit of minimizing any direct welds to the axle. Alternatively, the axle can be welded to one or both channel members 609, 611.

As shown in FIGS. 44 and 45, a brake chamber bracket 621 is held by a pair of arms 623 affixed to the lower channel member 611 at one side of the beam, and a camshaft bearing bracket 625 is affixed to the upper and lower channel members 609, 611 on the opposite side of the beam. Similar to axle support 501, this arrangement avoids welding either bracket 621, 625 to the axle.

The axle support designs described above have several advantages, including the elimination of welding of certain parts to the axles, and the reduction in bending stresses on the axles.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A vehicle suspension comprising:
    a frame for support of a vehicle, said frame having a forward end, a rearward end and sides;
    a pair of levers carried by the frame intermediate the ends of the frame, one at one side and the other at the other side of the frame, each lever being pivotally mounted with respect to the frame for swinging movement on an axis intermediate opposite ends of the lever transverse to the frame;
    a pair of beams, one extending forward from one of the levers and the other extending forward from the other lever, each of said forwardly-extending beams having a pivotal connection with the respective lever forward of the lever axis and having a support for a forward axle;
    a pair of beams, one extending rearward from one of the levers and the other extending rearward from the other lever, each of said rearwardly-extending beams having a pivotal connection with the respective lever rearward of the lever axis and having a support for a rearward axle;
a forward pair of springs each interposed between a respective forwardly-extending beam and the frame; and
a rearward pair of springs each interposed between a respective rearwardly-extending beam and the frame.

2. A suspension as set forth in claim 1 wherein the axis of the one lever is generally aligned with the axis of the other lever transversely of the frame.

3. A suspension as set forth in claim 2 wherein the pivotal connection of each beam with the respective lever connects the beam and the lever for pivotal movement of one relative to the other on an axis transverse to the frame.

4. A suspension as set forth in claim 1 having a pair of hangers, one extending down from the frame at one side and the other extending down from the frame at the other side, each lever being pivotally mounted on a respective hanger.

5. A suspension as set forth in claim 4 wherein each lever is a double-sided lever having sides adjacent opposite sides of the respective hanger and wherein the pivotal connection of each beam with the respective lever is between the sides of the lever with the axis of the pivotal connection transverse to the hanger.

6. A suspension as set forth in claim 1 wherein said springs are pneumatic springs.

7. A suspension as set forth in claim 1 wherein said springs are leaf springs.

8. A suspension as set forth in claim 1 wherein said springs are rubber springs.

9. A vehicle suspension comprising:
a frame for support of a vehicle, said frame having a forward end, a rearward end and opposite sides, a pair of rails extending longitudinally of the suspension at opposite sides of the frame, and front and rear hangers depending from each rail at locations intermediate the ends of the frame;
a pair of forwardly-extending beams, one extending forward from one of the front hangers and the other extending forward from the other front hanger, each of said forwardly-extending beams having a pivotal connection with the respective front hanger forward and having a support for a forward axle;
a pair of rearwardly-extending beams, one extending rearward from one of the rear hangers and the other extending rearward from the other rear hanger, each of said rearwardly-extending beams having a pivotal connection with the respective rear hanger and having a support for a rearward axle;
each of said pivotal connections between one of said hangers and a respective beam comprising a resilient bushing assembly;
a forward pair of springs each interposed between a respective forwardly-extending beam and the frame; and
a rearward pair of springs each interposed between a respective rearwardly-extending beam and the frame.

10. A suspension as set forth in claim 9 wherein said bushing assembly comprises an inner metal sleeve having a central longitudinal axis about which said beam is adapted to pivot, a resilient annular bushing member of resilient material surrounding said inner metal sleeve, said bushing member having a radial inner surface adjacent said inner metal sleeve and a radial outer surface, an outer metal sleeve surrounding said bushing member, said outer metal sleeve having a radial inner surface adjacent said bushing member and a radial outer surface, the outer surface of said resilient bushing member being relieved in a radially inward direction toward said central longitudinal axis to facilitate deflection of the bushing member in said radially inward direction.

11. A suspension as set forth in claim 10 wherein the outer surface of the bushing member is relieved radially inward at locations adjacent ends of the bushing member to facilitate rocking movement of the inner sleeve relative to the outer sleeve.

12. A suspension as set forth in claim 11 wherein the outer surface of the bushing member has an unrelieved axially-extending region between opposite ends of the bushing member, and relieved regions on opposite sides of the unrelieved region.

13. A suspension as set forth in claim 12 wherein said relieved regions have combined axial lengths greater than the axial length of the unrelieved region.

14. A suspension as set forth in claim 13 wherein each relieved region curves generally radially inward and axially toward a respective end of the bushing member.

15. A suspension as set forth in claim 13 wherein said bushing member has a press fit on said inner sleeve and said outer sleeve has a press fit on said bushing member, and wherein the bushing member has opposite ends which are generally coplanar with respective ends of the inner sleeve.

16. A vehicle suspension comprising:
a frame having opposite sides;
a pair of suspension beams at opposite sides of the frame, each beam having first and second ends;
a pivotal connection between each beam and the frame generally adjacent the first end of the beam;
an axle support on each beam toward the second end of the beam for supporting an axle on the beam, said axle support including a pair of side seat assemblies on opposite sides of the beam, each side seat assembly including a first seat and a second seat having opposing axle-supporting surfaces, and a fastener for drawing the first and second seats toward one another to clamp the axle-supporting surfaces against the axle;
a camshaft bracket mounted on the axle support; and
a brake chamber bracket mounted on the axle support.

17. A suspension as set forth in claim 16 wherein said first seat of each side seat assembly is affixed to the beam and the second seat of each side seat assembly is movable relative to the first seat.

18. A suspension as set forth in claim 17 wherein said camshaft bracket is mounted on a first seat of one of the side seat assemblies.

19. A suspension as set forth in claim 18 wherein brake chamber bracket is mounted on the second seats of the side seat assemblies.

20. A suspension as set forth in claim 17 wherein said fastener comprises a pair of bolts extending through openings in the first and second seats, and nuts threaded on the bolts.

21. A vehicle suspension comprising:
a frame having opposite sides;
a pair of suspension beams at opposite sides of the frame each having a pivotal connection adjacent one end thereof with the frame and an axle support toward an opposite end thereof,
said pivotal connection comprising a ball joint.

22. A suspension as set forth in claim 21 wherein said ball joint comprises:
an open-ended housing extending transversely of the beam at said one end thereof, two bushings in the housing defining a part-spherical ball seat, a ball rotatably seated in said seat having aligned tubular projections at opposite sides extending radially outward through the bushings, said projections and ball defining a transverse hole for a bolt adjacent said one end of the beam.

23. A suspension system as set forth in claim 22 wherein said ball is rotatable in the seat on an axis extending diametrically with respect to the ball.

24. A suspension system as set forth in claim 22 wherein said ball is rotatable in the seat on an axis offset from a diameter of the ball and is formed at least on one of the projections for application of a wrench.

25. A vehicle suspension comprising:
a frame having opposite sides;
a pair of suspension beams at opposite sides of the frame, each beam having first and second ends;
a pivotal connection between each beam and the frame generally adjacent the first end of the beam;
an axle of generally rectangular cross section extending generally transversely with respect to the frame from one side of the frame to the other; and
an axle support on each of said beams toward the second end of the beam for supporting said axle on the beam, said axle support including at least one side seat affixed to the beam at one side of the beam and at least one U-bolt fastener defining an axle-receiving opening, said U-bolt fastener having legs extending through openings in said side seat, and nuts threaded on the legs of the U-bolt fastener to tighten the fastener and thereby clamp the axle in fixed position against said side seat, said nuts being removable from said at least one U-bolt fastener to permit removal of the axle from the beam.

26. A suspension as set forth in claim 25 wherein said axle support comprises a pair of said side seats affixed to the beam at opposite sides of the beam, and a pair of said U-bolt fasteners.

27. A suspension as set forth in claim 25 wherein said side seat is secured to a side wall of the beam and has an axle-supporting surface contoured to fit the contour of the axle on three sides of the axle.

* * * * *